(12) United States Patent
Kataoka et al.

(10) Patent No.: US 7,145,622 B2
(45) Date of Patent: Dec. 5, 2006

(54) LIQUID CRYSTAL DISPLAY DEVICE AND METHOD FOR FABRICATING THE SAME

(75) Inventors: Shingo Kataoka, Kawasaki (JP); Arihiro Takeda, Kawasaki (JP); Takahiro Sasaki, Kawasaki (JP); Tsutomu Seino, Kawasaki (JP); Yoshio Koike, Kawasaki (JP); Hidefumi Yoshida, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 191 days.

(21) Appl. No.: 09/903,010

(22) Filed: Jul. 11, 2001

(65) Prior Publication Data

US 2002/0159018 A1     Oct. 31, 2002

(30) Foreign Application Priority Data

Sep. 27, 2000   (JP) .............................. 2000-295266

(51) Int. Cl.
*G02F 1/1337*   (2006.01)

(52) U.S. Cl. .................. 349/143; 349/130; 349/139; 349/142; 349/144

(58) Field of Classification Search ............... 349/130, 349/147, 160
See application file for complete search history.

(56) References Cited

U.S. PATENT DOCUMENTS

| | | | |
|---|---|---|---|
| 4,834,509 A * | 5/1989 | Gunjima et al. ............... | 349/89 |
| 5,959,763 A | 9/1999 | Bozler et al. | |
| 6,452,653 B1 | 9/2002 | Yamanaka et al. ........... | 349/113 |
| 6,690,441 B1 * | 2/2004 | Moriya ......................... | 349/130 |
| 6,710,837 B1 | 3/2004 | Song et al. ................... | 349/143 |
| 6,724,452 B1 * | 4/2004 | Takeda et al. ................ | 349/139 |
| 2003/0071952 A1 * | 4/2003 | Yoshida et al. .............. | 349/141 |
| 2003/0202146 A1 * | 10/2003 | Takeda et al. ................ | 349/129 |
| 2004/0075798 A1 * | 4/2004 | Inoue et al. .................. | 349/129 |
| 2004/0080697 A1 * | 4/2004 | Song et al. ................... | 349/130 |
| 2005/0128397 A1 * | 6/2005 | Sasaki et al. ................ | 349/123 |
| 2005/0259209 A1 * | 11/2005 | Takeda et al. ............... | 349/155 |

FOREIGN PATENT DOCUMENTS

| | | | |
|---|---|---|---|
| EP | 272585 | * | 6/1988 |
| EP | 0 884 626 | | 12/1998 |
| JP | 61-011725 | | 1/1986 |
| JP | 10-239669 | | 9/1998 |
| JP | 11-242225 | | 9/1999 |
| JP | 11-352489 | | 12/1999 |
| JP | 11-352491 | | 12/1999 |
| JP | 11352490 | * | 12/1999 |
| JP | 2000-155317 | | 6/2000 |
| JP | 2000-193976 | | 6/2000 |

\* cited by examiner

*Primary Examiner*—Nathan J. Flynn
*Assistant Examiner*—Ahmed N. Sefer
(74) *Attorney, Agent, or Firm*—Greer, Burns & Crain, Ltd

(57) ABSTRACT

In a liquid crystal display device, liquid crystal molecules are oriented in a vertical direction to the first substrate and the second substrate by the first molecule orientation film and the second molecule orientation film, respectively, in a non-driving state. And, a structural pattern is formed so as to extend in a first direction parallel to a surface of the liquid crystal layer and so as to form, in a driving state, an electric field periodically changing in a second direction that is parallel to the liquid crystal layer and vertical to the first direction. Then, the liquid crystal molecules substantially tilt in the first direction in the driving state.

17 Claims, 64 Drawing Sheets

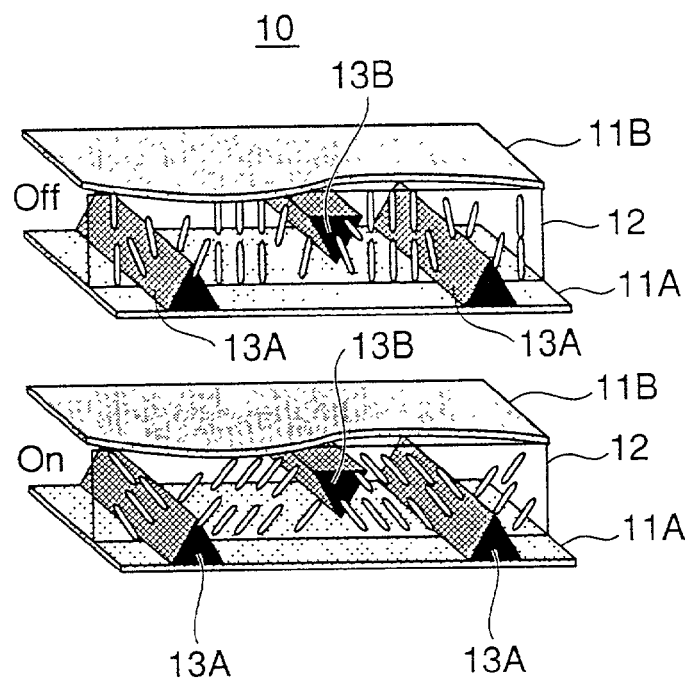
FIG. 1A PRIOR ART
FIG. 1B PRIOR ART
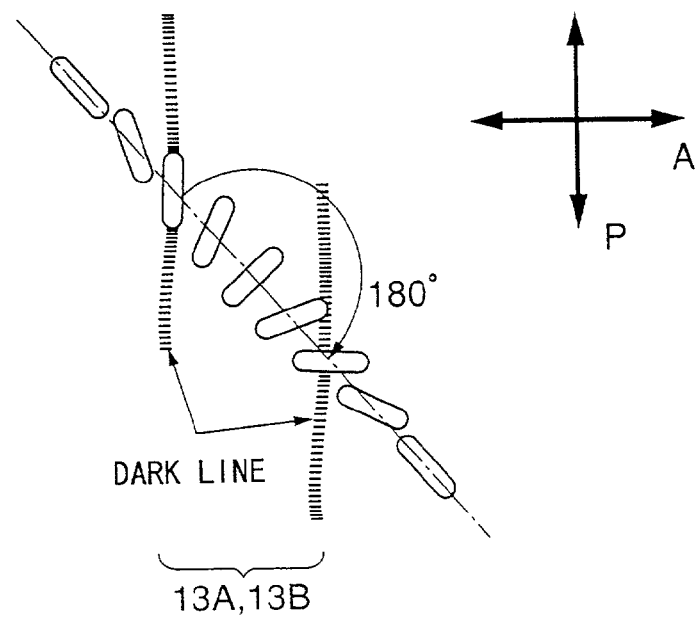
FIG. 2 PRIOR ART

24E

INVENTION

CONVENTIONAL METHOD

LIQUID CRYSTAL DISPLAY DEVICE AND METHOD FOR FABRICATING THE SAME

BACKGROUND OF THE INVENTION

1. Field of the Invention

The present invention generally relates to liquid crystal display devices, and more particularly to a liquid crystal display device applying a vertical orientation mode.

The liquid crystal display device has been widely used for various portable information processing apparatuses, especially, for laptop computers and cellular phones, as a display device that is minimized and requires lower power consumption. Recently, a performance of the liquid crystal display has been dramatically improved to be faster. Thus, recent technology of the liquid crystal display achieving a faster response speed and a clearer contrast is realized to replace a CRT display device of a desktop computer or a workstation computer.

However, such a conventional liquid crystal display is needed to improve the response speed and the contrast in order to be especially applied to a flat display device of a desktop computer. Also, it is required to realize a wider angle of visibility to recognize information displayed on the conventional liquid crystal display device as much as a direct view angle to a front of the conventional liquid crystal display device.

2. Description of the Related Art

Conventionally, as a practical liquid crystal device, a TN-type liquid crystal display device that is normally in white mode has been widely used. In the TN-type liquid crystal display device, an orientation direction of liquid crystal molecules is changed depending on an applied voltage signal. A transmission light is controlled to turn ON or OFF by the change of the orientation direction of the liquid crystal molecules.

However, in the TN-type liquid crystal display device, a ratio of contrast is limited because of an operation principle. Thus, it is difficult to realize the wider view angle that is required for the display device of the desktop computer.

On the contrary, the inventor of the present invention has already proposed a liquid crystal display device are that liquid molecule in a liquid layer is oriented to an approximate vertical direction in advance before a driving voltage is applied, so called a vertical orientation liquid crystal display device.

A principle of a vertical orientation liquid crystal display device 10 that is proposed by the inventor of the present invention, called an MVA type, will now be described. FIG. 1A is a diagram showing a non-driving state in that the driving voltage is not applied to the liquid crystal display device 10 and FIG. 1B is a diagram showing a driving state in that the driving voltage is applied to the liquid crystal display device 10.

Referring to FIG. 1A, a liquid crystal layer 12 is clamped between glass substrates 11A and 11B. The glass substrates 11A and 11B form a liquid panel with the liquid crystal layer 12. Molecule orientation films (not shown) are formed on the glass substrates 11A and 11B. By effects of the molecule orientation film, in the state in which the driving voltage is not applied, the liquid crystal molecules in the liquid crystal layer 12 are oriented in the approximate vertical direction to the liquid crystal layer 12. In the non-driving state in FIG. 1A, because a deflection angle of a deflection plate is not substantially changed, in a case in which a polarizer and an analyzer are provided on a top and a bottom surfaces in a crossed Nicol state, an incident light beam, which transmits through the polarizer and enters the liquid crystal layer 12, is interrupted by the analyzer.

On the other hand, in the driving state in FIG. 1B, the liquid molecules are tilted by influence of the applied electric field. Then, the deflection direction of the deflection plate is changed. As a result, the incident light beam, which transmits through the polarizer and enters the liquid crystal layer 12, transmits through the analyzer.

Moreover, in the liquid crystal display device 10 in FIG. 1A and FIG. 1B, during the transmission from the non-driving state to the driving state, in order to suppress a tilt direction of the liquid crystal molecules and improve the response speed, extended projecting patterns 13A and 13B are alternately formed on the glass substrates 11A and 11B in parallel.

By forming the projection patterns 13A and 13B, the response speed of the liquid crystal display device 10 is improved and simultaneously a plurality of domains are formed in different directions of tilting the liquid crystal molecule in the liquid crystal layer 12. As a result, the view angle of the liquid crystal display device 10 is greatly improved.

FIG. 2 is a diagram showing an orientation state of the liquid crystal molecules in vicinities of the projection patterns 13A and 13B in the driving state in FIG. 1B.

Referring to FIG. 2, the liquid crystal molecules are tilted in the driving state and an angle difference is about 180° between orientation directions of the projections 13A and 13B. That is, the projections 13A and 13B are twisted. In FIG. 2, a polarizer absorbent axis P and an analyzer absorbent axis A are shown.

In liquid crystal display device 10 having the vertical orientation, while the tilted liquid crystal molecules are twisted up to 180°, the orientation of the liquid crystal molecules at one edge of the projection 13A or 13B always corresponds to a direction of the polarizer absorption axis P and the orientation at another edge of the projection 13A or 13B always corresponds to a direction of the analyzer absorption axis A. When such the orientation of the liquid crystal molecules occurs, two dark lines shown in FIG. 2 appear along both edges of the projection 13A or 13B. The two dark lines deteriorate transmittance of a liquid crystal panel and then also, the contrast of liquid crystal display device 10 is deteriorated.

In addition, in the liquid crystal display device 10 shown in FIG. 1A and FIG. 1B, a tilt direction is controlled in the vicinities of the projections 13A and 13B but the tilt direction is not controlled in regions other than the vicinities. As a result, when a state of the liquid crystal display device 10 transits from the non-driving state in FIG. 1A to the driving state in FIG. 1B, the liquid crystal molecules start to be tilted in a given direction at the vicinities of the projections 13A and 13B and then tilt of the liquid crystal molecules at the vicinities propagate the liquid crystal molecules in the regions other than the vicinities. Finally, all liquid crystal molecules are tilted in the given direction. However, the response speed of such tilt propagation takes time. Thus, it is desired to improve the response speed. Especially, when a half tone is displayed by the tilt propagation, the tilt direction of the liquid crystal molecules located far from the projection patterns 13A and 13B is not defined since an electric field applied to the liquid crystal molecules is weak. Consequently, the response speed tends to delay.

Also, in the conventional liquid crystal display device 10 shown in FIG. 1A and FIG. 1B, the projection patterns 13A and 13B are required to be at least 1.2 μm height. However, when the projection patterns having a 1.2 μm height are formed by resist, a retardation of the liquid crystal layer 12 is decreased at the projection patterns 13A and 13B. Also, the decrease of the retardation degrades transmittance of the liquid crystal layer 12.

SUMMARY OF THE INVENTION

It is a general object of the present invention to provide liquid crystal display devices in which the above-mentioned problems are eliminated.

A more specific object of the present invention is to provide a liquid crystal display device that can realize a high contrast performance, a high response speed and a wider view angle.

The above objects of the present invention are achieved by a liquid crystal display device comprising: a first substrate; a second substrate facing the first substrate; a liquid crystal layer sealed between the first substrate and the second substrate; a first electrode formed on the first substrate; a second electrode formed on the second substrate; a first molecule orientation film formed on the first substrate so as to cover the first electrode; a second molecule orientation film formed on the second substrate so as to cover the second electrode; a first polarizing plate provided outside of the first substrate; and a second polarizing plate provided outside of the second substrate in a crossed Nicol state to the first polarizing plate, wherein: in a non-driving state in which a driving voltage is not applied between the first electrode and the second electrode, liquid crystal molecules are oriented in a vertical direction to the first substrate and the second substrate by the first molecule orientation film and the second molecule orientation film, respectively; on the first substrate, a structural pattern is formed so as to extend in a first direction parallel to a surface of the liquid crystal layer and so as to form, in a driving state in which a driving voltage is applied between the first electrode and the second electrode, an electric field periodically changing in a second direction that is parallel to the liquid crystal layer and vertical to the first direction; and the liquid crystal molecules substantially tilt in the first direction in the driving state.

BRIEF DESCRIPTION OF THE DRAWINGS

Other objects, features and advantages of the present invention will become more apparent from the following detailed description when read in conjunction with the accompanying drawings, in which:

FIG. 1A is a diagram showing a non-driving state in that the driving voltage is not applied to the liquid crystal display device 10 and FIG. 1B is a diagram showing a driving state in that the driving voltage is applied to the liquid crystal display device 10;

FIG. 2 is a diagram showing an orientation state of the liquid crystal molecules in vicinities of the projection patterns in the driving state in FIG. 1B;

DESCRIPTION OF THE PREFERRED EMBODIMENTS

Figure 3A:
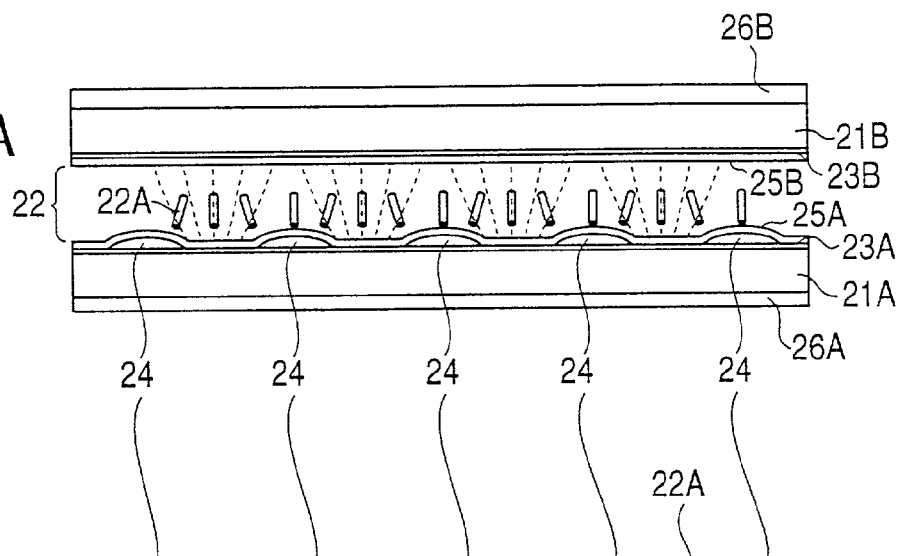
FIG. 3A and FIG. 3B are diagrams for explaining a principle of the present invention.
Figure 3B:
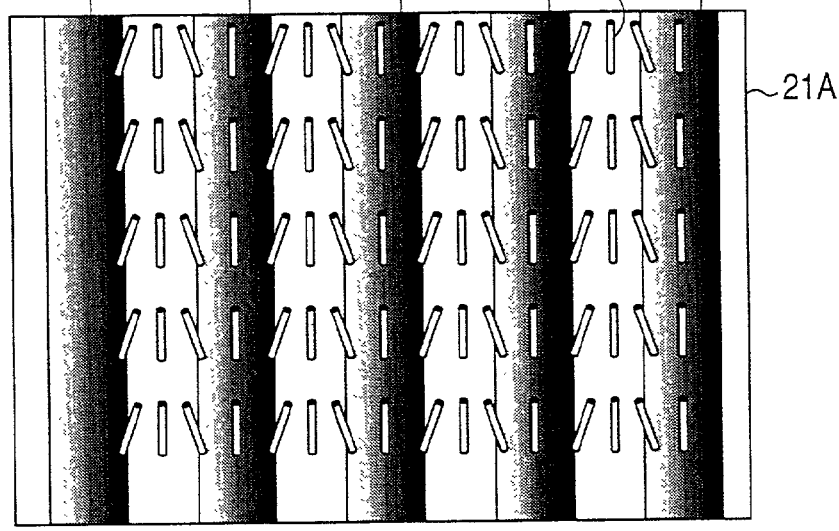
Figure 3B:
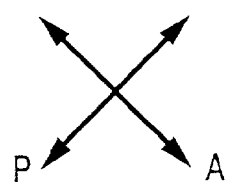

FIG. 3A and FIG. 3B are diagrams for explaining a principle of the present invention.

Referring FIG. 3A, a liquid crystal display device 20 according to the present invention, includes a pair of the glass substrates 21A and 21B. Electrode layers 23A and 23B are formed on the glass substrates 21A and 21B. In addition, micro structural patterns 24 are formed on the glass substrate 21A so as to transform a electric field pattern formed between the electrode layers 23A and 23B on a surface of the electrode layer 23A. Moreover, a molecule orientation film 25A is formed so as to cover the micro structural patterns 24 on the surface of the electrode layer 23A. On the other hand, on the glass substrate 21B, a molecule orientation film 25B is formed so as to cover the electrode layer 23B. The molecule orientation films 25A and 25B contact the liquid layer 22 and the liquid molecules 22A in the liquid layer 22 are regulated in an approximately vertical direction to the surface of the liquid layer 22 in the non driving state in which an electric field is not applied to the electrode layers 23A and 23B.

Furthermore, a polarizer 26A having a first light absorbent axis is formed on a principal plane at bottom of the glass substrate 21A and an analyzer 26B having a second light absorbent axis is formed on a principal plane at bottom of the glass substrate 21B.

Figure 4:
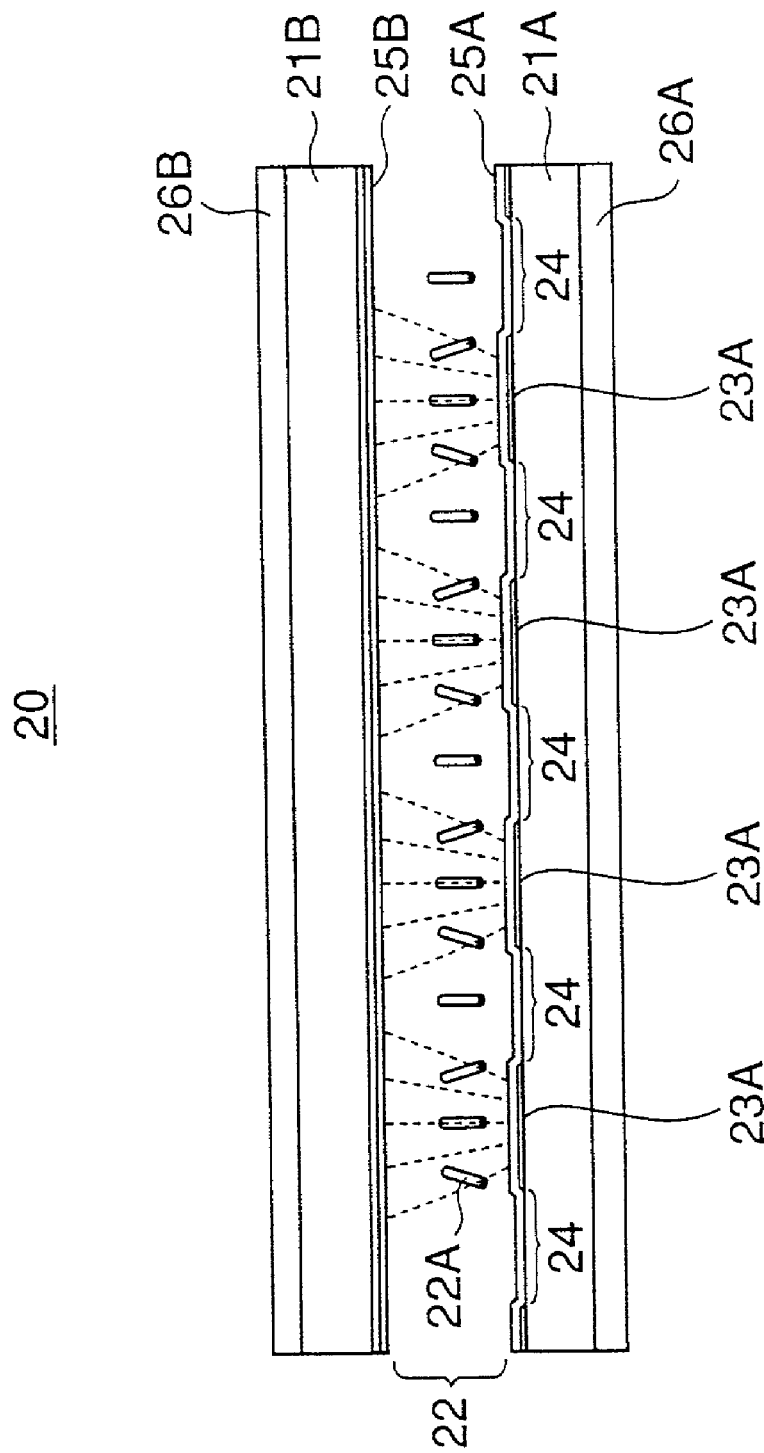
FIG. 4 is a diagram for explaining a principle of the present invention.

The micro structural patterns 24 form a plurality of insulating or conducting micro projection patterns that are alternately formed and extend in parallel on the electrode layer 23A. The micro structural patterns 24 locally transform an electric field in the liquid layer 22. For example, as shown in FIG. 4, the micro structural patterns 24 can be micro concave patterns such as cutout patterns that are formed so as to extend in parallel. In a case in which the micro structural patterns 24 are formed by micro convex patterns, the convex patterns are preferably formed by s transparent material so that a light beam entered the liquid crystal display device 20 transmits through.

In FIG. 3B, orientations of the liquid crystal molecule 22A at the surface of the glass substrate 21A is shown in the driving state of the liquid crystal display device 20 in which the driving voltage is applied to the electrode layers 23A and 23B.

Referring to FIG. 3B, the electric field in the liquid crystal display device 20 according to the present invention is locally transformed by the micro structural pattern 24 in the driving state. Then, the liquid crystal molecules 22A fall down and orients in the extended direction. Therefore, in a case in which the polarizer 26A and the analyzer 26B are arranged so as to have an absorbent axis P and a absorbent axis A as shown in FIG. 3B, the dark lines described in FIG. 2 do not occur.

In the liquid crystal display device 20 according to the present invention, when the driving voltage is applied to between the electrode layer 23A and 23B and a driving electric field is formed in the liquid crystal layer 22, each liquid crystal molecule falls down in the extended direction of the micro structural patterns 24 in response to the driving electric field transformed by the micro structural patterns 24. Differently from the conventional liquid crystal display device in FIG. 1A and FIG. 1B, when the liquid crystal molecules fall down, response speed is greatly improved since the tilt of the liquid crystal molecules does not have to propagate from vicinity regions of the convex patterns 13A and 13B to other regions.

In addition to these advantages, in the liquid crystal display device 20 as shown in FIG. 3B, the orientation direction of each liquid crystal molecule 22A is substantially regulated in the extended direction of the micro structural patterns 24 in the driving state. Since tilted liquid crystal molecules 22A interact, a twist angle of each liquid crystal 22A is not changed in the liquid crystal layer 22. Therefore, it is possible to display at a higher quality of contrast.

When the driving voltage is applied to between the electrode layers 23A and 23B, the micro structural patterns 24A almost evenly form an electric field distribution in a first direction corresponding to the extended direction of the micro structural patterns 24A and periodically form the electric field distribution in a second direction being vertical to the first direction, in the liquid crystal layer 22.

Figure 5:
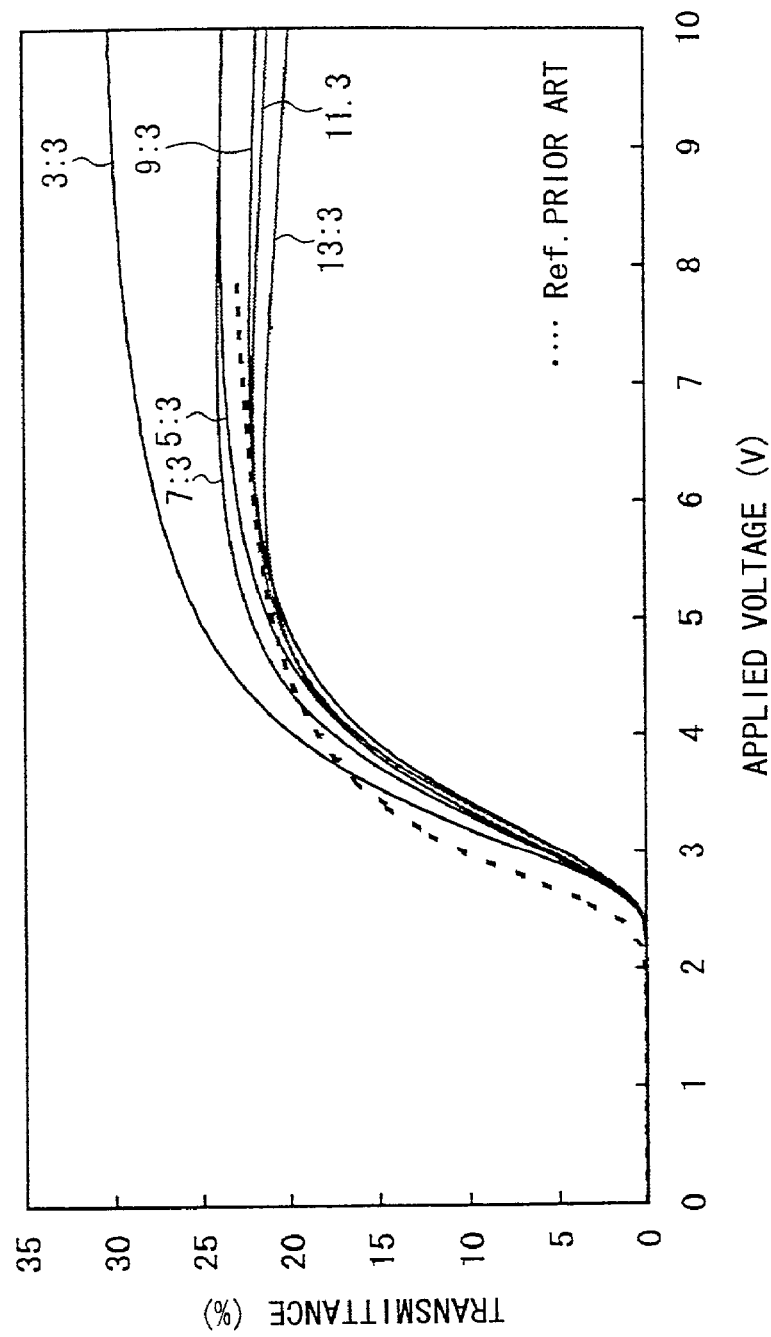
FIG. 5 is a diagram showing experiment results of the liquid crystal display device in FIG. 3A and FIG. 3B.

FIG. 5 is a diagram showing experiment results of the liquid crystal display device in FIG. 3A and FIG. 3B. In FIG. 5, when ratio of a width to an interval of the micro structural pattern 24 is variously changed. In the experiment in FIG. 5, when a thickness of the liquid crystal layer 22 is set to 3.5 μm and the interval between adjacent micro structural patterns 24 is fixed to 3 μm, the width of each micro structural pattern 24 is variously changed. The electrode layers 23A and 23B are uniformly formed by the ITO films.

Referring to FIG. 5, especially, when the width and the interval of the micro structural pattern 24 are 3 μm, that is, the ratio of the width to the interval is 1 to 1, the transmittance close to 30% can be obtained, which transmittance greatly exceeds more than the conventional liquid crystal display device 10 in FIG. 1 and is equal to the transmittance of the TN mode liquid crystal display device. Consequently, in the liquid crystal display device 20, the problem of occurrences of the dark lines described in FIG. 2 is solved. In FIG. 5, in the conventional liquid crystal display device 10 without micro structural patterns 24, the thickness of the liquid crystal layer is set to 3.5 μm and the interval between the projection pattern 13A and 13B is set to 30 μm.

[First Embodiment]

Figure 6:
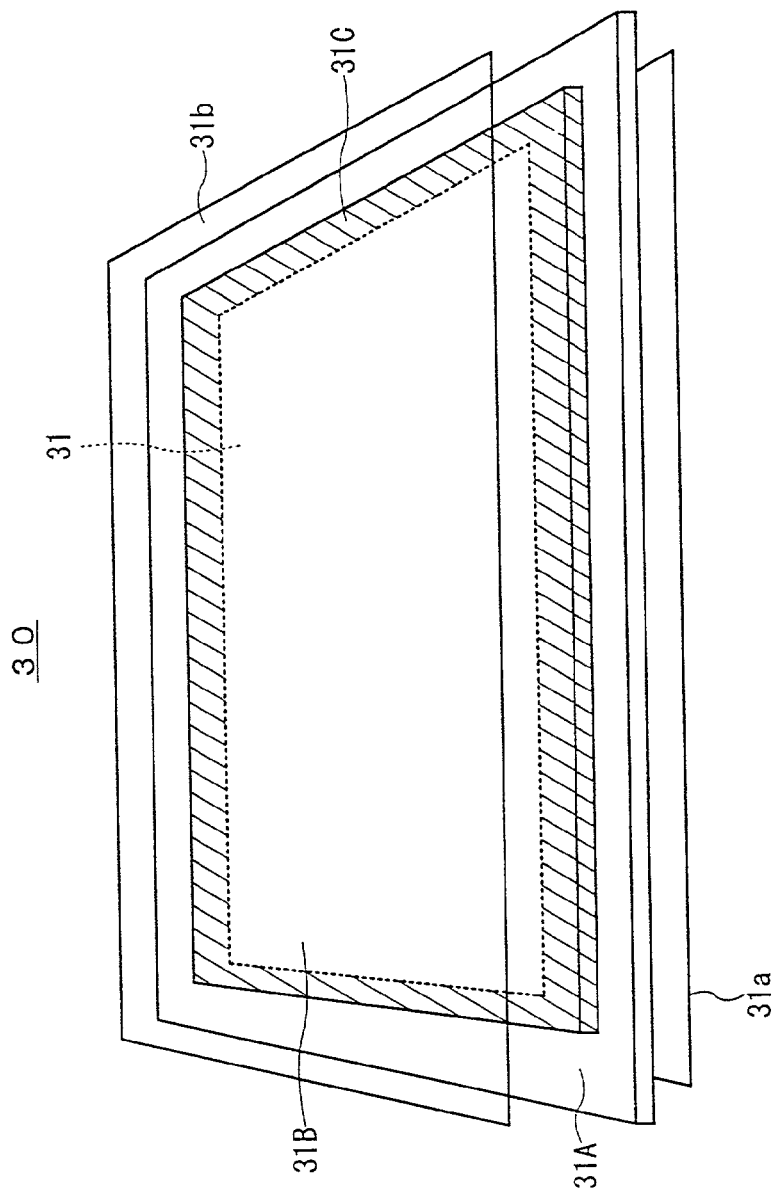
FIG. 6 is a schematic diagram showing a configuration of the liquid crystal display device 30 according to a first embodiment of the present invention.

FIG. 6 is a schematic diagram showing a configuration of a liquid crystal display device 30 according to a first embodiment of the present invention.

Referring to FIG. 6, the liquid crystal display device 30 is an active matrix operation type liquid crystal display device. The liquid crystal display device 30 includes a TFT glass substrate 31A carrying a plurality of thin film transistors (TFTs) and a plurality of transparent pixel electrodes cooperating with the TFTS, corresponding to the electrode layer 23A shown in FIG. 3A or FIG. 4, and a facing glass substrate 31B providing above the TFT glass substrate 31A and carrying facing electrodes corresponding to the electrode layer 23B shown in FIG. 3A or FIG. 4 where a liquid crystal layer 31 is sealed between the TFT glass substrate 31A and the facing glass substrate 31B by a seal member 31C. In the liquid crystal display device 30 in FIG. 6, the transparent pixel electrode is selected and operated through a TFT corresponding thereto and then the orientation of the liquid crystal is selectively changed by corresponding to a selected transparent pixel electrode in the liquid crystal layer 31. Moreover, a polarizer 31a and an analyzer 31b are arranged in the crossed Nicol state outside of the TFT glass substrate 31A and the facing glass substrate 31B. Also, molecule orientation films corresponding to the molecule orientations films 25A and 25B in FIG. 3A or FIG. 4A are formed so as to be adjacent to the liquid crystal layer 31 inside of the TFT glass substrate 31A and the facing glass substrate 31B. In the non-driving state, the orientation direction of the liquid crystal molecules is controlled to be approximately vertical to a surface of the liquid crystal layer 31.

A liquid crystal having a negative inductive factor anisotropy provided by Merck corporation can be used for the liquid crystal layer 31 and a vertical orientation film provided by JSR corporation can be used for the molecule orientation film. As a typical example, the TFT glass substrate 31A and the facing glass substrate 31B are configured by using an appropriate spacer so that a thickness of the liquid crystal layer 31 is approximate 4 μm.

Figure 7A:
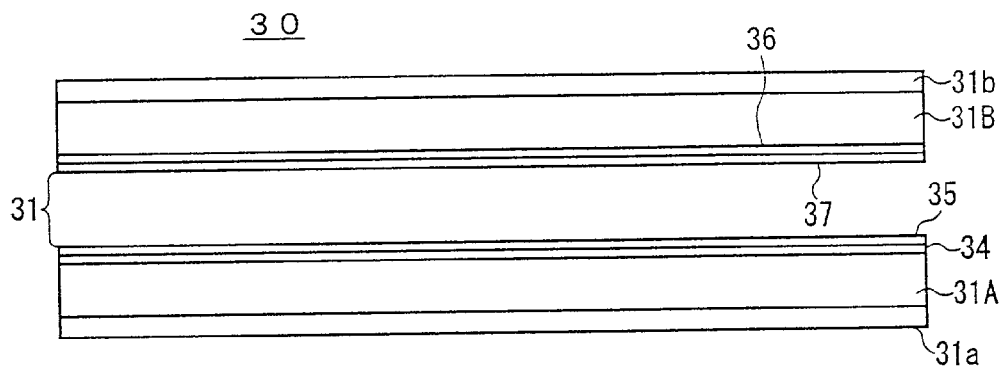
FIG. 7A is a sectional diagram of the liquid crystal display device and FIG. 7B is a diagram showing a magnified part of the TFT glass substrate.
Figure 7B:
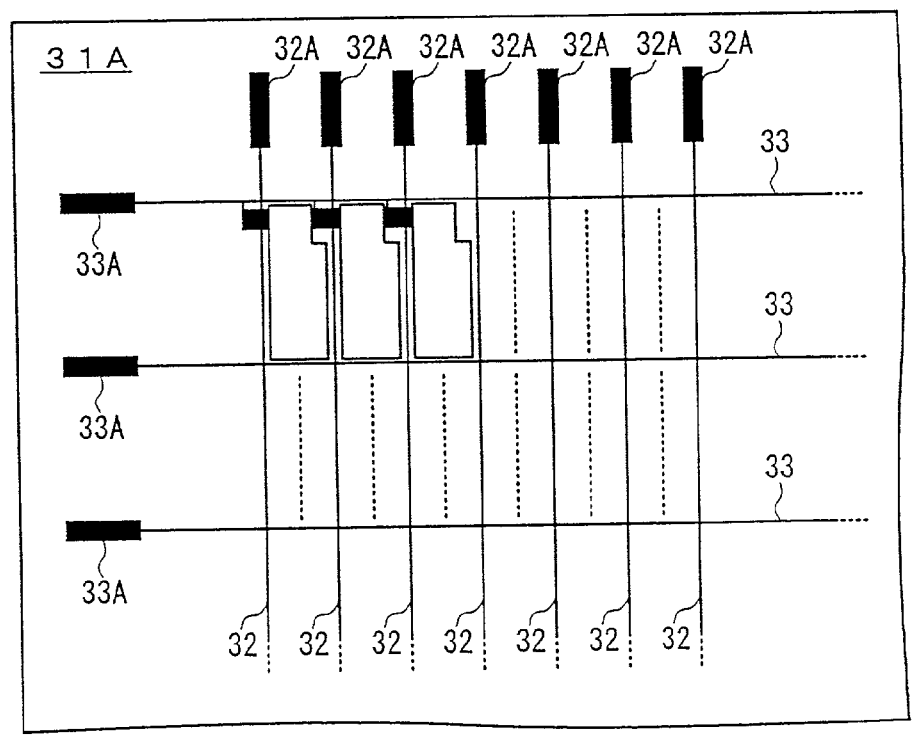

FIG. 7A is a sectional diagram of the liquid crystal display device 30 and FIG. 7B is a diagram showing a magnified part of the TFT glass substrate 31A.

Referring to FIG. 7A, each pixel electrode 34 is electrically connected to a TFT 31T (not shown) and is formed on the TFT glass substrate 31A, which is a bottom side of a TFT substrate. The pixel electrodes 34 are covered with a vertical molecule film 35. Similarly, each facing electrode 36 is uniformly formed on the facing glass substrate 31B, which is a top side of the TFT substrate and the facing electrodes are covered with another molecule orientation film 37. The liquid crystal layer 31 is clamped between the TFT glass substrate 31A and facing glass substrate 31B in an adjacent state by the molecule orientation films 35 and 37.

Figure 8:
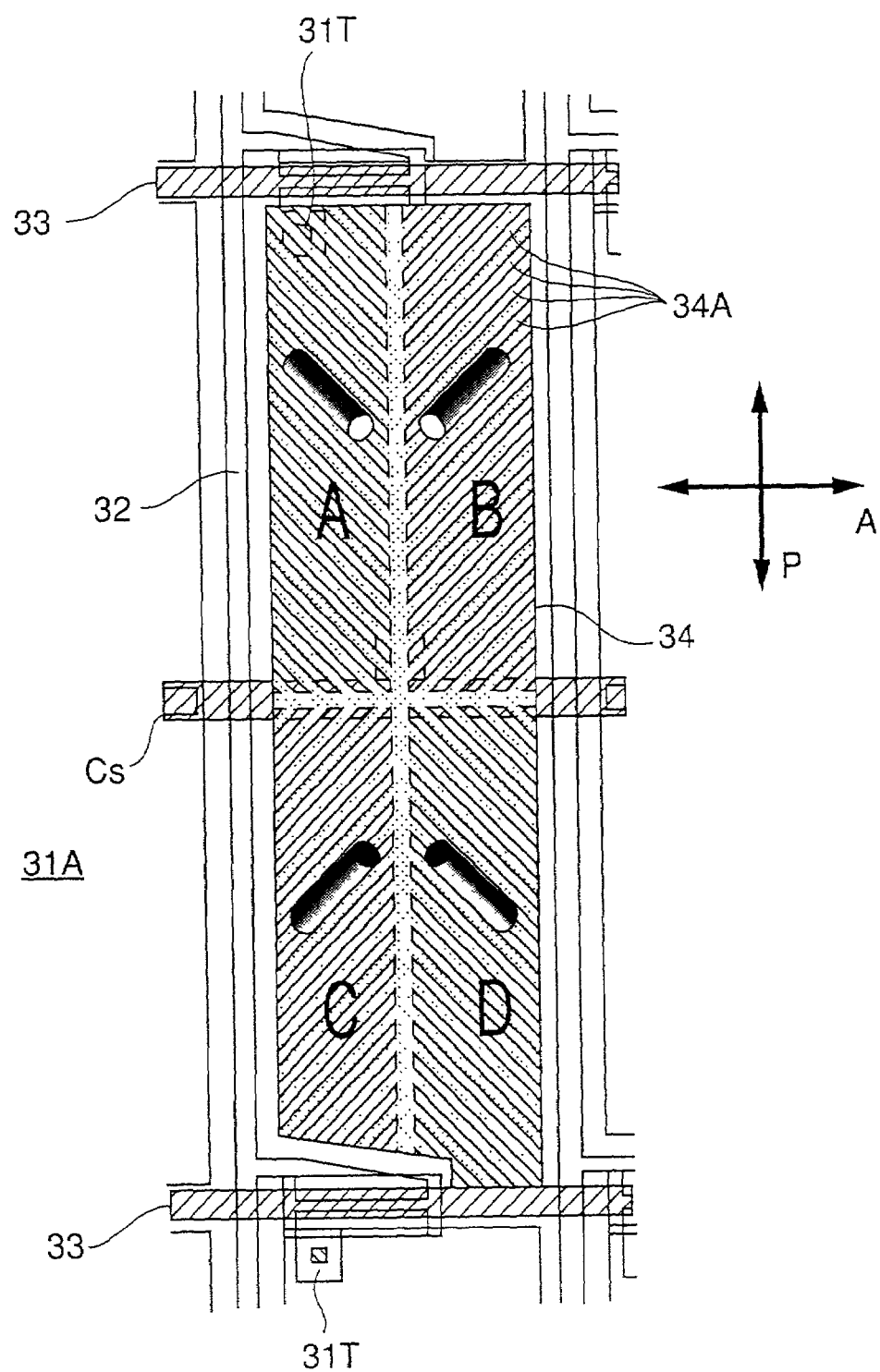
FIG. 8 is a diagram showing a detail configuration of the pixel electrode formed on the TFT glass substrate.

Referring to FIG. 7B, on the TFT glass substrate 31A, a plurality of pad electrodes 33A supplying scan signals and a plurality of scan electrodes 33 extended from the pad electrodes 33A, and a plurality of pad electrodes 32A supplying video signals and a plurality of signal electrodes 32 extended from the pad electrodes 32A are formed so that an extended direction of the scan electrodes 33 and that of the signal electrodes 32 cross each other at approximately a right angle. At each cross point of the scan electrodes 33 and the signal electrodes 32, the TFT 31T in FIG. 8 is formed. Moreover, on the TFT glass substrate 31A, the pixel electrode 34, which is transparent, corresponding to each TFT 31T is formed. Each TFT 31T is selected by the scan signal on each scan electrode 33 corresponding to the TFT 31T. Then, each pixel electrode 34 such as an ITO is operated by a video signal on the signal electrode 32 corresponding to a selected TFT 31T.

A display of the liquid crystal display device 30 is turned "black" by effects of the polarizer 31a and the analyzer 31b since the liquid crystal molecules are approximate vertically oriented to the surface of the liquid crystal layer 31 in the non-driving state in which the driving voltage is not applied to the transparent pixel electrodes 34. And, the display of the liquid crystal display device 30 is turned "white" since the liquid crystal molecules are approximate horizontally oriented in the driving state in which the driving voltage is applied to the transparent pixel electrodes 34.

In FIG. 7A, one or a plurality of phase compensation films can be provided between the TFT glass substrate 31A and the polarizer 31a, and/or between the facing glass substrate 31B and the analyzer 31b. For example, the phase compensation films can be an optically uniaxial phase compensation film where refractive indexes nx and ny inside of the liquid crystal layer 31 are greater than a refractive index nz of a light wave in a proceeding direction.

FIG. 8 is a diagram showing a detailed configuration of the pixel electrode 34 formed on the TFT glass substrate 31A.

Referring to FIG. 8, each signal electrode 32 and each scan electrode 33 cross each other on the TFT glass substrate 31A and the TFT 31T and the pixel electrode 34 are formed at a cross point of each signal electrode 32 and each scan electrode 33. Also, in FIG. 8, an auxiliary capacitance electrode Cs is formed in parallel to the scan electrode 33.

In FIG. 8, the pixel electrode 34 is shown by a dotted area and is sectioned into regions A, B, C and D. On each of the regions A, B, C and D, a plurality of micro-cutout patterns 34A, which are shown in white and correspond to the configuration described in FIG. 4, are extended and formed in parallel.

In a typical example, the micro-cutout pattern 34 is 3 μm to 13 μm in width. For example, the micro-cutout pattern 34 is formed at intervals of approximate 3 μm. The micro-cutout pattern 34 in each of the regions A, B, C and D is formed so that one extended direction of the micro-cutout pattern 34 in one region crosses with another extended direction of the micro-cutout pattern 34 in another region. In this case, in any one of regions A, B, C and D, the extended direction of the micro-cutout pattern 34 is set so as to slantingly cross with the light absorption axis A of the polarizer 31a shown in FIG. 6 and the light absorption axis P of the analyzer 31b shown in FIG. 6.

In the liquid crystal display device 30, when the TFT 31T is activated and the driving voltage is applied to the pixel electrode 34, the liquid crystal molecules in the liquid crystal layer 31 fall down in the extended direction of the micro-cutout pattern 34 as shown in FIG. 8. However, each direction where the liquid crystal molecules fall down in the regions A, B, C and D is different. Therefore, the liquid crystal display device 30 shows a characteristic of a wider visibility angle.

In the driving state of the liquid crystal display device 30 according to the present invention, the liquid crystal molecules are influenced by the electrode field formed by the micro-cutout pattern 34 and periodically changing in a direction of vertically crossing to the extended direction of the pixel electrode 34. Then, the liquid crystal molecules fall down in the extended direction of the micro-cutout pattern 34 without being regulated by a direction where other liquid crystal molecules are tilted. Thus, a change from a vertical orientation state to a horizontal orientation state of the liquid crystal molecules or from the horizontal orientation state to the vertical orientation is speedy. The transition from the non-driving state to the driving state or from the driving state to the non-driving state is conducted at a higher speed. The transition to a half tone state is also conducted at a higher speed. For example, when the liquid crystal layer 31 is 4 μm in thickness and the micro-cutout pattern 34A is 3 μm in width and interval, the transition from the non-driving state (black) to a half tone (¼ gradation) is completed in 70 msec; that is 20 msec shorter than a conventional transition. Also, the transition from black to white is completed in 17 msec; that is 2 msec shorter than the conventional transition.

Furthermore, according to the configuration of FIG. 8, the orientation direction of the liquid crystal molecules is regulated in the driving state. Therefore, the twist angle is not changed by interactions with other liquid crystal molecules and then it is possible to realize an uniformly high quality display.

Figure 9:
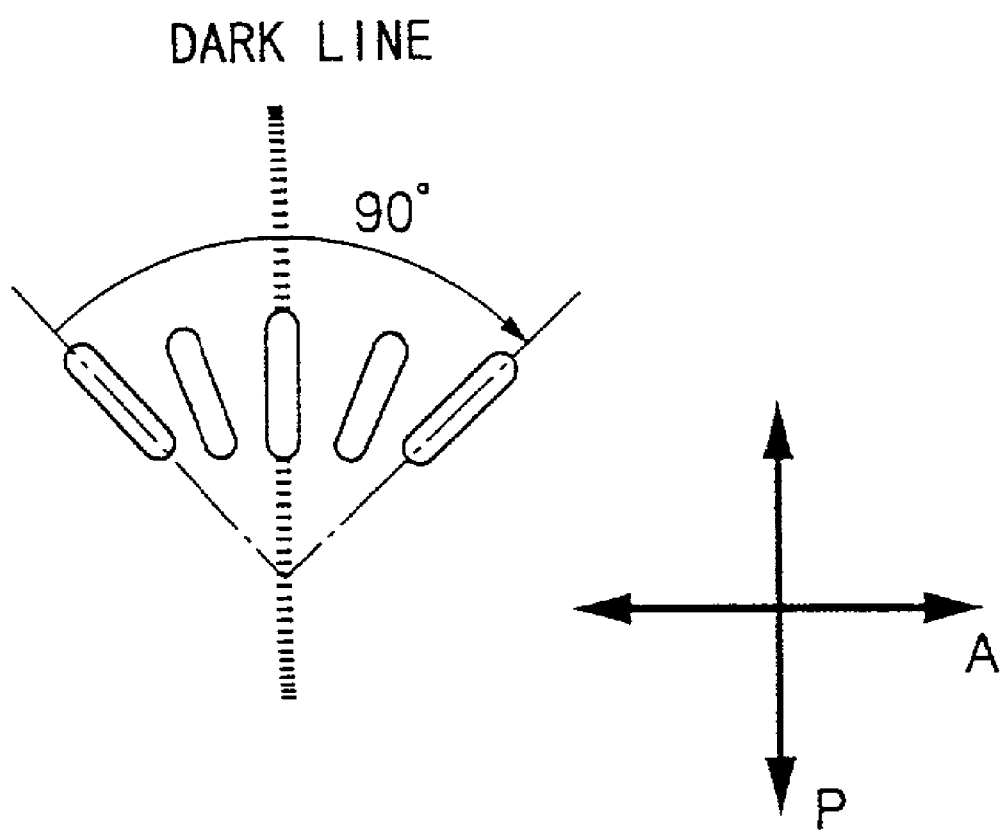
FIG. 9 is a diagram for explaining an operation of the liquid crystal display device.

In the liquid crystal display device 30 including a plurality of domains A, B, C and D that have different orientations in a single pixel electrode 34 as shown in FIG. 8, an orientation direction of the liquid crystal molecules as shown in FIG. 9 changes up to approximate 90° at one border between the domain A and the domain B adjacent to the domain A and at another border between the domain C and the domain D adjacent to the domain C. However, two dark lines do not appear along both edges of a projection pattern as the conventional liquid crystal display device 30. Therefore, the transmittance in the driving state can be greatly improved. In addition, the view angle can be greatly improved by forming domain A, B, C and D, so as to realize a 160° view angle in a vertical direction and a horizontal direction. In details, the transmittance is improved from 4.8% of the conventional liquid crystal display device to 5.6% that is 20% up.

In the configuration in FIG. 8, the dark line appears at the border between the domain A and the domain C and at the border between the domain B and the domain D. However, since these border s are covered with a conductive pattern connected to the auxiliary capacitance electrode Cs, the dark line does not affect the display of the liquid crystal display device 30.

In the liquid crystal display device 30 in the first embodiment, on the pixel electrode 34 instead of the micro-cutout pattern 34A, the micro-projection pattern can be similarly formed by an insulating material or a conducting material. In this case, for example, as an insulating material, a resist pattern such as a positive resist PC 403 that is a product of JSR corporation or the like can be used and an approximate 0.4 μm thickness is preferable. In a case in which the micro-cutout pattern 34A is made up of the insulating material, it is recognized that the transmittance is further improved up to 6.2%. In a case in which micro-cutout pattern 34A is made up of the insulating material, a sectional form of the liquid crystal display device 30 is similar to that of the liquid crystal display device 20 described in FIG. 3A.

Moreover, in the liquid crystal display device 30 in the first embodiment, instead of the micro-cutout pattern 34A, another pattern similar to the micro-cutout pattern 34A can be formed by another transparent conducting material similar to the pixel electrode 34. In this case, in a previous stage of forming the pixel electrode 34, when the TFT 31T is formed, a SiN film used as an insulating protection film for the TFT 31T is patterned and a micro pattern corresponding to the micro-cutout pattern 34A is formed in the pixel electrode 34. Furthermore, an ITO film forming the pixel electrode 34 is layered on the patterned SiN film, so that a conductive micro-cutout pattern 34A can be formed. In this case, an approximate 5.8% of transmittance can be obtained.

Furthermore, another micro-cutout pattern similar to the micro-cutout pattern 34A can be provided while another micro-cutout pattern corresponds to the pixel electrode 34 on the facing glass substrate 31B.

[Second Embodiment]

Next, another liquid crystal display device in that a response speed of a liquid crystal display device 20 or 30 is improved will now be described in a second embodiment of the present invention.

A principle of the second embodiment of the present invention will now be described with reference to FIG. 10.

Figure 10:
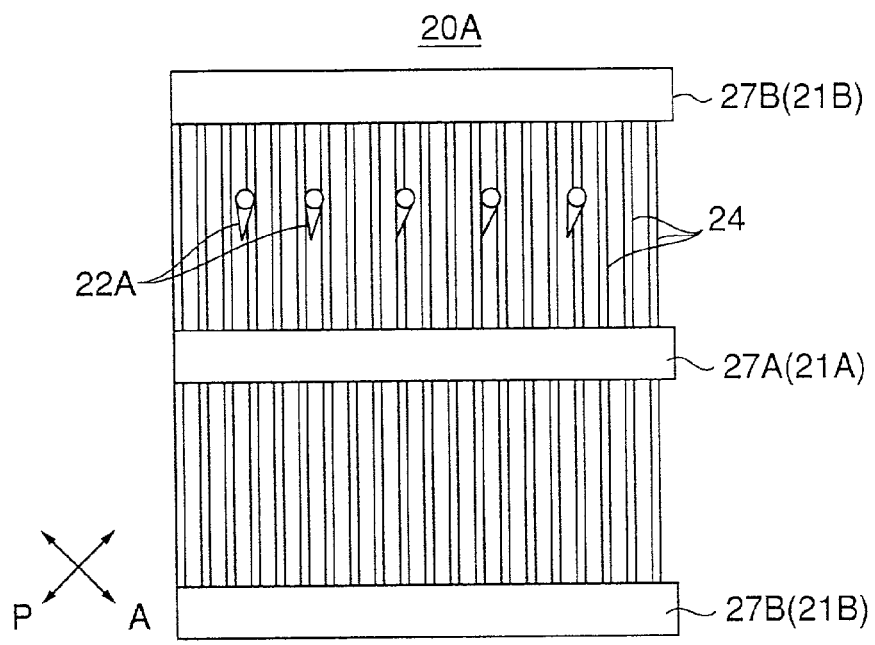
FIG. 10 is a diagram showing the principle of the second embodiment to the present invention.

FIG. 10 is a diagram showing the principle of the second embodiment of the present invention. In FIG. 10, the previous configuration shown in FIG. 3A and FIG. 3B is enhanced to a configuration shown in FIG. 10 and elements that are the same as the ones in previous figures are indicated by the same reference numerals and the explanation thereof will be omitted.

In a liquid crystal display device 20 shown in FIG. 3A and FIG. 3B, when the driving voltage is applied to between the electrode layers 23A and 23B, a direction where the liquid crystal molecules 22A fall down is regulated in an extended direction of the micro structural pattern 24. However, the liquid crystal molecules 22A still have freedom to fall down in one extended direction or an opposite 180° extended direction. Thus, it takes time to determine one of two directions in which the liquid crystal molecules 22A fall down at an initial state of a transition process.

Accordingly, in the second embodiment, as shown in FIG. 1 in the liquid crystal display device 20 in FIG. 3A, the liquid crystal display device 20A is formed so that other rough projection patterns 27A and 27B having a greater pitch and a larger width are formed in another extended direction different from the extended direction of the micro structural pattern 24. FIG. 10, other features of the liquid crystal display device 20A are the same as the previous liquid crystal display devices 20 and 30 and the explanation thereof will be omitted.

Referring to FIG. 10, the rough projection pattern 27A is formed on the substrate 21A and the rough projection pattern 27B is formed on the substrate 21B. The rough projection patterns 27A and 27B regulate a direction in which the liquid crystal molecules 22A fall down to the extended direction of the micro structural pattern 24 when the driving voltage is applied to the electrode layers 23A and 23B. The rough projection patterns 27A and 27B typically correspond to the projection patterns 13A and 13B of the conventional liquid crystal display device 10 and realize the same effect as the projection patterns 13A and 13B. That is, the configuration in FIG. 10 is a configuration in that the projection patterns 13A and 13B in FIG. 1A are formed in a configuration including the micro structural pattern 24 in FIG. 3A. In the configuration in FIG. 10, the extended direction of the micro structural pattern 24 vertically crosses the extended direction of the rough projection patterns 27A and 27B. Similarly to the configuration in FIG. 3A, FIG. 3B or FIG. 4, the extended direction of the micro structural pattern 24 are provided so as to obliquely cross a polarizer absorption axis P of a polarizer 26A or an analyzer absorption axis A of an analyzer 26B.

Figure 11:
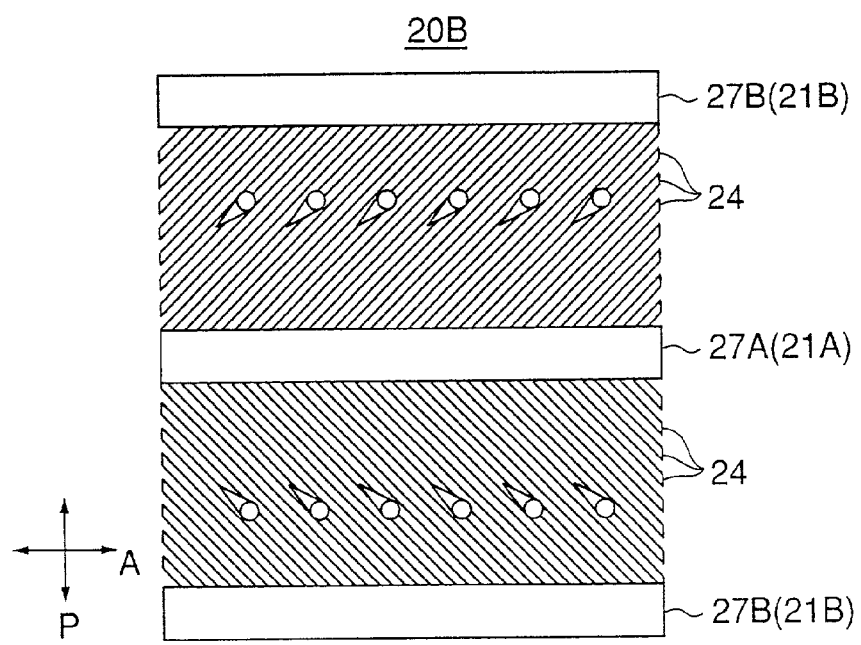
FIG. 11 is a diagram showing another principle as a base of the configuration in FIG. 10, according to the second embodiment of the present invention.

FIG. 11 is a diagram showing another principle as a base of the configuration in FIG. 10, according to the second embodiment of the present invention. In the configuration in FIG. 11, the extended direction of the micro-cutout projection 24 is changed at both sides of the rough projection pattern 27A on the substrate 21A and then the wider view angle is realized. In the configuration in FIG. 11, the extended direction of the micro structural pattern 24 obliquely crosses the extended direction of the projection pattern 27A or 27B. Thus, the polarizer absorption axis P of the polarizer 26A and the analyzer absorption axis A of the analyzer 26B horizontally or vertically cross the extended directions the rough projection patterns 27A and 27B, respectively.

As described above, by combining projecting patterns 13A and 13B with the micro structural pattern 24 according to the present invention, in a case of a transition of the liquid crystal display device 20A from the non-driving state to the driving state, the change of orientation of the liquid crystal molecules is accelerated and then the response speed of the liquid crystal display device 20A is improved.

Figure 12:
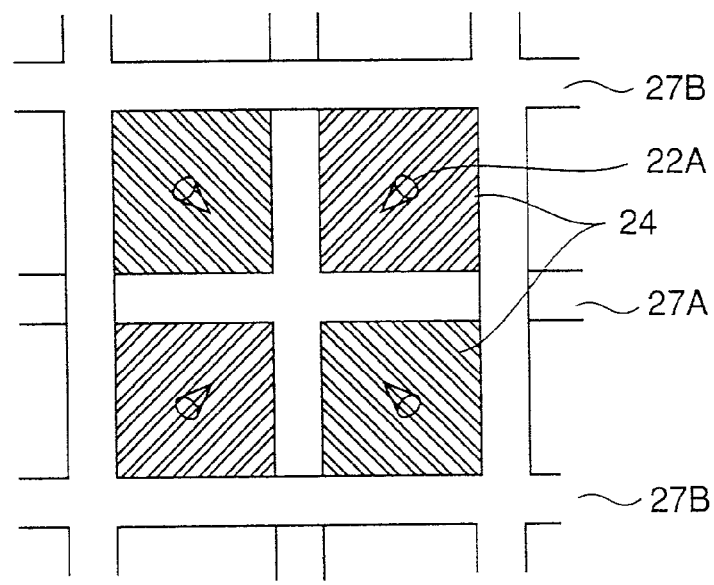
FIG. 12 is diagram showing another principle as a base of the configuration in FIG. 10, according to the second embodiment of the present invention.
Figure 13:
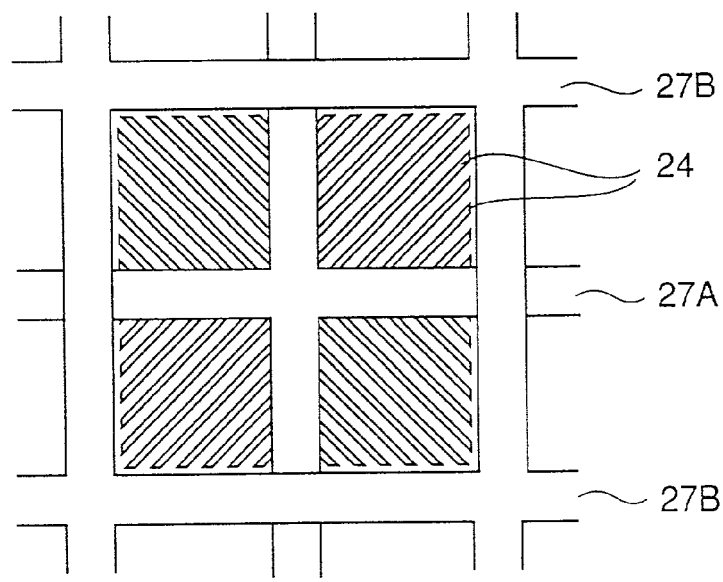
FIG. 13 is diagram showing another principle as a base of the configuration in FIG. 10, according to the second embodiment of the present invention.

FIG. 12 and FIG. 13 are diagrams showing another principle as a base of the configuration in FIG. 10, according to the second embodiment of the present invention. FIG. 12 and FIG. 13 show test pattern configurations used in an experiment in that the inventors of the present invention obtained optimum configuration parameters for the micro structural pattern 24 and the rough projection patterns 27A and 27B. In FIG. 12, the rough projection pattern 27A forms a lattice shape on the substrate 21A and also the rough projection pattern 27B similarly forms a lattice shape while the rough projection pattern 27B is displaced against the rough projection pattern 27A. On the contrary, in FIG. 13, differently from the configuration in FIG. 12, the micro structural pattern 24 on the substrate 21A is not formed right under the rough projection pattern 27A on the substrate 21B. A region formed by the lattice shape of the rough projection pattern 27B is further divided into four domains by the lattice shape of the rough projection pattern 27A and the micro structural pattern 24 is formed in a different orientation in each domain.

FIGS. 14A, 14B, 14C and 14D show results of the experiment by the inventors to evaluate a transmittance in the test pattern configurations shown in FIG. 12 and FIG. 13.

In a liquid crystal display device used in the experiment, the micro structural pattern 24 is 3 μm in thickness and is arranged at intervals of 3 μm in each domain in FIG. 12 or FIG. 13 so as to be the same as the previous embodiments. Moreover, in the experiment, either one of the lattice shaped rough projection patterns 27A and 27B is formed at various intervals and various heights by a resist pattern (LC200; Shipley Far East Corporation) 5 μm in width and then transmittance characteristics of a panel are visually evaluated in the driving state, that is, in a state in which the driving voltage 5V is applied to between the electrode layers 23A and 23B.

Figure 14A:
FIG. 14A through 14D are diagrams showing experiment results of the liquid crystal display device in FIG. 12 and FIG. 13.
Figure 14B:
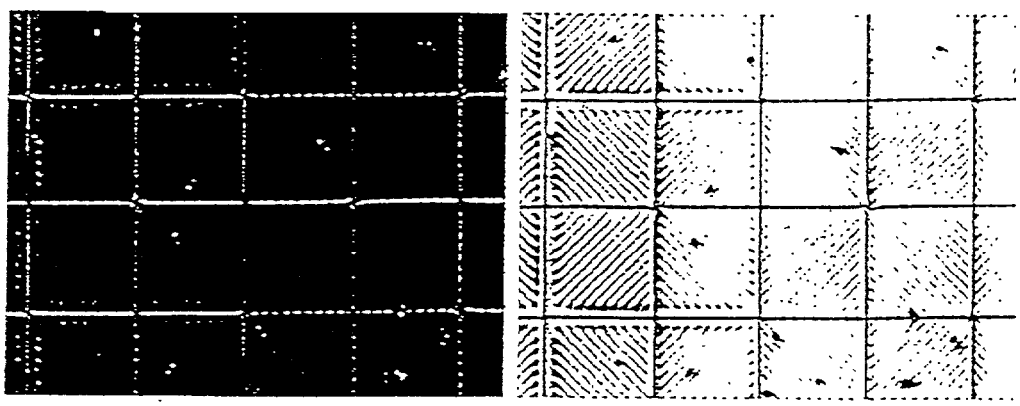
Figure 14C:
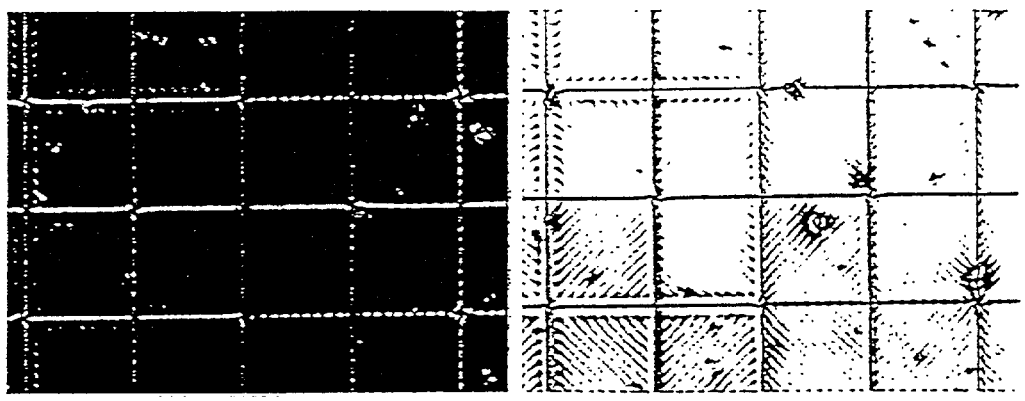
Figure 14D:
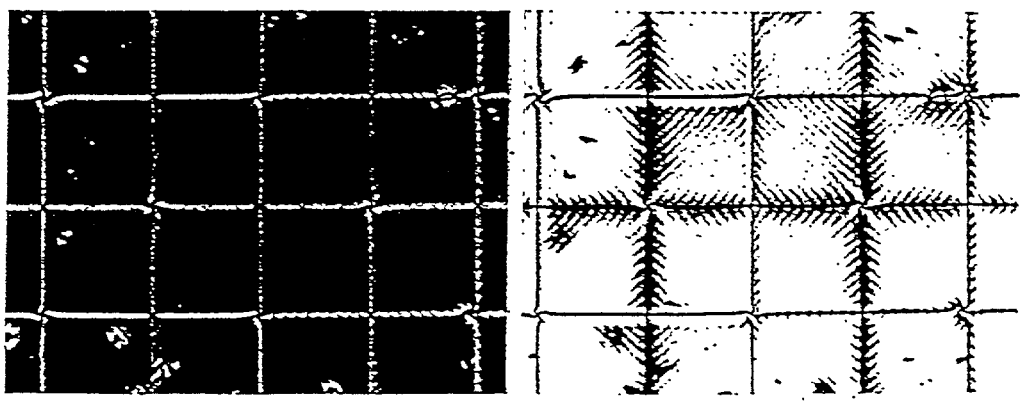

In the experiment, FIG. 14A shows a result in a case in which the rough projection patterns 27A and 27B are formed in 0.95 μm height, FIG. 14B shows a result in a case in which the rough projection patterns 27A and 27B are formed in 0.75 μm height. FIG. 14C shows a result in a case in which the rough projection patterns 27A and 27B are formed in 0.5 μm height. FIG. 14D shows a result in a case in which the rough projection patterns 27A and 27B are formed in 0.3 μm height. In FIG. 14A, 14B, 14C and 14D, a left side picture shows a case in which the orientation directions of the polarizer 26A and the analyzer 26B correspond to the extended direction of the micro structural pattern 24, respectively, that is, shows a case in which the orientation directions of the polarizer 26A and the analyzer 26B correspond to a tilt direction of the liquid crystal molecules 22A. On the other hand, a right side picture shows a case in which the orientation directions of the polarizer 26A and the analyzer 26B correspond to the extended directions of the rough projection patterns 27A and 27B, respectively. In each diagram of FIG. 14A, 14B, 14C and 14D, two pictures on the right side correspond to the test pattern configuration in FIG. 11 and two pictures on the left side correspond to the test pattern in FIG. 12.

In each diagram in FIG. 14A, 14B, 14C and 14D, the rough projection patterns 27A and 27B are arranged at intervals of 80 µm. As results of FIG. 14A, 14B, 14C and 14D, when the rough projection patterns 27A and 27B have improper heights, the orientation of the liquid crystal molecules is improperly determined along the micro structural pattern 24 and then the dark line appears. Results of configurations in FIG. 14A, 14B, 14C and 14D show a preferable case in which the vertical orientation liquid crystal of Merck Corporation as a liquid crystal layer 22 is combined with the vertical molecule orientation films 25A and 25B of JSR corporation and the liquid crystal layer 22 is 4 µm in thickness.

Regarding the results of FIG. 14A, 14B, 14C and 14D, it is summarized that for the most preferable display quality, that is, the least defect display quality, can be obtained in a case in which the rough projection patterns 27A and 27B are 0.75 µm or 0.5 µm in height as shown in FIG. 14B or FIG. 14C. In addition, in each diagram shown in FIG. 14A, 14B, 14C and 14D, compared a configuration 20C in FIG. 11 with a configuration 20D in FIG. 12, the configuration 20C in FIG. 11 is superior in display quality and approximate 4% higher in transmittance.

Moreover, first, the response speed of the configuration 20C in FIG. 12 or the configuration 20D in FIG. 13, in which the transmittances are superior, is compared with that of the conventional liquid crystal display device 10 described in FIG. 1A and FIG. 1B. In a case in which the interval of the projection pattern 13A or 13B in the conventional liquid crystal display device 10 is set to 20 µm, the transition from the black state (non-driving state) to the white state (driving state) requires 104 msec. On the other hand, in the second embodiment, as a result of combining the rough projection patterns 27A and 27B with the micro structural pattern 24, it can be recognized that the required time is reduced to 71 msec and the response speed is greatly improved. Furthermore, in the liquid crystal display device 20C or 20D, in a case in which both intervals of the rough projection patterns 27A and 27B are determined as 30 µm, the transition from the black state to the white state requires 470 msec. Compared with a case in which the projection patterns 13A and 13B are arranged at the same interval in the liquid crystal display device 10 in this case, the response time is 640 msec. Consequently, it is possible to greatly improve the response time in the configuration 20C or 20D.

Figure 15:
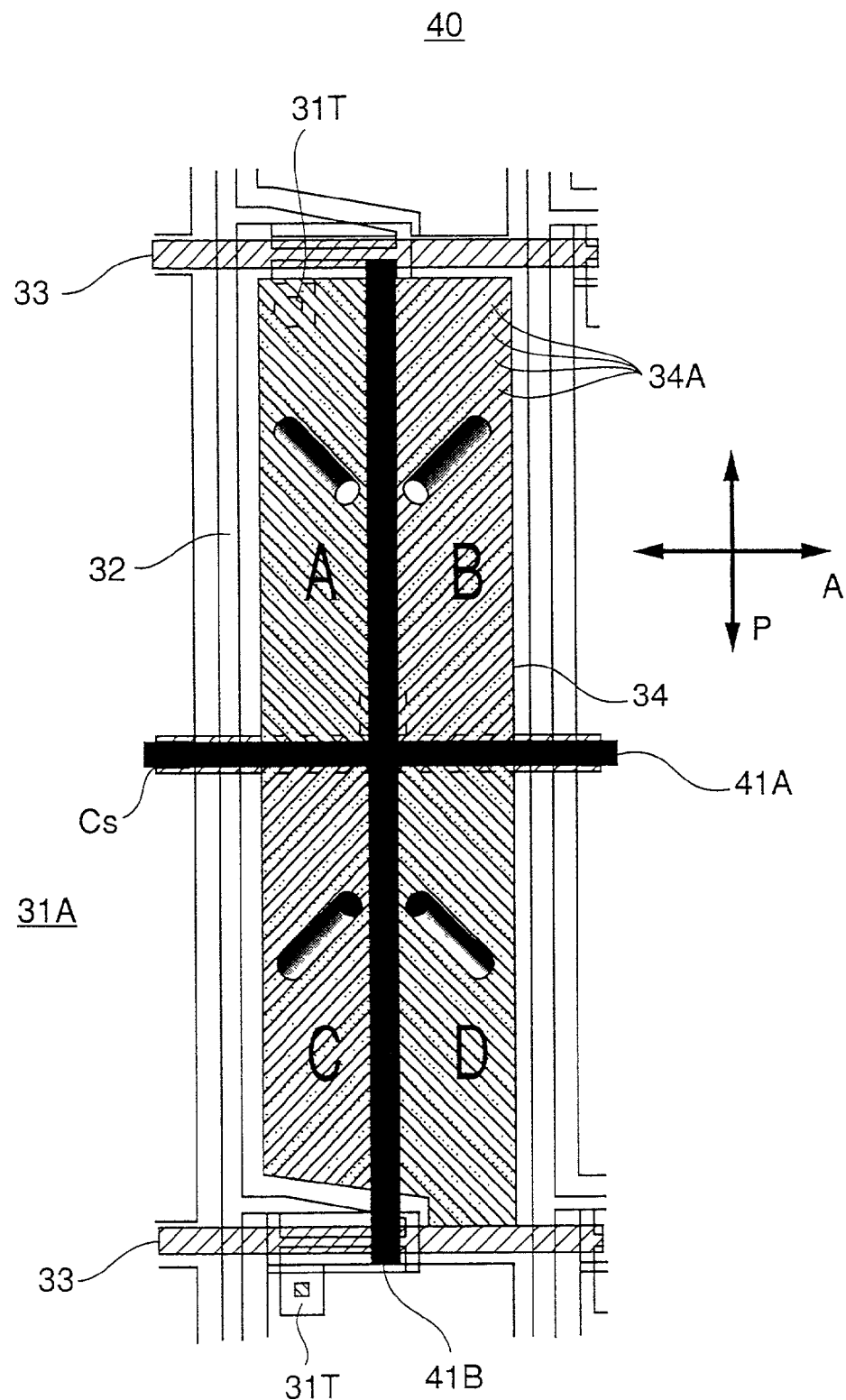
FIG. 15 is a diagram showing another liquid crystal display device 40 based on the principle previously described, according to the second embodiment of the present invention.

FIG. 15 is a diagram showing another liquid crystal display device 40 based on the principle previously described, according to the second embodiment of the present invention. In FIG. 15, parts that are the same as the ones in previous figures are indicated by the same reference numerals and the explanation thereof will be omitted.

Referring to FIG. 15, the same pattern as that in FIG. 8 is formed as the pixel electrode 34 on the glass substrate 31A of the liquid crystal display device 40 and the pixel electrode 34 is shown by a dotted area similar to that in FIG. 8.

In the second embodiment, furthermore, lattice shaped rough project patterns 41A and 41B are repeated to form in the scan electrode direction or the signal electrode direction at pitch intervals of the pixel electrode 34. Accordingly, in FIG. 15, the lattice shaped rough projection patterns 41A and 41B are formed so as to fit to the domains A through D. On the other hand, similarly to the micro structural pattern 24 in FIG. 12 or FIG. 13, the micro-cutout pattern 34A having a 3 µm width is formed at intervals of 3 µm at a 45° angle in each of domains A through D.

The rough projection patterns 41A and 41B are the same projection shape as the projection patterns 13A and 13B of the conventional liquid crystal display device 10. For example, when the liquid crystal display device 40 is a liquid crystal display device in which a 15 inch display of 1024× 768 pixels is available and the rough projection pattern 41B is formed at intervals of 99 µm.

It should be noted that the rough projection patterns 41A and 41B are not limited to a projection pattern made up of a resist or a conducting pattern but can be a concave pattern such as a cutout pattern or in an electrode layer.

[Third Embodiment]

A liquid crystal display device in that the response speed of the liquid crystal display device 20 or 30 is further improved will now be described according to a third embodiment of the present invention.

First, a principle of the third embodiment will now be described with reference to FIG. 16.

Figure 16:
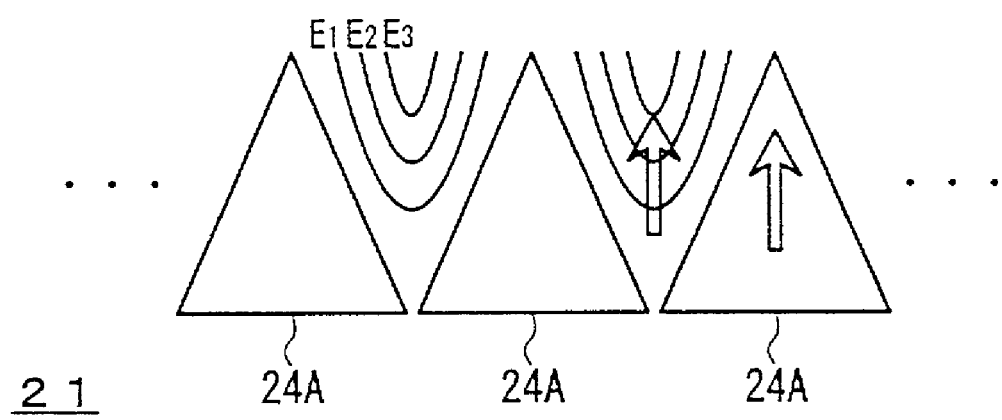
FIG. 16 is a diagram showing a substrate of the liquid crystal display device according to a third embodiment of the present invention.

FIG. 16 is a diagram showing a substrate of the liquid crystal display device according to the third embodiment of the present invention. In FIG. 16, an example of a directional pattern 24A formed on the glass substrate 21A in FIG. 3A is shown.

Referring to FIG. 16, the directional pattern 24A is a triangle insulating or conducting pattern. In a case in which the directional pattern 24A instead of the micro structural pattern 24 periodically formed in the liquid crystal display device 20 in FIG. 3A is formed, an electric field is locally transformed in the liquid crystal layer 22 as shown by contour lines in FIG. 16. Then, an electric field distribution inclined toward a pointed edge of the directional pattern 24A is formed.

Thus, if such a directional pattern 24A is formed in the liquid crystal display device 20, instead of forming the micro structural pattern 24, the liquid crystal molecules 22A are tilted toward the pointed edge of the directional pattern 24A along an inclination formed by the directional pattern 24A when the driving voltage is applied to between the electrode layers 23A and 23B.

A Table 1 shows a result of research into orientations of the liquid crystal molecules in that the directional pattern 24A being triangular instead of the micro structural pattern 24 is formed by resist patterns being of various shapes, that is, having different widths, different lengths and different heights. In Table 1, a numerical value is shown in a µm unit.

TABLE 1

| Width | Length | Height | Orientation Degree Toward Axis Direction |
|---|---|---|---|
| 3 | 10 | 0.3 | ○ |
|  |  | 0.8 | ○ |
|  | 15 | 0.3 | ○ |
|  |  | 0.8 | ○ |
|  | 20 | 0.3 | ○ |
|  |  | 0.8 | ⊙ |

TABLE 1-continued

| Width | Length | Height | Orientation Degree Toward Axis Direction |
|---|---|---|---|
|  | 30 | 0.3 | ⊚ |
|  |  | 0.8 | ⊚ |
| 5 | 10 | 0.3 | ○ |
|  |  | 0.8 | ○ |
|  | 15 | 0.3 | ○ |
|  |  | 0.8 | ○ |
|  | 20 | 0.3 | ○ |
|  |  | 0.8 | ⊚ |
|  | 30 | 0.3 | ⊚ |
|  |  | 0.8 | ⊚ |
| 7.5 | 10 | 0.3 | Δ |
|  |  | 0.8 | Δ |
|  | 15 | 0.3 | Δ |
|  |  | 0.8 | ○ |
|  | 20 | 0.3 | Δ |
|  |  | 0.8 | ○ |
|  | 30 | 0.3 | ○ |
|  |  | 0.8 | ⊚ |
| 10 | 10 | 0.3 | X |
|  |  | 0.8 | X |
|  | 15 | 0.3 | X |
|  |  | 0.8 | Δ |
|  | 20 | 0.3 | X |
|  |  | 0.8 | Δ |
|  | 30 | 0.3 | Δ |
|  |  | 0.8 | ○ |
| 15 | 10 | 0.3 | X |
|  |  | 0.8 | X |
|  | 15 | 0.3 | X |
|  |  | 0.8 | X |
|  | 20 | 0.3 | X |
|  |  | 0.8 | X |
|  | 30 | 0.3 | Δ |
|  |  | 0.8 | Δ |
| 20 | 10 | 0.3 | X |
|  |  | 0.8 | X |
|  | 15 | 0.3 | X |
|  |  | 0.8 | X |
|  | 20 | 0.3 | X |
|  |  | 0.8 | X |
|  | 30 | 0.3 | X |
|  |  | 0.8 | X |

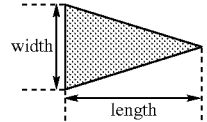

⊚: almost completely tilted toward axis direction
○: edge is tilted toward a slightly different direction; but almost tilted toward axis direction
Δ: tilted toward axis direction in half of region
X: tilted toward axis direction in less than half of region In the table 1, if a case, in which the orientation direction is different only in a vicinity of each side of the directional pattern 24A being triangular, is included to a desired orientation state, it is preferable that the width of the directional pattern 24A, that is, a length of a bottom side is set to be less than 10 μm. On the other hand, a preferable orientation is realized when the length of the directional pattern 24A is a range of 10 μm through 30 μm. However, when the width is 7.5 μm, the length is required to be more than 15 μm, and when the width is 10 μm, the length is required to be more than 30 μm. When the width of the directional pattern 24A exceeds 10 μm, a ratio of the liquid crystal molecules orienting toward other than the pointed edge of the directional pattern 24A, is increased.

Similarly to a previous case shown in FIG. 4, the directional pattern 24A being triangular can also be a concave pattern such as a cutout pattern in the electrode layer 23A.

Figure 18:
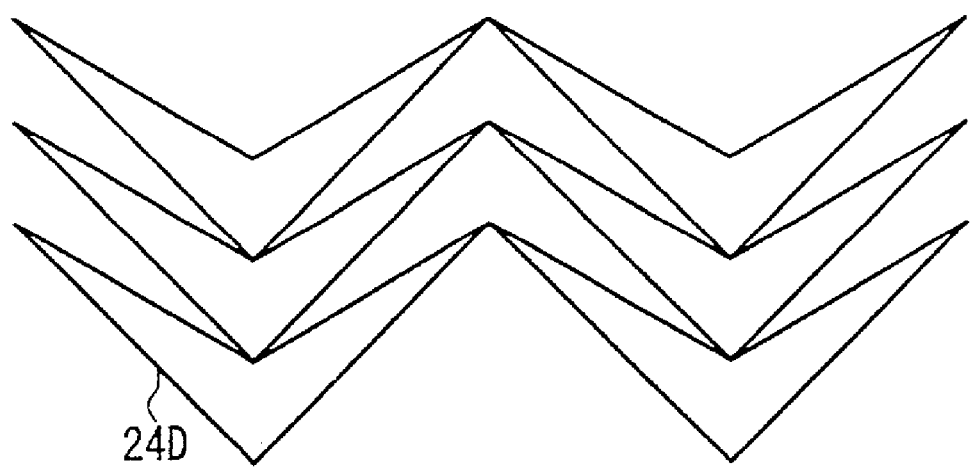
FIG. 18 is a diagram for explaining another principle of a liquid crystal display device according to the third embodiment of the present invention.
Figure 19:
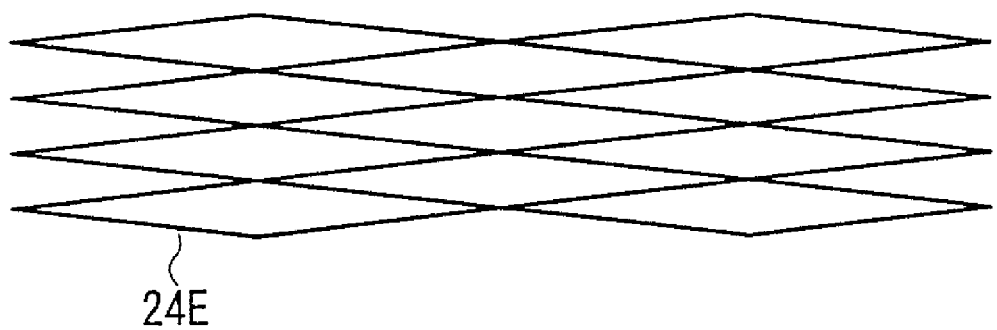
FIG. 19 is a diagram for explaining another principle of a liquid crystal display device according to the third embodiment of the present invention.

Such a directional pattern is not limited to the directional pattern 24A being triangular shown in FIG. 16, but the top edge of the directional pattern can be an edge of the directional pattern 24B which edge is cut out or an edge of the directional pattern 24C which edge is rounded. Moreover, as shown in FIG. 18, a directional pattern 24D in which two triangles are rotated at 90 degree, respectively, and are joined to each other, can realize the same effect as the directional pattern 24A. As shown in FIG. 19, a directional pattern 24E in which two triangles are rotated at 180 degree, respectively, and are joined to each other to become rhombic shape, can also realize the same effect as the directional pattern 24A.

Particularly, in the directional pattern 24E being a rhombic shape in FIG. 19, the liquid crystal molecules tilt to a right side or a left side against a center of the directional pattern 24E.

In the table 1, in a case in which the micro-cutout projection pattern is made up of an electrode pattern (slit), instead of a convex structured object, a tilted direction of the liquid crystal molecules is reversed. However, the micro-cutout projection pattern made up of an electrode pattern has an almost equal effect as a convex structured object having 0.8 μm height since a strain of the electrode field is stronger toward the orientation degree of an axis direction.

Table 2 shows a result of research into orientations of the liquid crystal molecules in that the directional pattern 24E being a rhombus is formed by resist patterns being of various shapes, that is, having different widths, different lengths and different heights. In Table 1, a numerical value is shown in a μm unit.

TABLE 2

| Width | Length | Height | Orientation Degree Toward Axis Direction |
|---|---|---|---|
| 3 | 20 | 0.3 | ○ |
|  |  | 0.8 | ○ |
|  | 30 | 0.3 | ○ |
|  |  | 0.8 | ○ |
|  | 40 | 0.3 | ○ |
|  |  | 0.8 | ⊚ |
|  | 60 | 0.3 | ⊚ |
|  |  | 0.8 | ⊚ |
| 5 | 20 | 0.3 | ○ |
|  |  | 0.8 | ○ |
|  | 30 | 0.3 | ○ |
|  |  | 0.8 | ○ |
|  | 40 | 0.3 | ○ |
|  |  | 0.8 | ⊚ |
|  | 60 | 0.3 | ⊚ |
|  |  | 0.8 | ⊚ |
| 7.5 | 20 | 0.3 | Δ |
|  |  | 0.8 | Δ |
|  | 30 | 0.3 | Δ |
|  |  | 0.8 | ○ |
|  | 40 | 0.3 | ○ |
|  |  | 0.8 | ○ |
|  | 60 | 0.3 | ○ |
|  |  | 0.8 | ⊚ |
| 10 | 20 | 0.3 | X |
|  |  | 0.8 | X |
|  | 30 | 0.3 | X |
|  |  | 0.8 | Δ |
|  | 40 | 0.3 | Δ |
|  |  | 0.8 | Δ |

TABLE 2-continued

| Width | Length | Height | Orientation Degree Toward Axis Direction |
|---|---|---|---|
|  | 60 | 0.3 | ◎ |
|  |  | 0.8 | ◎ |
| 15 | 20 | 0.3 | X |
|  |  | 0.8 | X |
|  | 30 | 0.3 | X |
|  |  | 0.8 | X |
|  | 40 | 0.3 | X |
|  |  | 0.8 | X |
|  | 60 | 0.3 | Δ |
|  |  | 0.8 | Δ |
| 20 | 20 | 0.3 | X |
|  |  | 0.8 | X |
|  | 30 | 0.3 | X |
|  |  | 0.8 | X |
|  | 40 | 0.3 | X |
|  |  | 0.8 | X |
|  | 60 | 0.3 | X |
|  |  | 0.8 | X |

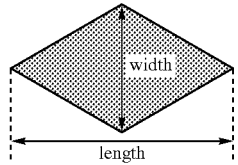

◎: almost completely tilted toward axis direction
○: edge is tilted toward a slightly different direction; but almost tilted toward axis direction
Δ: tilted toward axis direction in half of region
X: tilted toward axis direction in less than half of region Referring to Table 2, if a case, in which the orientation direction is different only in a vicinity of each side of the directional pattern 24E being a rhombus, is included to a desired orientation state, it is preferable that the width of the directional pattern 24E, that is, a length of a bottom side is set to be less than 10 μm. On the other hand, a preferable orientation is realized when the length of the directional pattern 24E is in a range of 20 μm through 60 μm.

Also, in Table 2, in a case in which the micro-cutout projection pattern is made up of an electrode pattern (slit), instead of a convex structured object, a tilted direction of the liquid crystal molecules is reversed. However, the micro-cutout projection pattern made up of an electrode pattern has an almost equal effect a convex structured object having 0.8 μm height since a strain of the electrode field is stronger toward the orientation degree of an axis direction.

Figure 20:
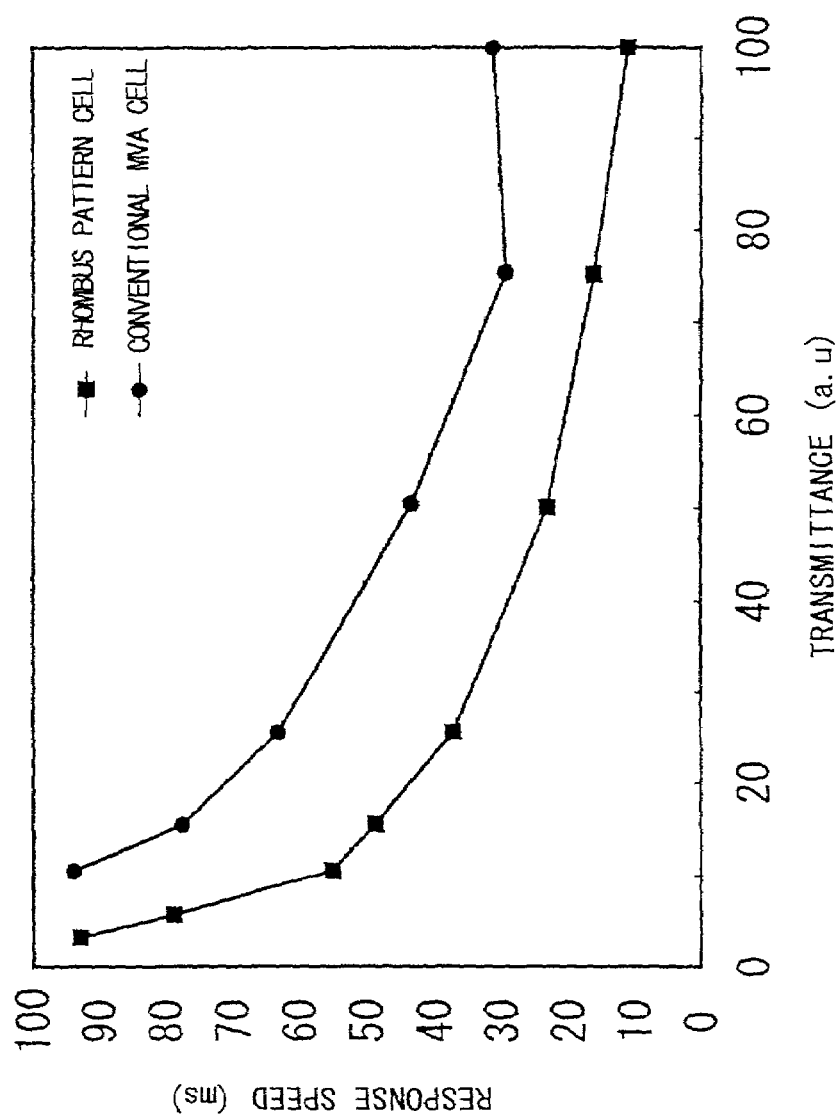
FIG. 20 is a diagram showing an operational characteristic of the liquid crystal display device according to the third embodiment of the present invention.

FIG. 20 is a diagram showing an operational characteristic of the liquid crystal display device according to the third embodiment of the present invention. In FIG. 20, a relationship between a transmittance and a response speed is shown in a case in which the liquid layer 22 of the liquid crystal display device 20 is 4 μm in thickness and the directional pattern 24E being a rhombus is formed by a resist pattern being 70 μm in length, 10 μm in width and 0.4 μm in thickness. It should be noted that the transmittance is defined 100% where the driving voltage is 5.4V in FIG. 20. Also, in the conventional liquid crystal display device 10 in FIG. 1A and FIG. 1B, the projection patterns 13A and 13B are formed at intervals of 10 μm by a resist pattern being 10 μm in width and 1.5 μm in height and other specifications for the conventional liquid crystal display device 10 are the same as those of the liquid crystal display device 20 used in the experiment. In FIG. 20, another relationship between the transmittance and the response speed in this case of the liquid crystal display device 10 is shown for a comparison.

Referring to FIG. 20, in the liquid crystal display device 20 according to the third embodiment, under the same transmittance, the response speed is substantially shortened in a case including the half tone display mode where the driving voltage less than 5.4V is applied.

Figure 21:
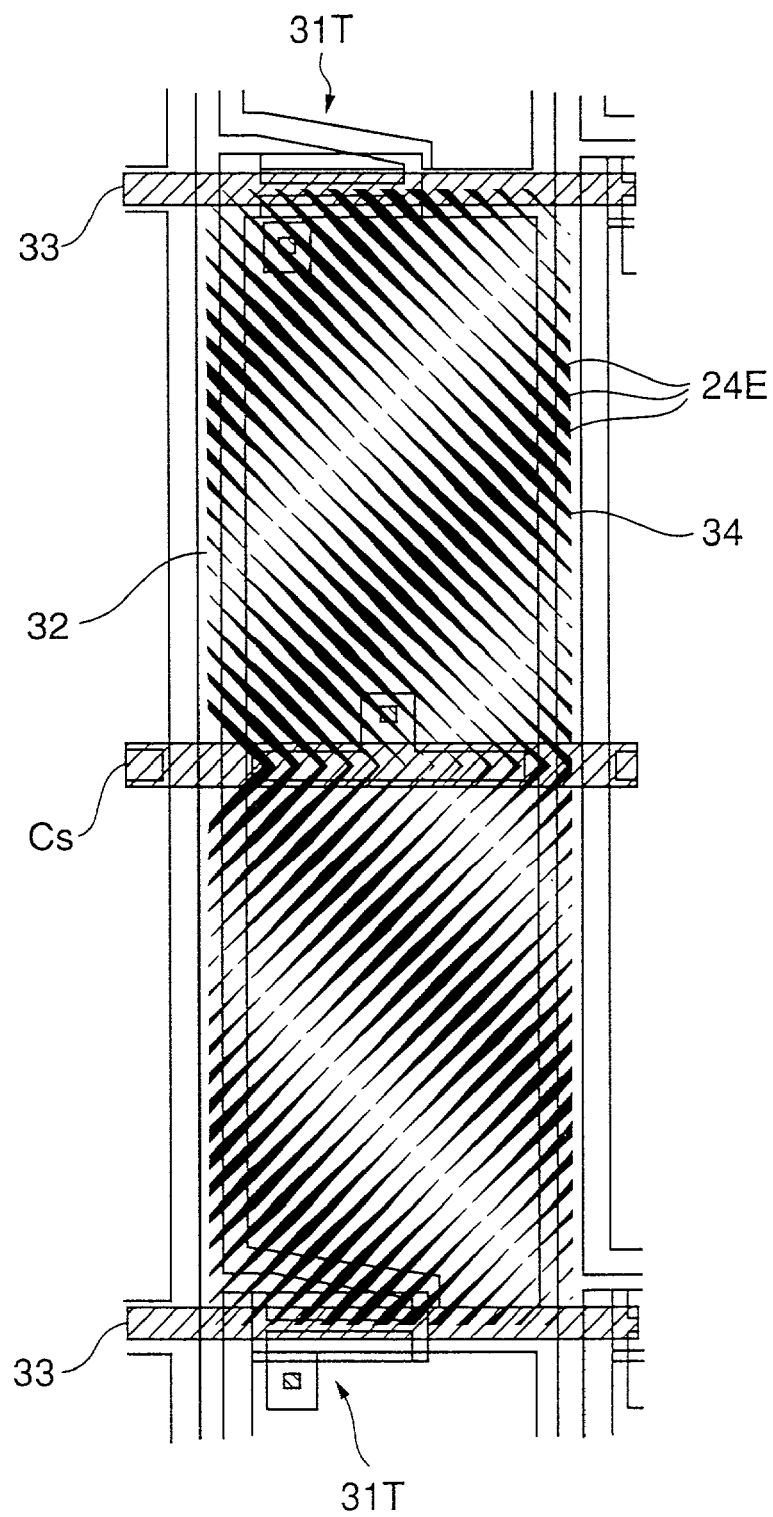
FIG. 21 is a diagram of a liquid crystal display device according to the third embodiment of the present invention.

FIG. 21 is a diagram of a liquid crystal display device according to the third embodiment of the present invention. In a liquid crystal display device 50 in FIG. 21, the directional pattern 24E being a rhombus in FIG. 19 is aligned on the pixel electrode 34 in the liquid crystal display device 30 previously described in FIG. 6 through FIG. 8. In FIG. 21, parts that are the same as the ones in previous figures are indicated by the same reference numerals and the explanation thereof will be omitted.

Referring to FIG. 21, the pixel electrode 34 is sectioned into two sections of an upper domain and a lower domain. In the upper domain, the micro-cutout projection pattern 24E being a rhombus made up of a resist pattern or the like is repeated to form in a first direction crossing an extended direction of the scan electrode 33 at 45°. The micro-cutout projection pattern 24E is repeated to form in a second direction crossing the first direction at 45°. When the driving voltage is applied to the liquid crystal layer 31, the tilt direction of the liquid crystal molecules in the liquid crystal layer 31 is regulated toward a top edge of the directional pattern 24E by a local transformation of the electrode field. As a result, as previously described in FIG. 20, the response speed of the liquid crystal display device 30 is greatly improved.

Figure 17:
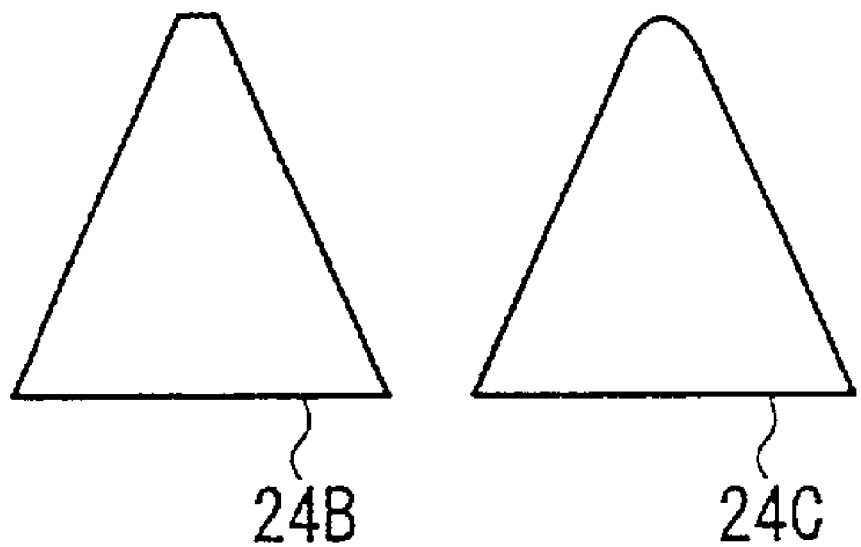
FIG. 17 is a diagram for explaining a principle of a liquid crystal display device according to the third embodiment of the present invention.
Figure 22:
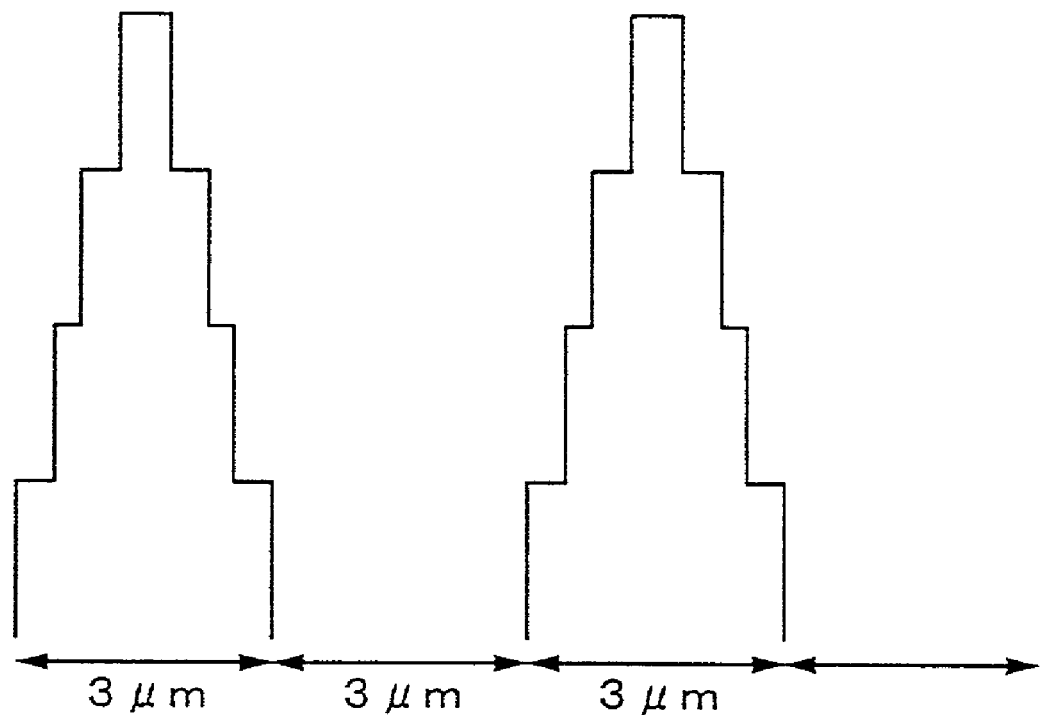
FIG. 22 is a diagram showing a first variation of the liquid crystal display device according to the third embodiment of the present invention.

In the directional pattern 24E being a rhombus in FIG. 19 or FIG. 21 and furthermore the directional patterns 24A through 24D being triangular in FIG. 16 through FIG. 18, both inclined sides can form steps as shown in FIG. 22. A step shaped pattern is easily formed. Therefore, a production yield of the liquid crystal display device 30 can be improved.

[Fist Variation]

Figure 23:
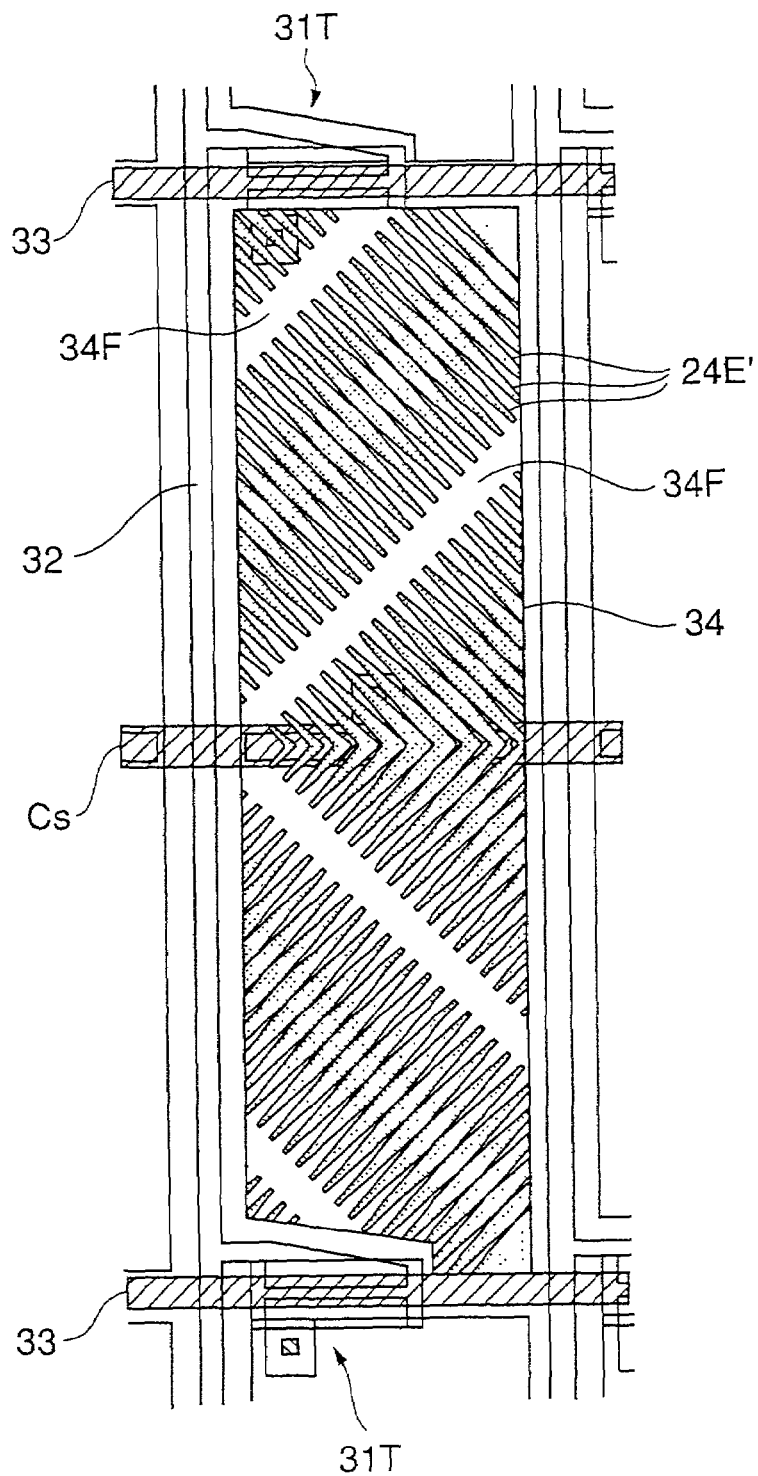
FIG. 23 is a diagram showing a second variation of the liquid crystal display device according to the third embodiment of the present invention.

FIG. 23 is a diagram showing a first variation of the liquid crystal display device according to the third embodiment of the present invention. In FIG. 23, a liquid crystal display device 50A as the first variation of the liquid crystal display device 50 is shown.

Referring to FIG. 23, in the first variation, the directional pattern 24E, which a top edge is cut out, and formed as a triangle directional pattern 24E' on the pixel electrode 34 in FIG. 21 based on the directional pattern 24B in FIG. 17 that is a triangle on liquid crystal display device 50A. As a result, a region 34F where no structured pattern is formed is formed.

In the first variation of the third embodiment, the triangle directional pattern 24E' is formed only on areas where the orientation direction of the liquid crystal molecules is disordered. In this configuration, it is possible to improve the transmittance and the response speed of the liquid crystal display device 50A.

[Second Variation]

Furthermore, in the third embodiment, in order to improve the response speed in the liquid crystal display device 30 shown in FIG. 6 through FIG. 8, as a means for inducing local changes of the electric field similar to those of directional patterns 24A through 24E which are a triangle or a rhombus, an optical hardened composite having a three-dimensional liquid crystal skeleton may be introduced into in the liquid crystal layer 31 made up of a nematic liquid crystal. When the optical composite is hardened and then an optical hardened material is made, the liquid crystal skeleton is formed so as to incline to a substrate 31A. Thus, it is possible to form an electric field inclining to the extended direction of the micro-cutout patterns 34A, which is similar to the electric field described in FIG. 16. For example, when the optical hardened composite is used to regulate the orientation direction in the conventional liquid crystal display device 10 shown in FIG. 1A and FIG. 1B, a large amount of optical hardened composite is required to be introduced. As a result, the orientation direction of the liquid crystal molecules is disordered. However, in the liquid crystal display device 30 according to the present invention, the micro-cutout pattern 34A regulates the orientation direction of the liquid crystal molecules. Therefore, it is possible to preferably regulate orientation direction by a slight amount of the optical hardened composite.

Accordingly in the second variation, in the liquid crystal display device 30 previously described in the first embodiment, a liquid crystal mono achryrate monomer UCL-001-K1 of Dai Nippon Ink K.K. in addition to the liquid crystal MJ96213 is additionally provided and then the monomer is hardened by emitting ultraviolet rays while applying 5.0V driving voltage so as to form a liquid crystal display device. In the optical hardened material formed by a process described above, when the liquid crystal display device 50A is in the non-driving state, the three-dimensional liquid crystal skeleton orients in a direction different from the orientation direction of the liquid crystal molecules.

Figure 24:
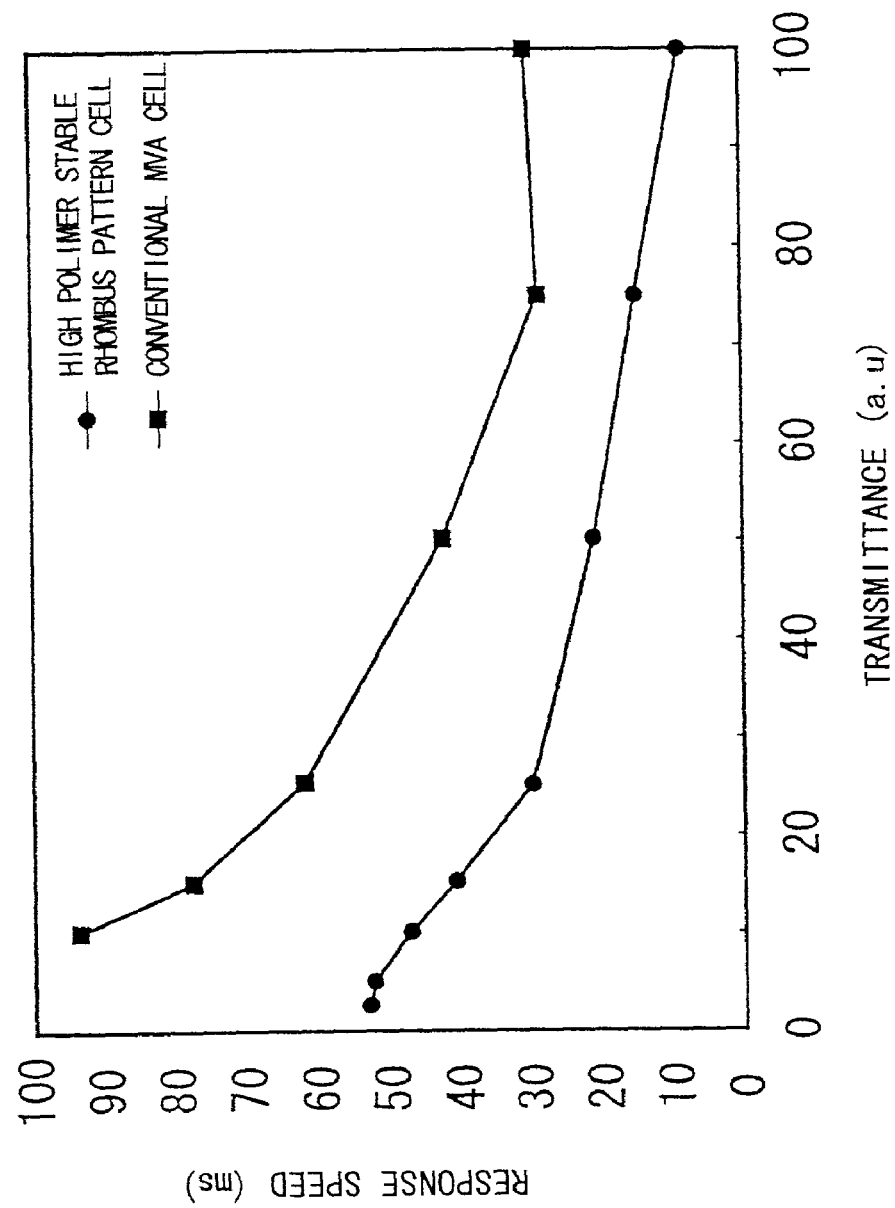
FIG. 24 is a diagram showing an operational characteristic of the liquid crystal display device according to the third embodiment of the present invention.

FIG. 24 is a diagram showing an operational characteristic of the liquid crystal display device according to the third embodiment of the present invention. In FIG. 24, a relationship between a transmittance and a response speed is shown in a case in which the driving voltage is applied. Similar to the case in FIG. 20, the conventional liquid crystal display device 10 in FIG. 1A and FIG. 1B are compared in FIG. 24.

Referring to FIG. 24, in the liquid crystal display device according to the second variation, the response speed is substantially shorter than that of the conventional liquid crystal display device. In particularly, the response speed in a half tone is greatly improved.

[Fourth Embodiment]

A liquid crystal display device similar to the liquid crystal display device 40 previously described in FIG. 15, in which the micro structural pattern 24 in FIG. 3A is combined with the projecting patterns 13A and 13B, will now be described according to a fourth embodiment. In the liquid crystal display device according to the fourth embodiment, the micro structural pattern 24 is made up of a cutout pattern formed in the electrode 23A as shown in FIG. 4. Also, the projecting pattern 13A formed on the substrate 11A is made up of a cutout pattern formed in the electrode layer 23A.

Figure 25A:
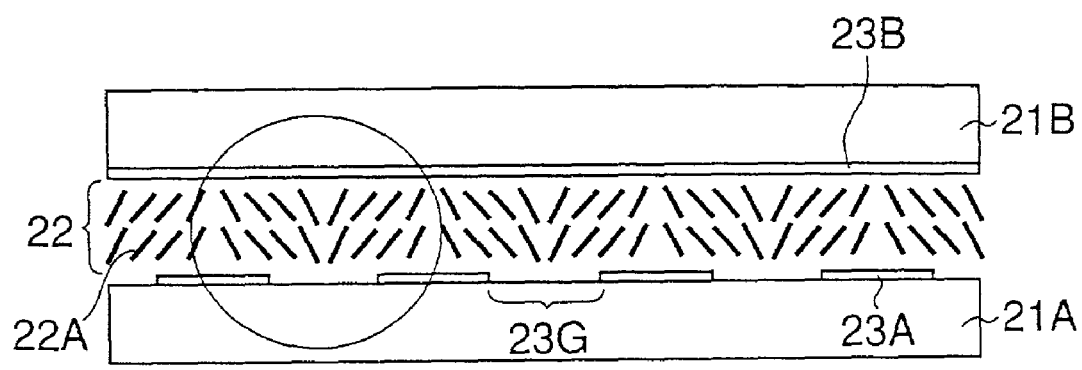
FIG. 25A and FIG. 25B are diagram for explaining a principle based on the configuration in FIG. 4, according to the fourth embodiment of the present invention.
Figure 25B:
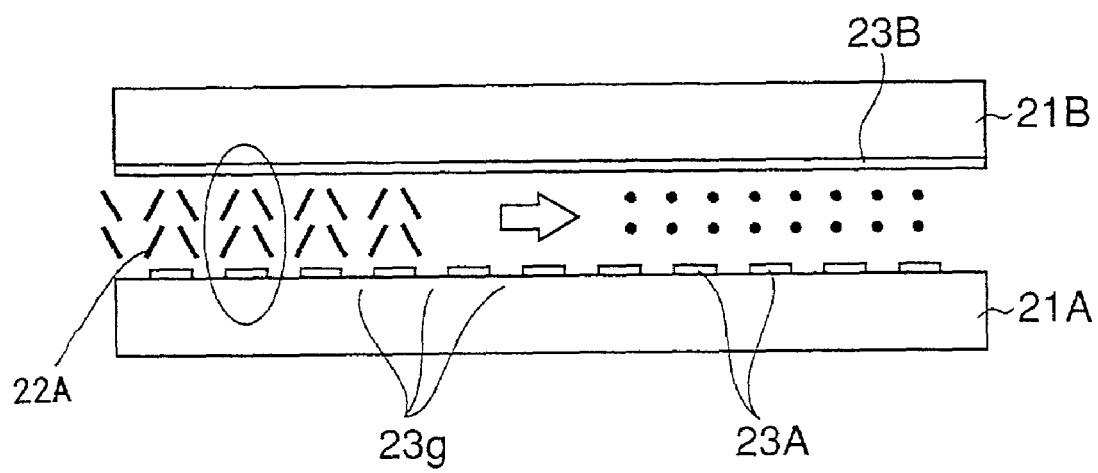

FIG. 25A and FIG. 25B are diagrams for explaining a principle based on the configuration in FIG. 4, according to the fourth embodiment of the present invention. In FIG. 25A and FIG. 25B, for the sake of convenience, only the electrode layers 23A and 23B are shown. But the polarizer 26A and the analyzer 26B and the molecule orientations 25A and 25B are not shown. In FIG. 25A, it is shown that a wider gap 23G is periodically repeated to form at greater intervals in the electrode layer 23A while corresponding to the projection patterns 13A and 13B. In FIG. 25B, it is shown that a smaller gap 23g is periodically repeated to form at shorter intervals in the electrode layer 23A.

In FIG. 25A, when the wider gap 23G is formed in the electrode layer 23A, an equipotential surface is locally transformed in the liquid crystal layer 22 by effects of gap edges. As a result, even if in the non-driving state in which the driving voltage is not applied between the electrode layers 23A and 23B, a pre-tilt structure is obtained. In the pre-tilt structure, the liquid crystal molecules 22A in the liquid crystal layer 22A tilt toward a center of electrode patterns configuring the electrode layer 23A. Then, when the driving voltage is applied to between the electrode layers 23A and 23B in the liquid crystal layer 22 where the pre-tilt structure is formed, the liquid crystal molecules 22A quickly tilt in a pre-tilt direction.

On the other hand, as shown in FIG. 25B, in a case in which the gap 23g, which is repeated to form on the electrode layer 23A, is smaller and a repeat period of the gap 23g is shorter, pre-tilt similar to that in FIG. 25A occurs in the non-driving state as shown at a left side of FIG. 25B. However, in a case in which the driving voltage is applied between the electrode layer 23A and the electrode layer 23B in the driving state, the liquid crystal molecules 22A, which tend to tilt in a right direction or a left direction, mutually interfere and then the liquid crystal molecules 22A result in tilting in an extended direction of the gap 23g, as shown at a right side of FIG. 25B.

In a state shown in FIG. 25A, when the driving voltage is applied, the liquid crystal molecules 22A is regulated to tilt at the right side or the left side by the pre-tilt of the liquid crystal molecules 22A. However, tilted liquid crystal molecules 22A can not be regulated to arrange in a single direction. On the contrarily, if a configuration shown in FIG. 25B is combined with a configuration shown in FIG. 25A, it is possible to control an orientation of tilted liquid crystal molecules 22A to orient in a specific direction when the liquid crystal molecules 22A tilt to the right side or the left side. That is, in the second embodiment of the present invention previously described in FIG. 10, a cutout pattern formed in the electrode layer 23A is used, instead of the rough projection pattern 27A, and also a micro-cutout pattern formed in the electrode layer 23A is used, instead of the micro structural pattern 24.

Figure 26:
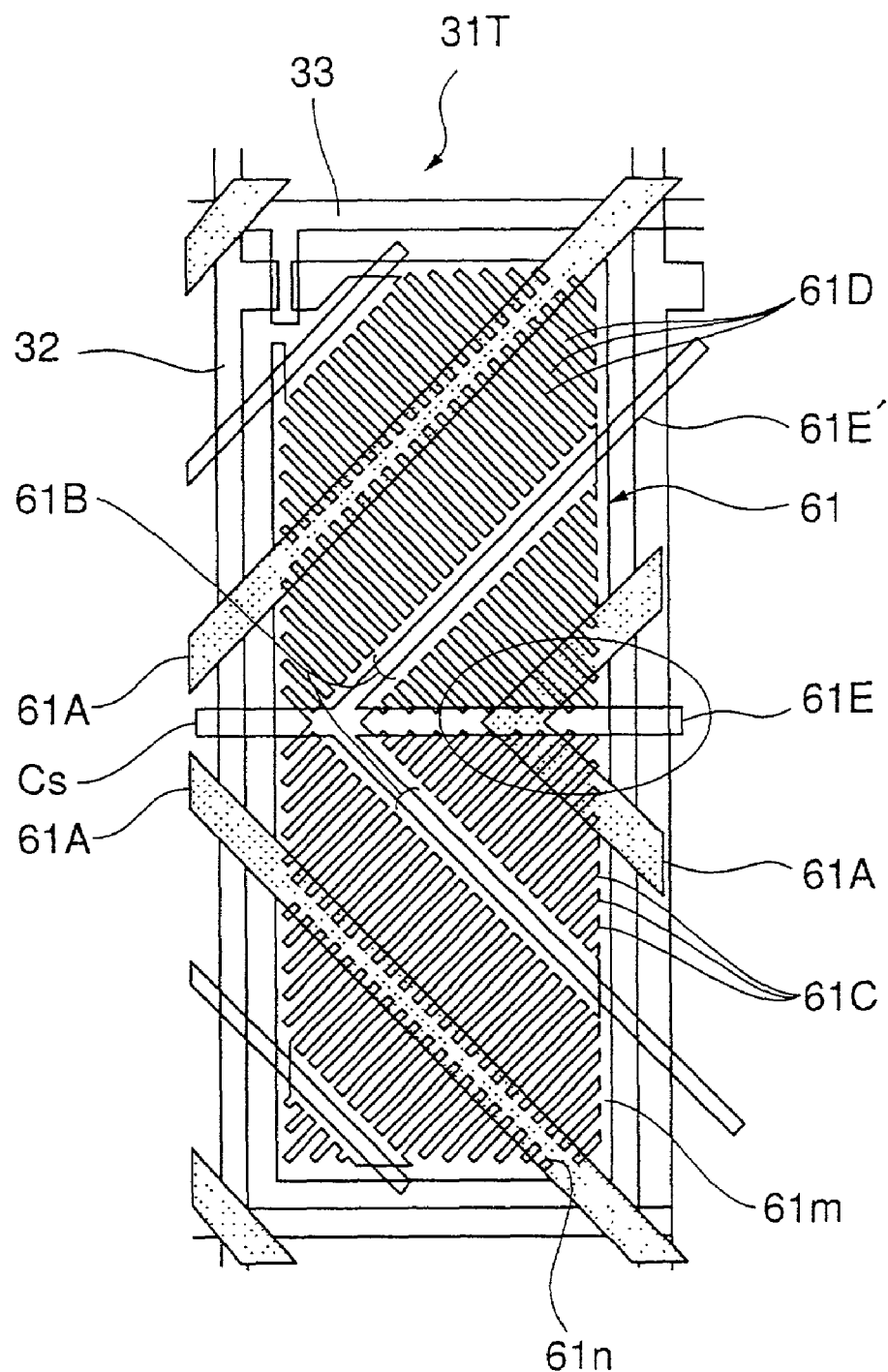
FIG. 26 is a diagram showing a configuration of a pixel electrode part of a liquid crystal display device according to the present invention.

FIG. 26 is a diagram showing a configuration of a pixel electrode part of a liquid crystal display device 60 according to the present invention. In FIG. 26, elements that are the same as the ones in previous figures are indicated by the same reference numerals and the explanation thereof will be omitted.

Referring to FIG. 26, a configuration of the liquid crystal display device 60 is similar to that of the liquid crystal display device 30 previously described in FIG. 6 and FIG. 7, but a pixel electrode 61 is used, instead of using the pixel electrode 34.

The glass substrate 31B, a projection pattern 61A corresponding to the projection pattern 13B previously described in FIG. 1A and FIG. 1B, which is made up of a resist pattern typically having 3 µm through 35 µm in width and 1.2 µm through 1.6 µm in height, is repeated to form while the projection pattern 61A is bent at a right angle in zigzag. Also, in the pixel electrode 61, a cutout pattern 61B having a zigzag shape corresponding to the projection pattern 61A is formed with a 4 µm through 15 µm width at an intermediate between the projection patterns neighboring each other. Moreover, in the configuration in FIG. 26, a micro-cutout pattern 61C, which is 2 µm through 5 µm in width but preferably approximately 3 µm in width, is repeated to form at pitch intervals of the width, that is, 2 µm through 5 µm but preferably approximate 3 µm, in the pixel electrode 61 so as to laterally extend from the cutout pattern 61B. As a result of forming the micro-cutout pattern 61C, the pixel electrode 61 becomes a set of pectinate patterns 61D having long and slender teeth. In the configuration in FIG. 26, the pixel electrode 61 includes a first domain where the projection pattern 61A extends from upper right to lower left and a second domain where the projection pattern 61A extends from upper left to lower right. Accordingly, an extended direction of the pectinate pattern 61D in the first domain is different from that in the second domain. That is, the extended direction of the pectinate pattern 61D in the first domain vertically crosses the extended direction of the pectinate pattern 61D in the second domain.

The set of the pectinate patterns 61D is needed to form a single pixel electrode 61. Thus, the pectinate patterns 61D are mutually connected at edge sides 61m of the pixel electrode 61 and right under the projection pattern 61A of the facing glass substrate 31B in FIG. 6.

Furthermore, in the liquid crystal display device 60 in FIG. 26, a transparent or opaque common electrode pattern 61E' is extended along the cutout pattern 61B. The transparent or opaque common electrode pattern 61E' is directly formed on the glass substrate 31A, that is, is formed across an insulating film under the pixel electrode 61 and then forms the auxiliary capacitance electrode Cs. The common electrode patterns 61E and 61E' are electrically connected. In this case, the transparent common electrode pattern 61E' shows parts obliquely extending in the pixels from the common electrode pattern 61E. The transparent common electrode pattern 61E' maintains the same electric potential as a facing electrode on the facing glass substrate 31B. As a result, a molecule orientation effect by the wider cutout pattern 61B can be reinforced. In this case, the common electrode pattern 61E' crosses the signal electrode 32 in FIG. 26 through FIG. 28. But practically, it is preferable to cut off the common electrode pattern 61E' before crossing the signal electrode 32. If the common electrode pattern 61E' is formed in the extended direction, the common electrode pattern 61E' may cause a short with the signal electrode 32. Even in a case in which the common electrode pattern 61E' is cut off before the signal electrode 32, an excellent effect can be obtained.

Also, in the liquid crystal display device 60 in FIG. 26, the transparent or opaque common electrode pattern 61E' forming the auxiliary capacitance electrode Cs passes through a region marked by a circle line in FIG. 26 and extends in a direction extending toward the scan electrodes 33. Then, the orientation of the liquid crystal molecules is stabilized in the region marked by the round line.

As previously described in FIG. 25A and FIG. 25B, in the configuration of the liquid crystal display device 60, the tilt direction of the liquid crystal molecules in the liquid crystal layer is determined by the common electrode pattern 61E, which pattern 61E is formed while corresponding to the cutout pattern 61B. In addition, the tilt direction of the liquid crystal molecules is regulated by the micro-cutout pattern 61C and the pectinate pattern 61D. As a result, in the liquid crystal display device 60, the response speed is improved and the display quality is improved. Specifically, stability of the orientation direction of the liquid crystal molecules is improved. Therefore, it is possible to prevent a development of an image to display from remaining in a previous image, even if the image displayed is rapidly changed.

In the region marked by the circle line in FIG. 26, the micro-cutout pattern 61C extends across the region right under the projection pattern 61A on the facing glass substrate 31B. In this configuration, it can be realized to regulate the orientation of the liquid crystal molecules. Also, the projection pattern 61A can be a cutout pattern formed on a facing electrode.

[First Variation]

Figure 27:
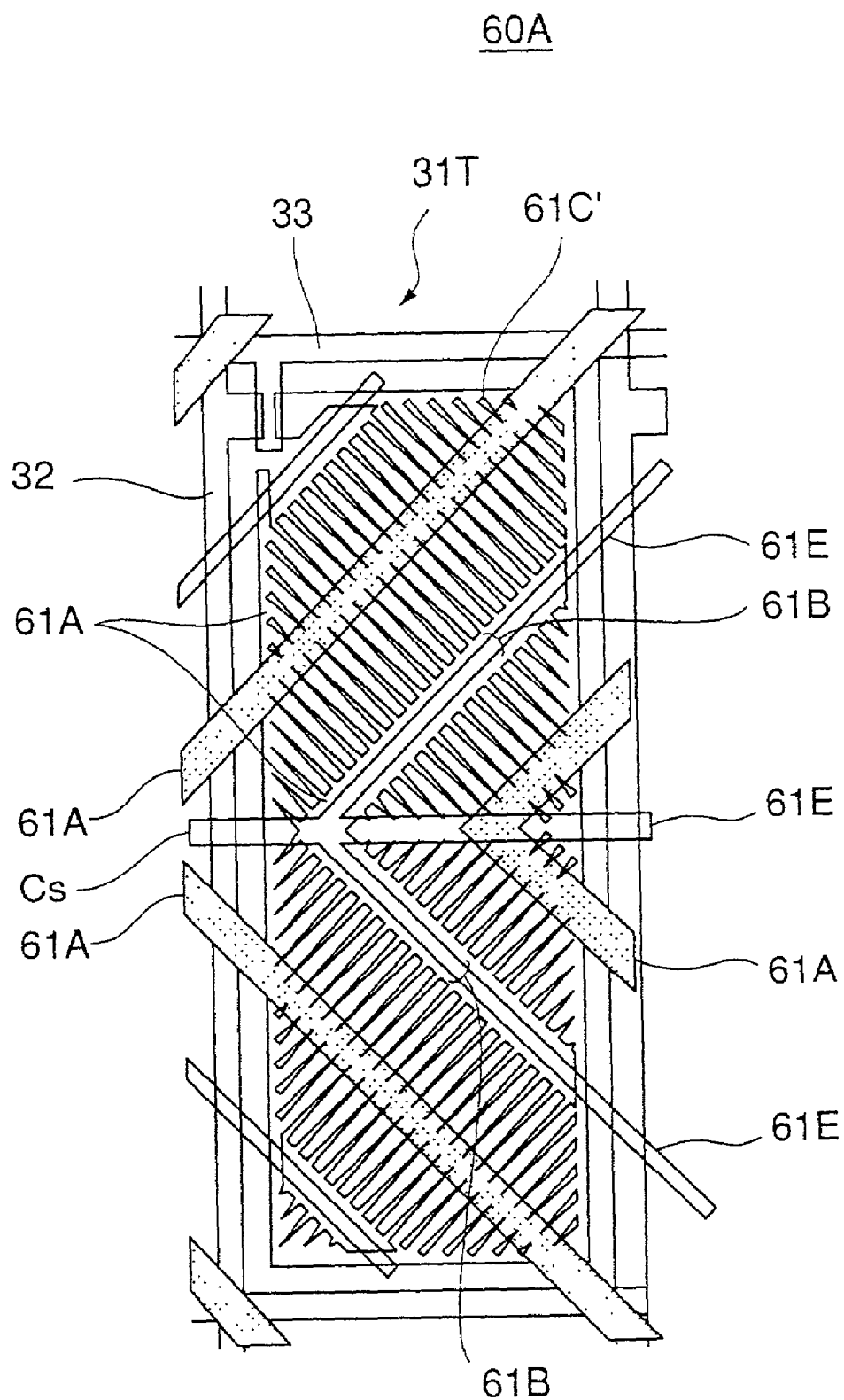
FIG. 27 is a diagram of a liquid crystal display device 60A showing a first variation of the configuration of the liquid crystal display device 60 according to the fourth embodiment of the present invention.

FIG. 27 is a diagram of a liquid crystal display device 60A showing a first variation of the configuration of the liquid crystal display device 60 according to the fourth embodiment of the present invention.

Referring to FIG. 27, in the first variation, the micro-cutout pattern 61C in FIG. 26 is replaced with a cutout pattern 61C' that is the same as the directional pattern 24A being triangular previously describe in FIG. 16. As previously described, since the directional pattern induces the electric field distribution having a direction, in the liquid crystal display device 60, the molecule orientation effect can be reinforced by the projection pattern 61A, the cutout pattern 61B and the common electrode patterns 61E. As a result, in the liquid crystal display device 61A, the response speed is more improved.

[Second Variation]

Figure 28:
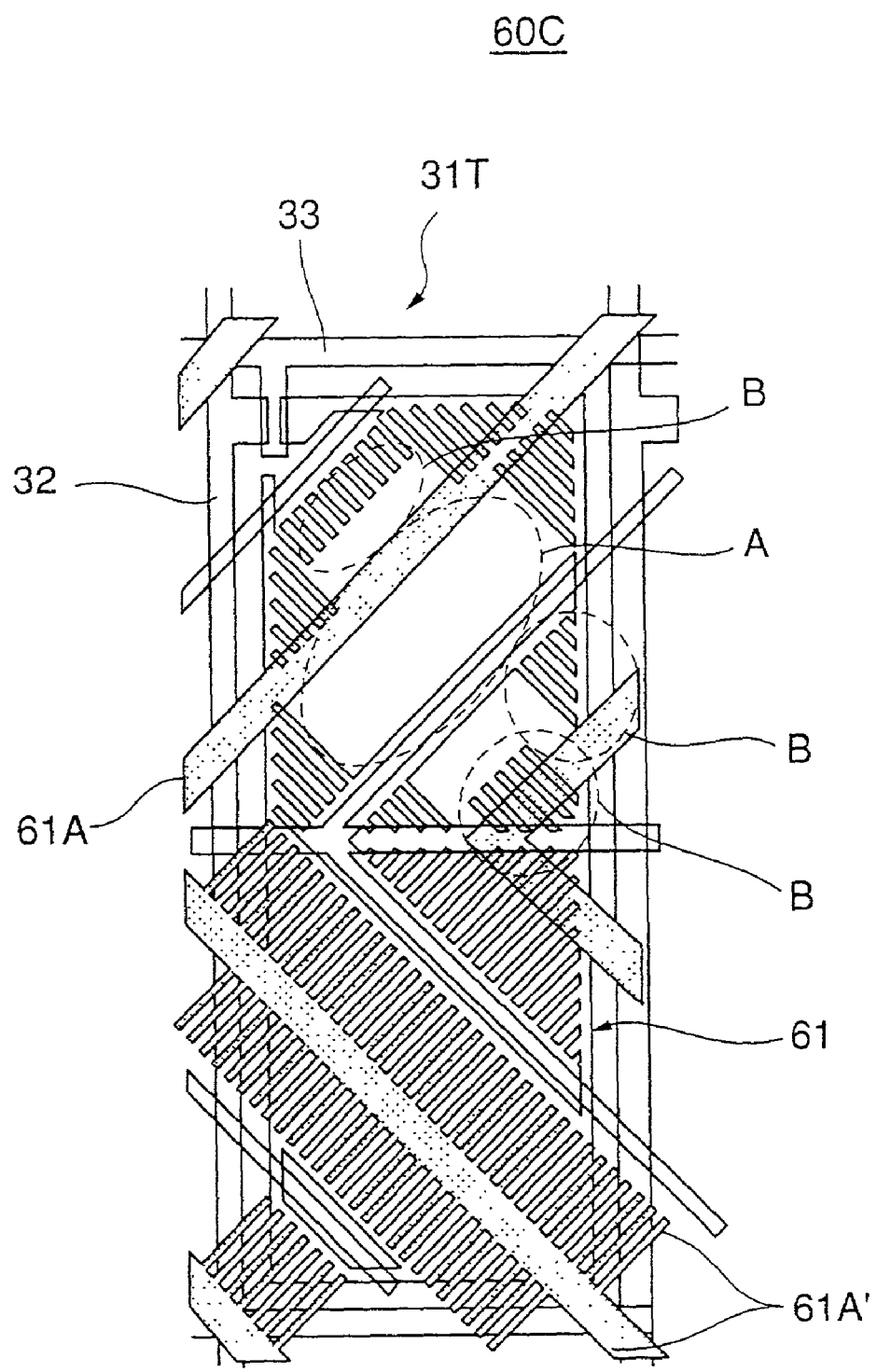
FIG. 28 is a diagram showing a second variation of the configuration of the liquid crystal display device according to the fourth embodiment of the present invention.

FIG. 28 is a diagram showing a second variation of the configuration of the liquid crystal display device 60 according to the fourth embodiment of the present invention.

As shown in FIG. 28, in the liquid crystal display device 60 in FIG. 26, a pectinate pattern 61A similar to the pectinate pattern 61D can be formed on the facing glass substrate 31B so as to be provided between the facing electrode 36 and the liquid crystal layer or between the facing substrate 31B and the facing electrode 36. In addition, in a case in which the orientation of the liquid crystal molecules is regulated enough by the projection pattern 61 or 61A' and the cutout pattern 61B, as shown in FIG. 28, the micro-cutout pattern 61C formed in the pixel electrode 61 is not formed in a region A, so that an uniform electrode is formed. Moreover, instead of the projection pattern 61A or 61A', a cutout pattern, which corresponds to the facing electrode 36 of the glass substrate 31B.

[Fifth Embodiment]

Next, a fifth embodiment, in which the operational characteristic of the liquid crystal display device 60A in FIG. 27 is further improved, will now be described.

In the liquid crystal display device 60A in FIG. 27, a high-speed response can be realized by forming the micro-cutout pattern 61C being a taper shape in the pixel electrode 61. However, in the configuration of the liquid crystal display device 60A in FIG. 27, the micro-cutout pattern 61C is required to form on substantially an entire surface other than areas where the cutout pattern 61B is formed in the pixel electrode 51. That is, a highly accurate photolithography process is required to form the micro-cutout pattern 61C being a taper shape and a yield of the liquid crystal display device 60A is deteriorated.

To eliminate the above problem, the inventor of the present invention examined the display characteristic. The inventor formed a pixel electrode structure 71 laterally and periodically extending a pectinate ITO ($In_2O_3 \cdot SnO_2$) pattern 71B from a banded ITO pattern 71A shown in FIG. 30 and then variously changed a length B of the pectinate ITO pattern 71B and a width A of the banded ITO pattern 71A in the liquid crystal display device 70 having the pixel electrode structure 71.

Figure 30:
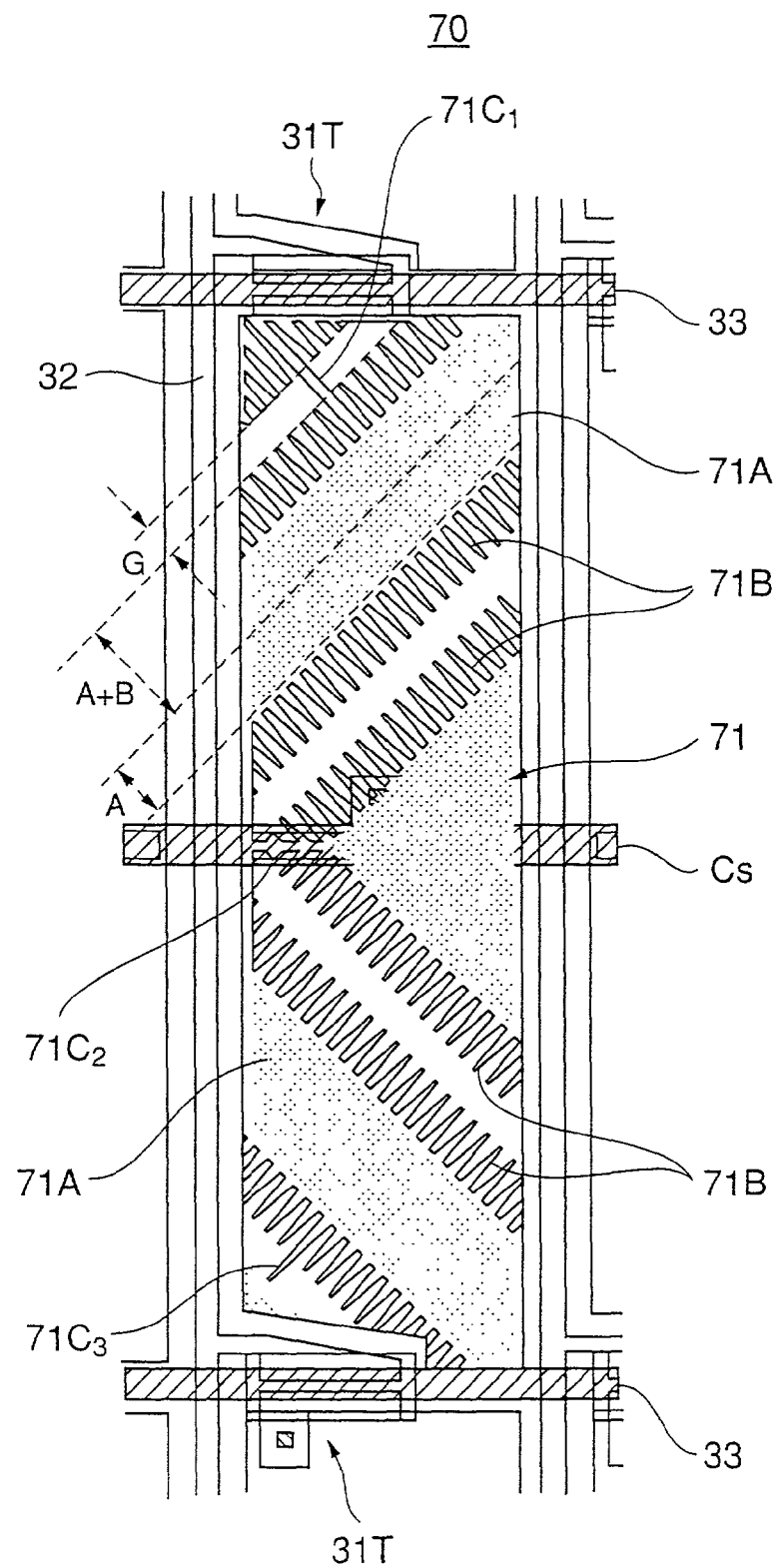
FIG. 30 is a diagram showing the configuration of the liquid crystal display device according to the fifth embodiment of the present invention.

FIG. 30 is a diagram showing the configuration of the liquid crystal display device 70 according to the fifth embodiment of the present invention. In FIG. 30, specifically, a configuration of the pixel electrode structure 71 is shown.

Referring to FIG. 30, the pixel electrode structure 71 includes a plurality of banded ITO patterns 71A. Each of the banded ITO patterns 71A has the pectinate ITO pattern 71B. Also, each of the plurality of banded ITO patterns 71 has the width B shown in FIG. 29 on one side and is mutually spaced by a gap G corresponding to the cutout pattern 61B in the configuration in FIG. 26 or FIG. 27. The plurality of the banded ITO patterns 71A are mutually connected by connection parts $71C_1$, $71C_2$ and $71C_3$ and then are connected to the TFT 31T. The banded ITO pattern 71A corresponds to the projection pattern 61A forming a zigzag shape (in FIG. 26 or FIG. 27) on the facing glass substrate 31B and then forms a zigzag shape.

Figure 29:
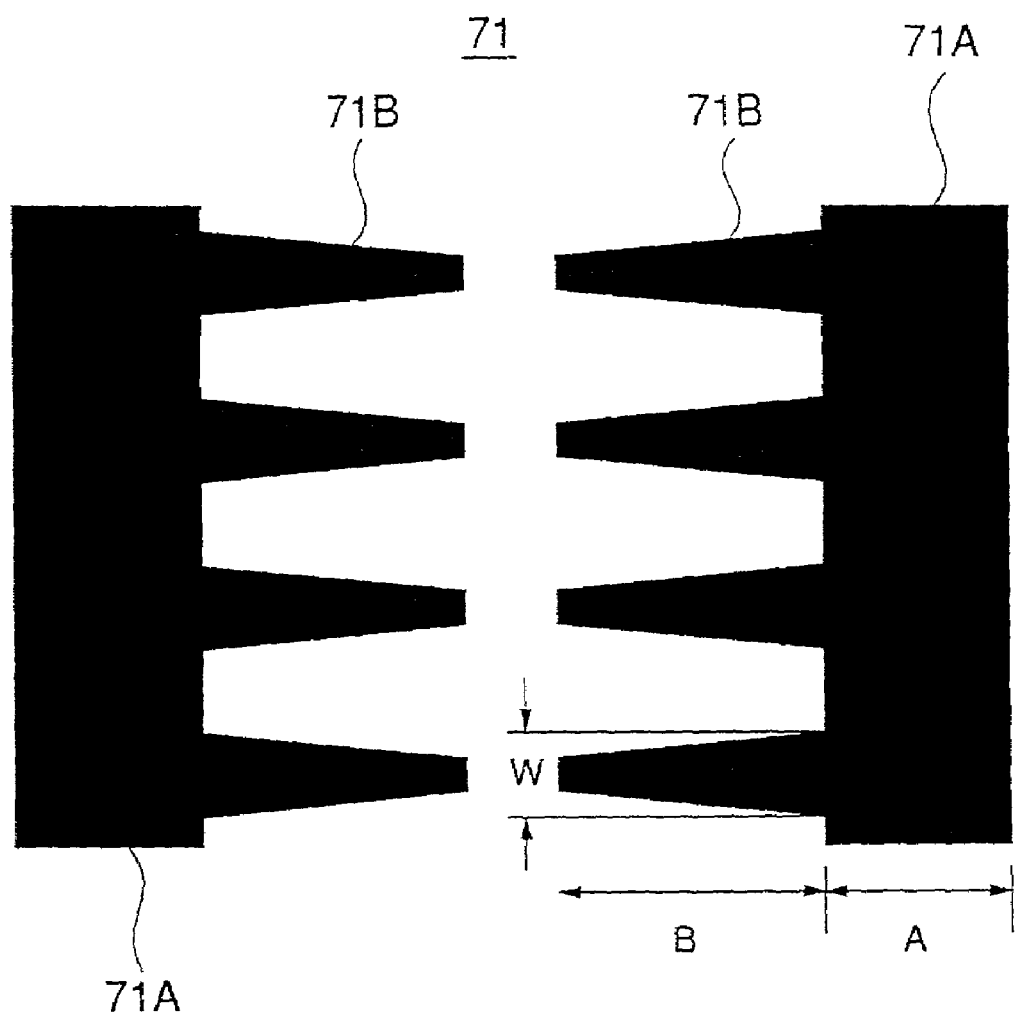
FIG. 29 is a diagram showing a principle of a liquid crystal display device according to a fifth embodiment of the present invention.

A Table 3 shown below shows the display characteristic in a case in which the length A and the width B as parameters in FIG. 29 are variously changed in the liquid crystal display device 70 in FIG. 30. It should be noted that in this experiment, similarly to the fourth embodiment, the liquid crystal of Merck corporation as the liquid crystal 31 is combined with the vertical molecule orientation film of JSR corporation. The liquid crystal layer 33 has 4 μm. Also, in the pixel electrode structure 71, the pectinate ITO pattern 71B has a 3.5 μm and is periodically repeated at intervals of 6 μm.

TABLE 3

| Occupied Rate Of pectinate Pattern Region (B/(A + B)) | Nonuniformity In Half Tone | Improvement rate Of Response Speed |
|---|---|---|
| 85 | X | ○ (80%) |
| 75 | X to Δ | ○ (75%) |
| 65 | Δ to ○ | ○ (70%) |
| 50 | ○ | ○ (60%) |
| 35 | ○ | Δ (25%) |
| 25 | ○ | X (up to 10%) |

Referring to Table 3, when the length B of the pectinate pattern 71B is more than 65% of a total width of the pectinate pattern 71B and the banded ITO pattern 71A, nonuniformity occurs in the half tone display mode. Accordingly, a preferable rate for the total width (A+B) of the pectinate pattern 71B is less than 65%. On the other hand, when the length B of the pectinate pattern 71B is less than 35% of the total width, an improvemed effect of the response characteristic is smaller. Accordingly, a preferable rate for the total width to the pectinate pattern 71B is more than 35%. Consequently, it is considered that a dispersion of approximate 0.2 μm through 0.3 μm in a patterning of the pectinate pattern 71B emphasizes nonuniformity in the half tone display mode.

Figure 31A:
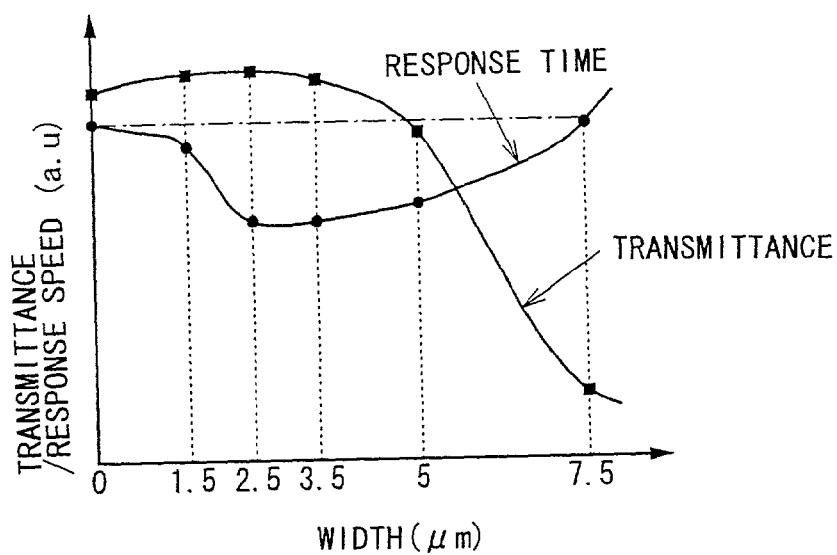
FIG. 31A is a diagram showing a change of a transmittance and a response speed in the liquid crystal display device in FIG. 30

FIG. 31A is a diagram showing a change of the transmittance and the response speed when a width W of the pectinate pattern 71B is variously changed in the liquid crystal display device 70 in FIG. 30. It should be noted that for a result in FIG. 31A, in the electrode 71 in FIG. 29, the width A of the banded ITO pattern 71A is 11 μm, the length B of the pectinate pattern 71B is 15 μm and the pectinate pattern 71B is periodically formed at intervals of 6 μm.

Figure 31B:
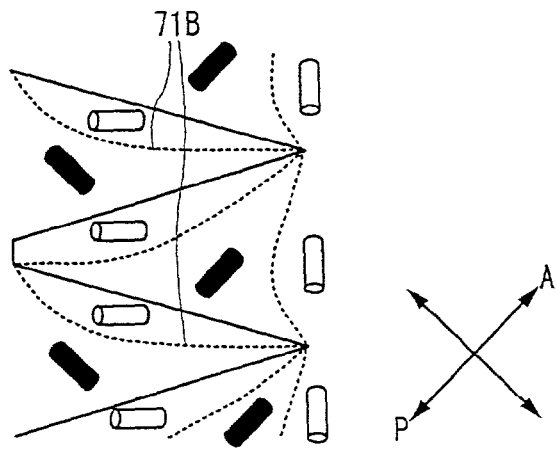
FIG. 31B is a diagram showing orientations of the liquid crystal molecules in the liquid crystal display device in FIG. 30.

Referring to FIG. 31A, when the width W of the pectinate pattern 71B is 0 (zero), a response time of only the banded ITO pattern 71A is improved. However, when the width W of the pectinate pattern 71B exceeds 1.5 μm, the response time is dramatically improved. Then, when the width W of the pectinate pattern 71B exceeds 3.5 μm, the response time is gradually increased. The response time is rapidly increased before and after the width W of the pectinate pattern 71B is 4.5 μm. As shown in FIG. 31B, the liquid crystal molecules should be oriented toward a direction to properly display white, but the liquid crystal molecules tend to orient in another direction to display black, so that the orientations of the liquid crystal molecules are disordered. As a result, the transmittance is degraded.

The result in FIG. 31A shows that a preferable width W of the pectinate pattern 71B is a range from 2.5 μm through 4.5 μm.

Figure 32:
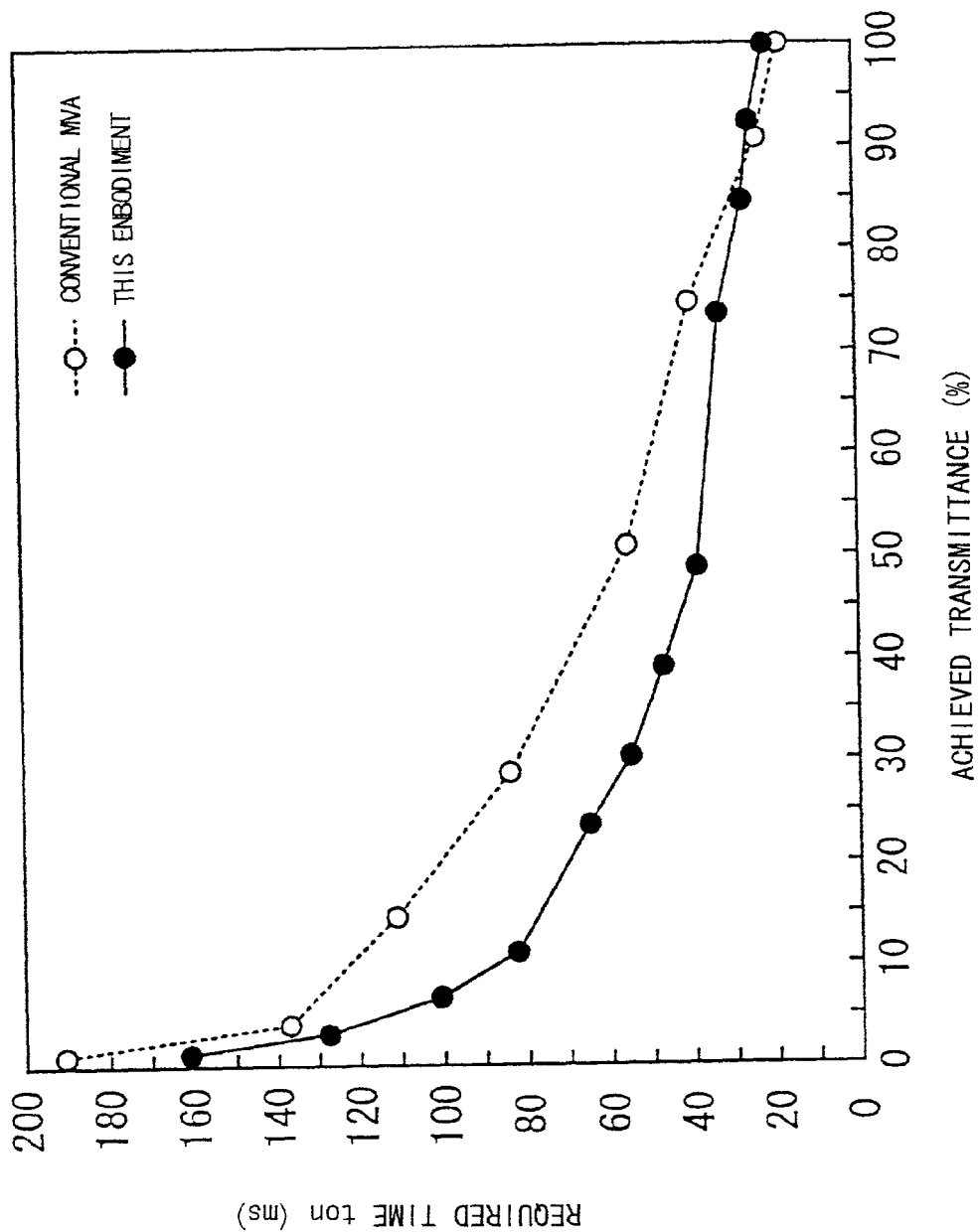
FIG. 32 is a diagram showing a relationship between an achieved transmittance and a required time in the liquid crystal display device in FIG. 30, according to the fifth embodiment of the present invention.

FIG. 32 is a diagram showing a relationship between an achieved transmittance and a required time in the liquid crystal display device 70 in FIG. 30. It should be noted that in FIG. 29, the width A of the banded ITO pattern 71A is 11 μm, the length B of the pectinate pattern 71B is 15 μm, a width of the gap G is 8 μm, the width W of the pectinate pattern 71B is 3.5 μm and the pectinate pattern 71B is periodically formed at intervals of 6 μm. And, the projection pattern 61A is not formed on the facing substrate 31B. In addition, FIG. 32 shows a characteristic of the achieved transmittance and the required time of the conventional liquid crystal display device 10 in FIG. 1A and FIG. 1B.

Referring to FIG. 32, compared with the conventional liquid crystal display device 10, the required time especially in the half tone range is greatly shortened.

Figure 33:
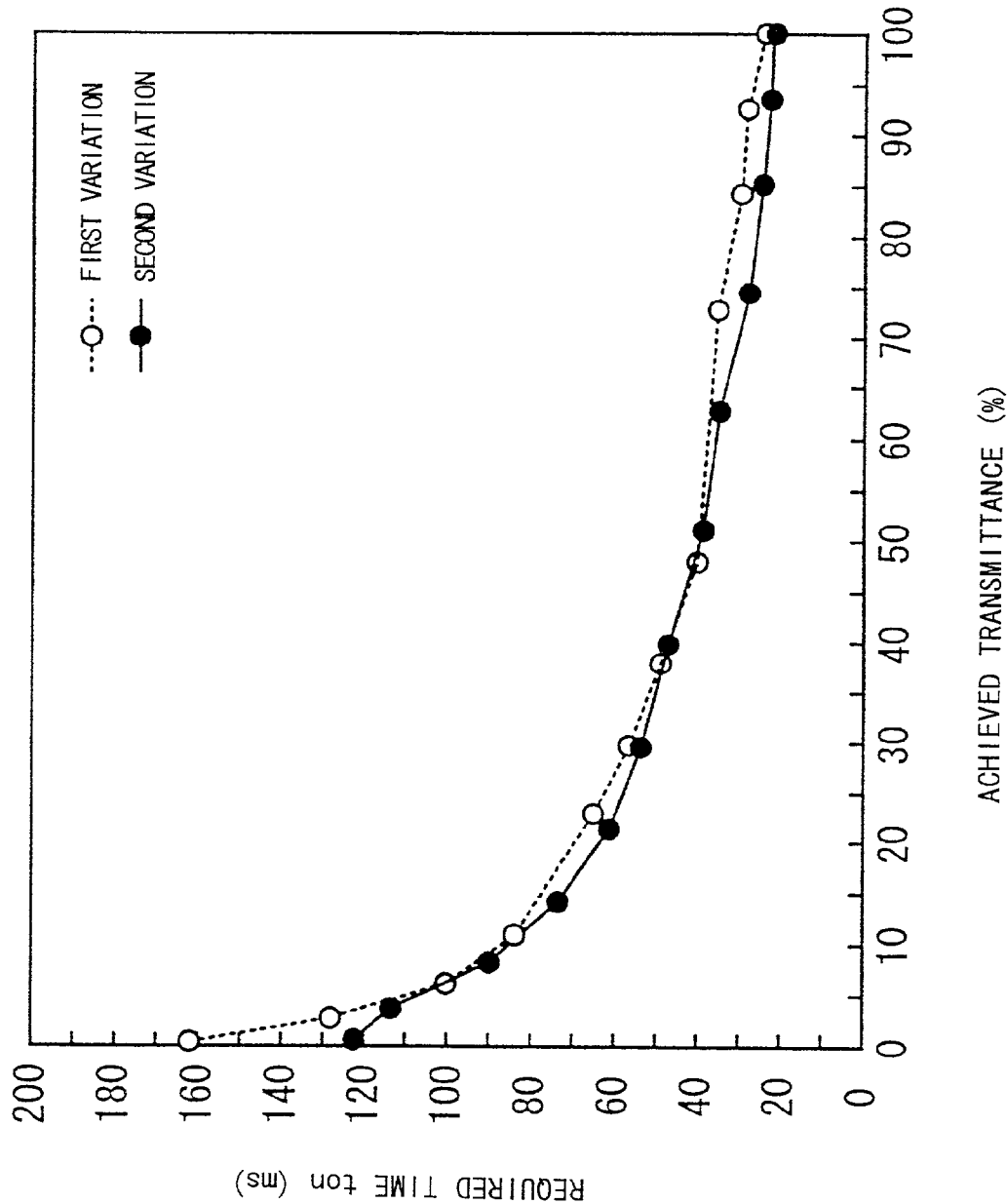
FIG. 33 is a diagram showing a relationship between an achieved transmittance and a required time in the liquid crystal display device in FIG. 30, according to the fifth embodiment of the present invention.

FIG. 33 is a diagram showing a relationship between an achieved transmittance and a required time in the liquid crystal display device 70 in FIG. 30. In this case in FIG. 33, projection patterns 61A similar to ones in FIG. 26 and FIG. 27 on the facing substrate 31B are formed. The relationship in this configuration is shown as a second variation in the diagram in FIG. 33. And, the relationship in the liquid crystal display 70 shown in FIG. 32 is shown as a first variation.

Referring to FIG. 33, in a case in which the projection pattern 61A is formed in the facing substrate 31B, especially when the transmittance is closer to 0%, the required time is improved.

Figure 34:
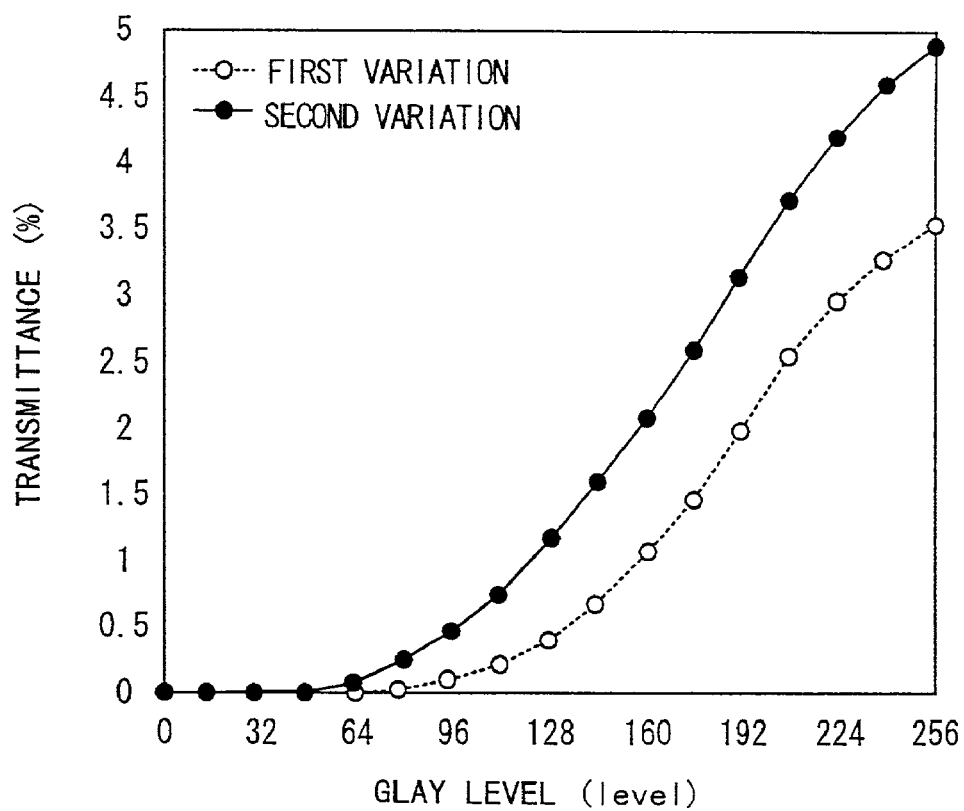
FIG. 34 is a diagram showing a relationship between a transmittance and a gradation in a first variation and a second variation in FIG. 33, according to the fifth embodiment of the present invention.

FIG. 34 is a diagram showing a relationship between a transmittance and a gradation in the first variation and the second variation in FIG. 33. It should be noted that in FIG. 34, a state in that the driving voltage is applied to the pixel electrode 71 is defined as 256 gradations.

Referring to FIG. 34, the transmittance of the liquid crystal display device 70 is greatly improved by forming the projection pattern 61A on the facing substrate 31B.

Figure 35A:
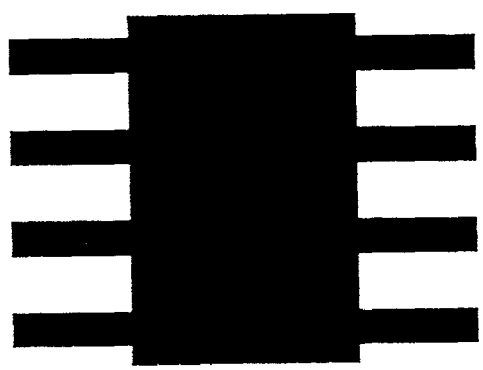
FIG. 35A through FIG. 35C are diagrams showing various patterns used as the pixel electrode, according to the fifth embodiment of the present invention.
Figure 35B:
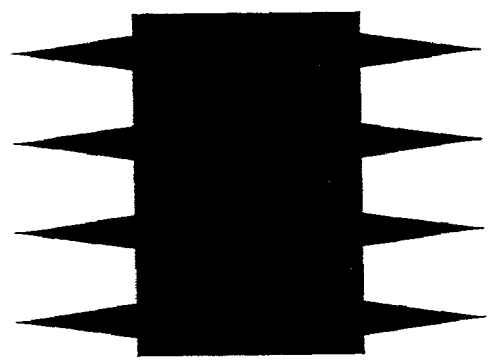
Figure 35C:
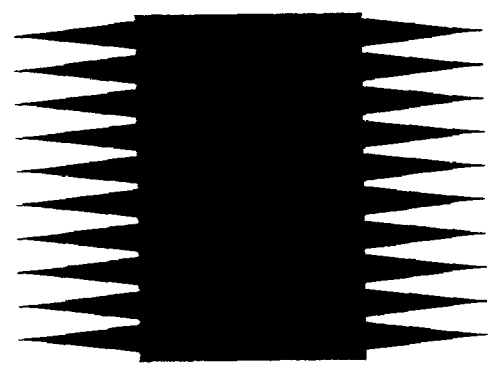

In the fifth embodiment, various patterns such as shown in FIG. 35A through FIG. 35C can be used as the pixel electrode 71.

In the fifth embodiment, the projection pattern 61A on the facing substrate 31B is not limited to a projection pattern such as a resist pattern or the like. The projection pattern 61A can be a cutout pattern formed in the facing electrode 35 Also, the period of repeating the pectinate pattern 71B is not limited to the 6 μm interval. When the period is in a range greater than 2 μm and shorter than 15 μm, it is possible to realize to effectively regulate the orientation of the liquid crystal molecules in the extended direction of the pectinate pattern.

[Sixth Embodiment]

Next, a method for fabricating a liquid crystal display device will now be described in a case in which a structural pattern in the liquid crystal display device 30 described in the first embodiment; for example, the structural pattern 34A in FIG. 8 is formed by a resist pattern.

Figure 36A:
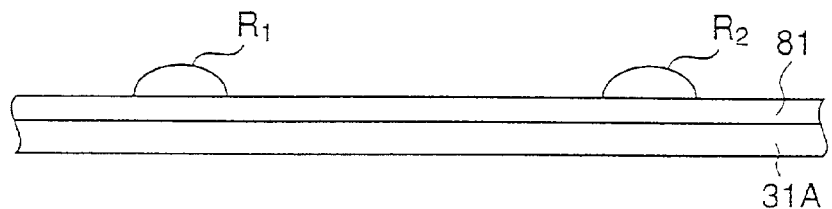
FIG. 36A through FIG. 36T are diagrams for explaining a method for fabricating a liquid crystal display device according to a sixth embodiment of the present invention.

Referring to FIG. 36A, a conducting film 81, which forms the scan electrode 33 and the auxiliary capacitance electrode Cs, is uniformly formed on the glass substrate 31A. Moreover, resist patterns R1 and R2, corresponding to a scan electrode pattern and an auxiliary capacitance electrode Cs, respectively, are formed on the conducting film 81.

Figure 36B:
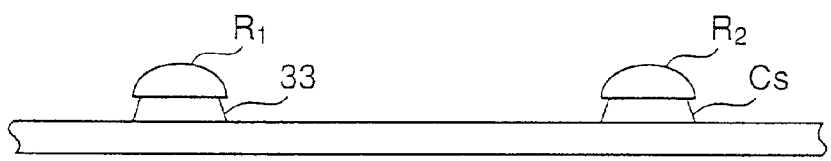
Figure 36C:
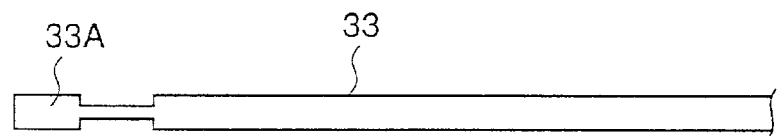
Figure 36C:
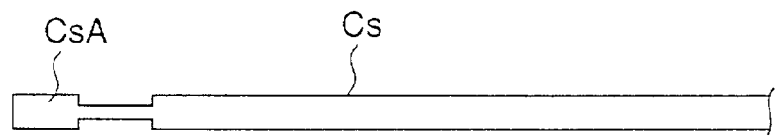

In a next step in FIG. 36B, a patterning process is conducted for the conducting film 81 by using the resist pattern R1 and R2 as masks. Then, as shown as a plan view diagram in FIG. 36C, the scan electrode 33 and the auxiliary capacitance electrode Cs are formed on the glass substrate 31A. As a result of the patterning process in FIG. 36B, an electrode pad 33A is formed at an end edge of the scan electrode 33 and an electrode pad CsA is formed at an edge of the auxiliary capacitance electrode Cs.

Figure 36D:
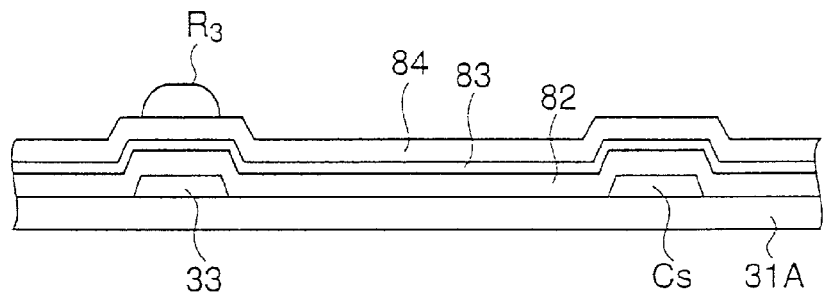

In a step in FIG. 36D, a gate insulating film 82, an amorphous silicon film 83 and an SiN film 84 are accumulated in sequence. And, a resist pattern R3 is formed on the SiN film 84 so as to cover over the TFT 31G.

Figure 36E:
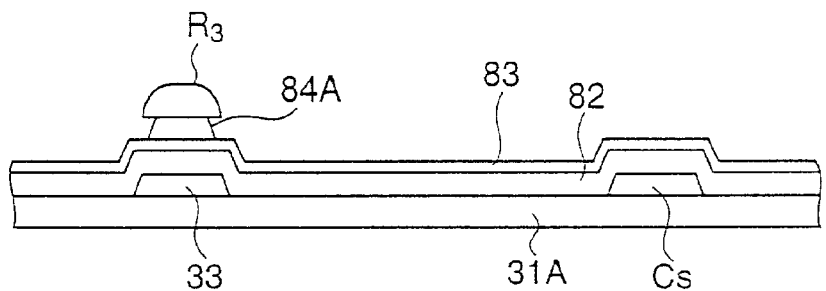
Figure 36E:
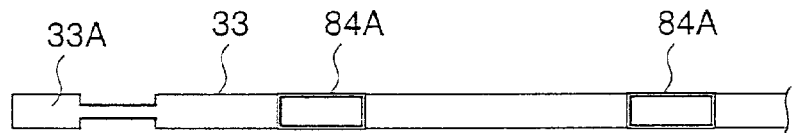
Figure 36F:
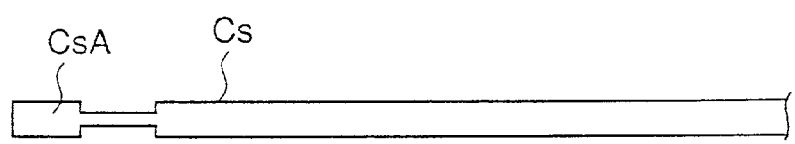

Moreover in a step in FIG. 36E, the patterning process is conducted for the SiN film 84 by using the resist pattern R3 as a mask. And, the the SiN channel protection film 84A is corresponded to a channel region of the TFT 31T and then is formed. FIG. 36F is a plan view diagram showing a structure formed in this method.

Figure 36G:
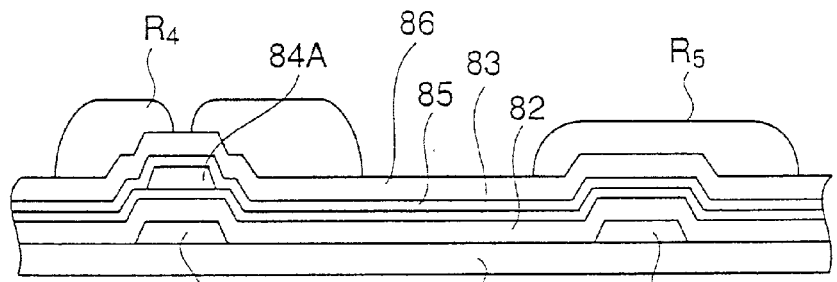
Figure 36H:
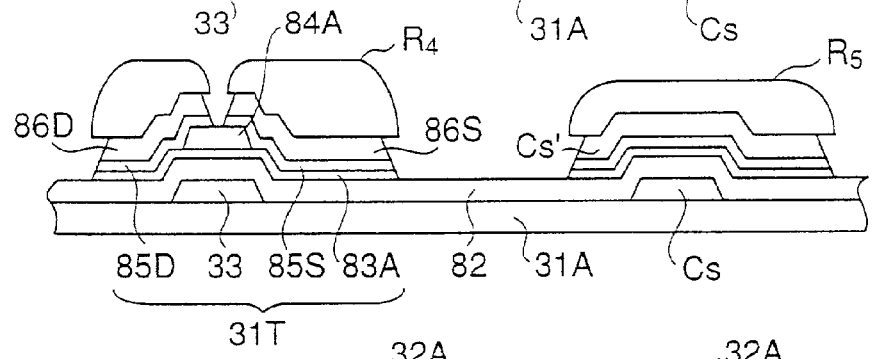
Figure 36I:
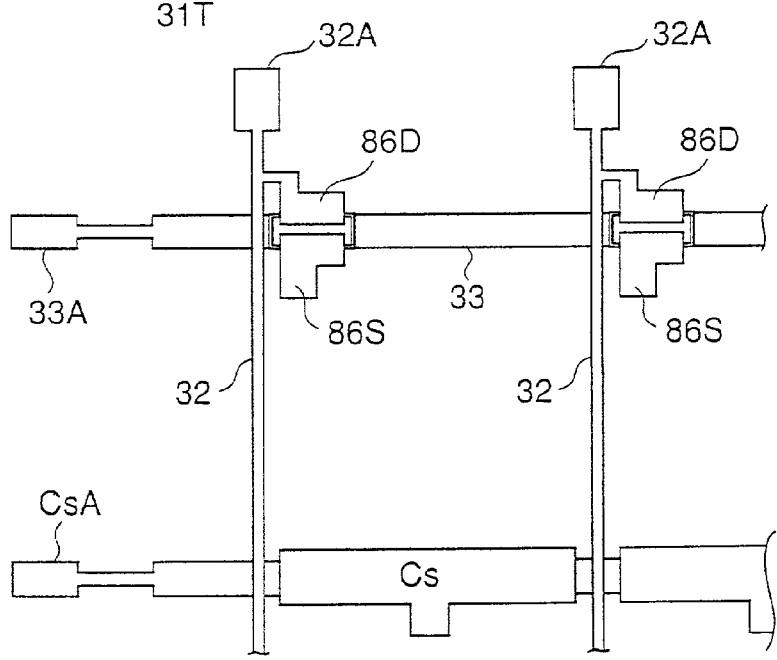

In a step in FIG. 36G, n+ type amorphous silicon film 85 and a conducting film 86 forming the signal electrode 32 are sequentially accumulated and a resist pattern R4 corresponding to the signal electrode 32 and a resist pattern R5 corresponding to the auxiliary capacitance electrode Cs are formed on the conduction film 86. The resist pattern R4 includes shapes corresponding to a source electrode pattern and a drain electrode pattern of the TFT 31T. By conducting the patterning process for layers 83, 85 and 86 by the resist patterns R4 and R5 as masks, as shown in FIG. 36H and FIG. 36I, a source electrode pattern 86S and a drain electrode pattern 86D of the TFT 31T are formed with a channel layer pattern 83A, a source pattern 85S and a drain pattern 85D forming the TFT 31T. On the other hand, in the auxiliary capacitance electrode region, a facing electrode pattern Cs' forming a capacitor is simultaneously formed with the auxiliary capacitance electrode Cs. FIG. 36I is a plan view diagram showing a structure in this method. In the patterning process in FIG. 36H, the signal electrode 32 including the end of the pad electrode 32A is formed by the patterning process for the conducting film 86.

Figure 36J:
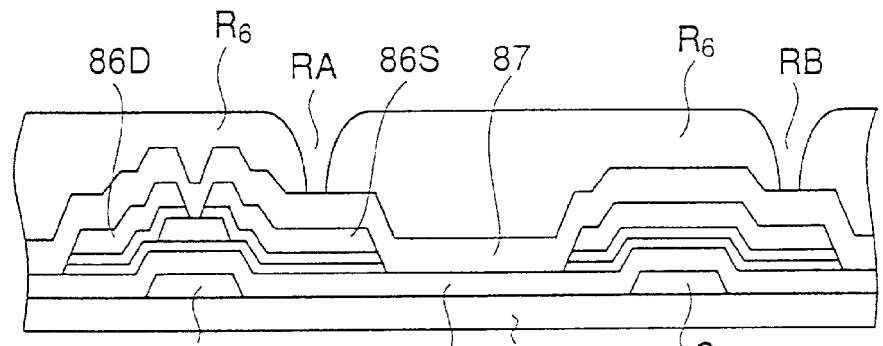

In a step in FIG. 36J, a protection film 87 is uniformly accumulated on the structure shown in FIG. 36H. Moreover, a resist pattern R6 forms resist opening parts RA and RB corresponding to the source electrode pattern 86S and the facing electrode pattern Cs' facing the auxiliary capacitance electrode Cs, respectively, on the protection film 87.

Figure 36K:
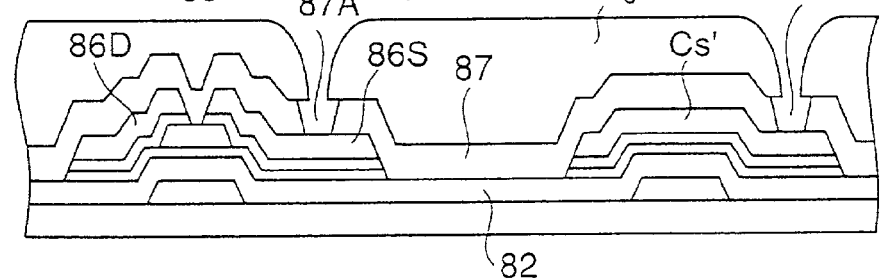
Figure 36L:
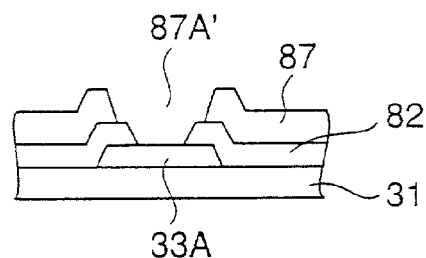
Figure 36M:
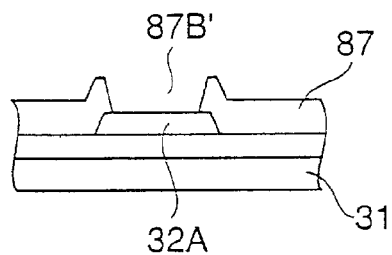
Figure 36N:
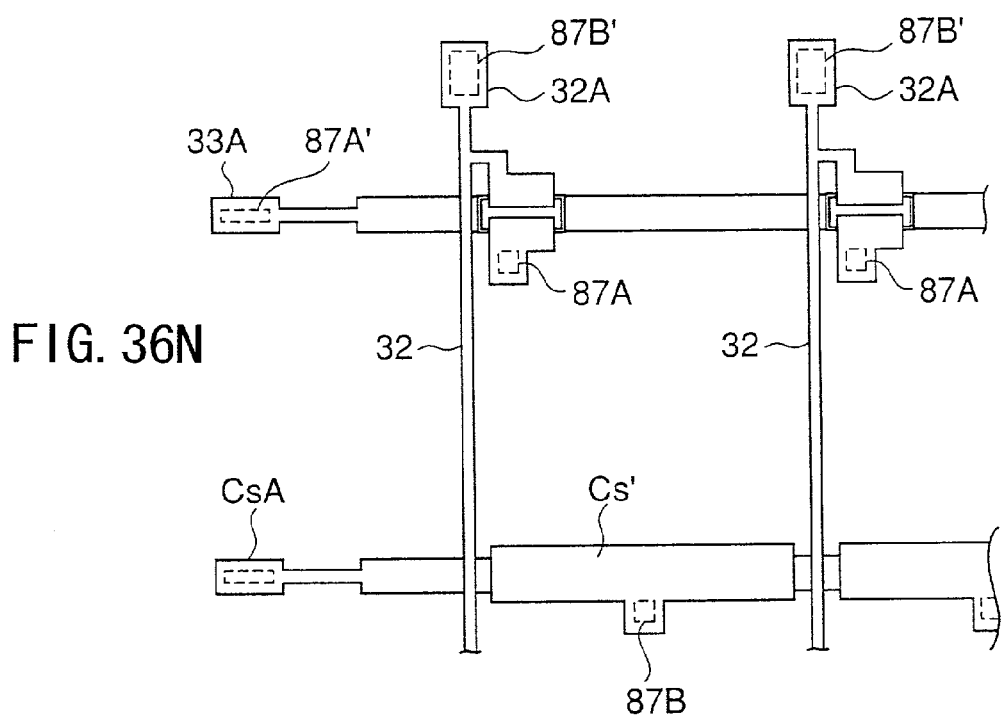

In a step in FIG. 36K, the patterning process is conducted for the protection film 87 by the resist pattern R6 as a mask and then contact holes 87A and 87B are formed to the resist openings RA and RB, respectively, in the protection film 87. In addition, as shown in FIG. 36L, simultaneously, a opening part 87A' exposing the pad 33A in the protection film 87 is formed at the electrode pad 33A. Subsequently, as shown in FIG. 36M, a contact hole 87A' exposing the pad electrode CsA in the protection film 87 is formed at the pad electrode 32A. FIG. 36N is a plan view diagram showing a structure obtained in this method.

Figure 36O:
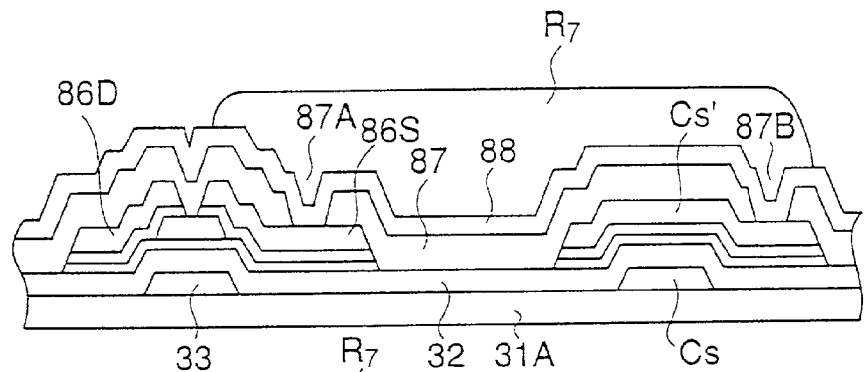
Figure 36P:
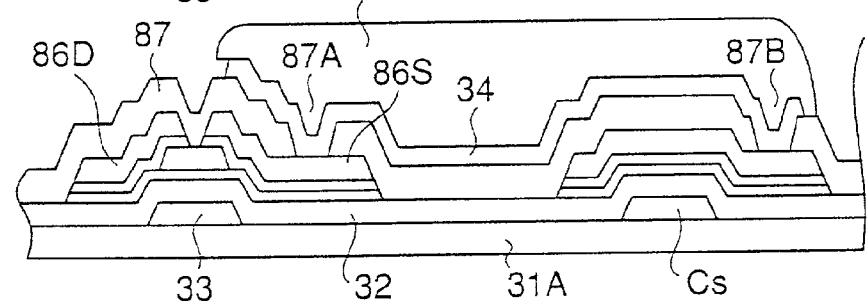

In a step in FIG. 36O, on the structure in FIG. 36N, the ITO film 88 is uniformly accumulated so that the contact holes 87A and 87B contact the source region 86S and the facing electrode Cs facing the auxiliary capacitance electrode Cs, respectively. Subsequently, a resist pattern R7 corresponding to a pixel electrode 34 to be formed is formed on the ITO film 88. In a step in FIG. 36P, the patterning process is conducted for the ITO film 88 by the resist pattern R7 as a mask, so that the pixel electrode 34 is formed.

Figure 36Q:
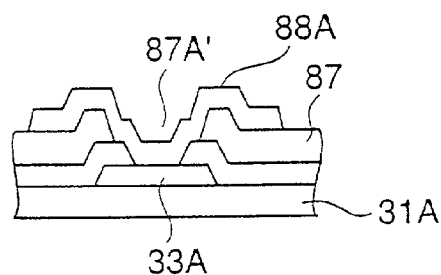
Figure 36R:
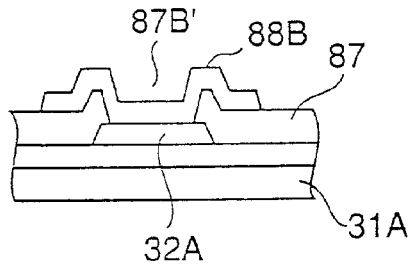

Simultaneously, as shown in FIG. 36Q and FIG. 36R, the electrode pads 33A and 32A are formed so that the ITO contact pads 88A and 88B contact the electrode pads 33A and 32A at the contact holes 87A' and 87B', respectively.

Figure 36S:
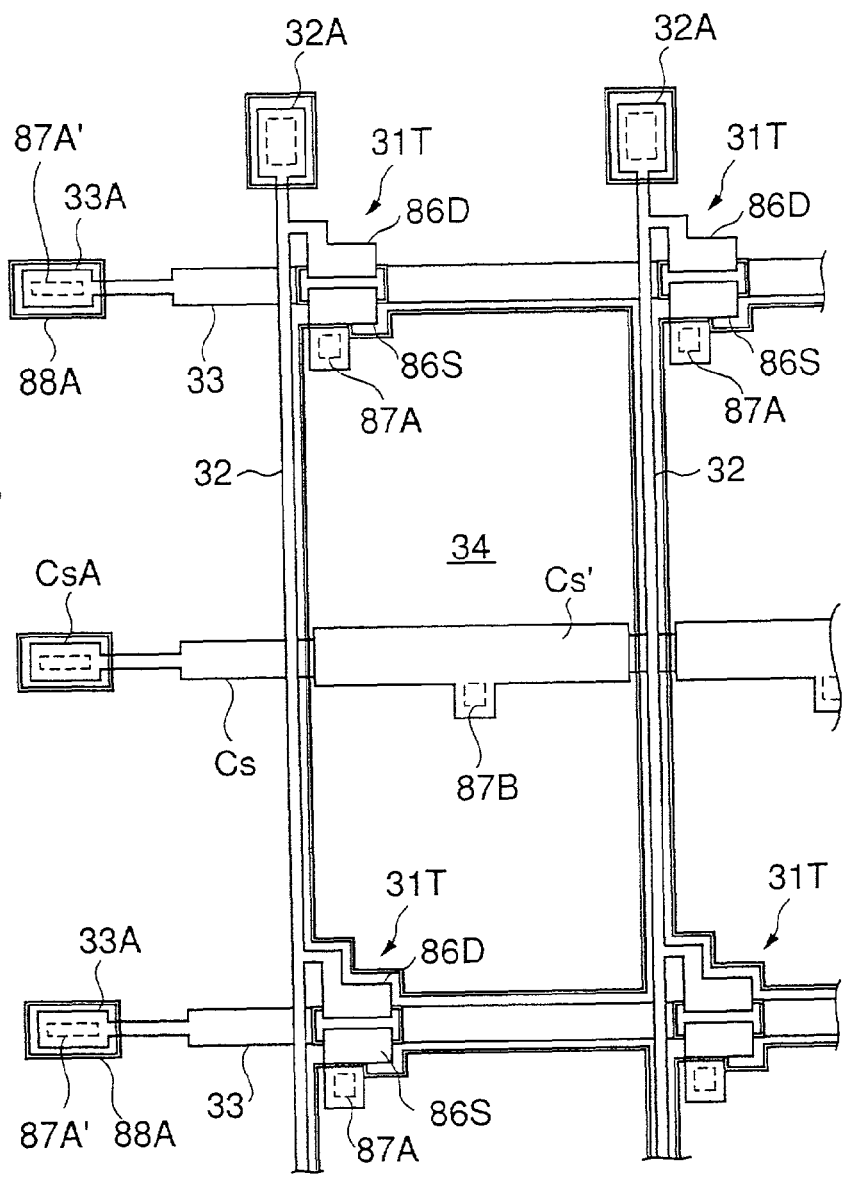

FIG. 36S is a plan view diagram showing the substrate 31A obtained in this method.

Figure 36T:
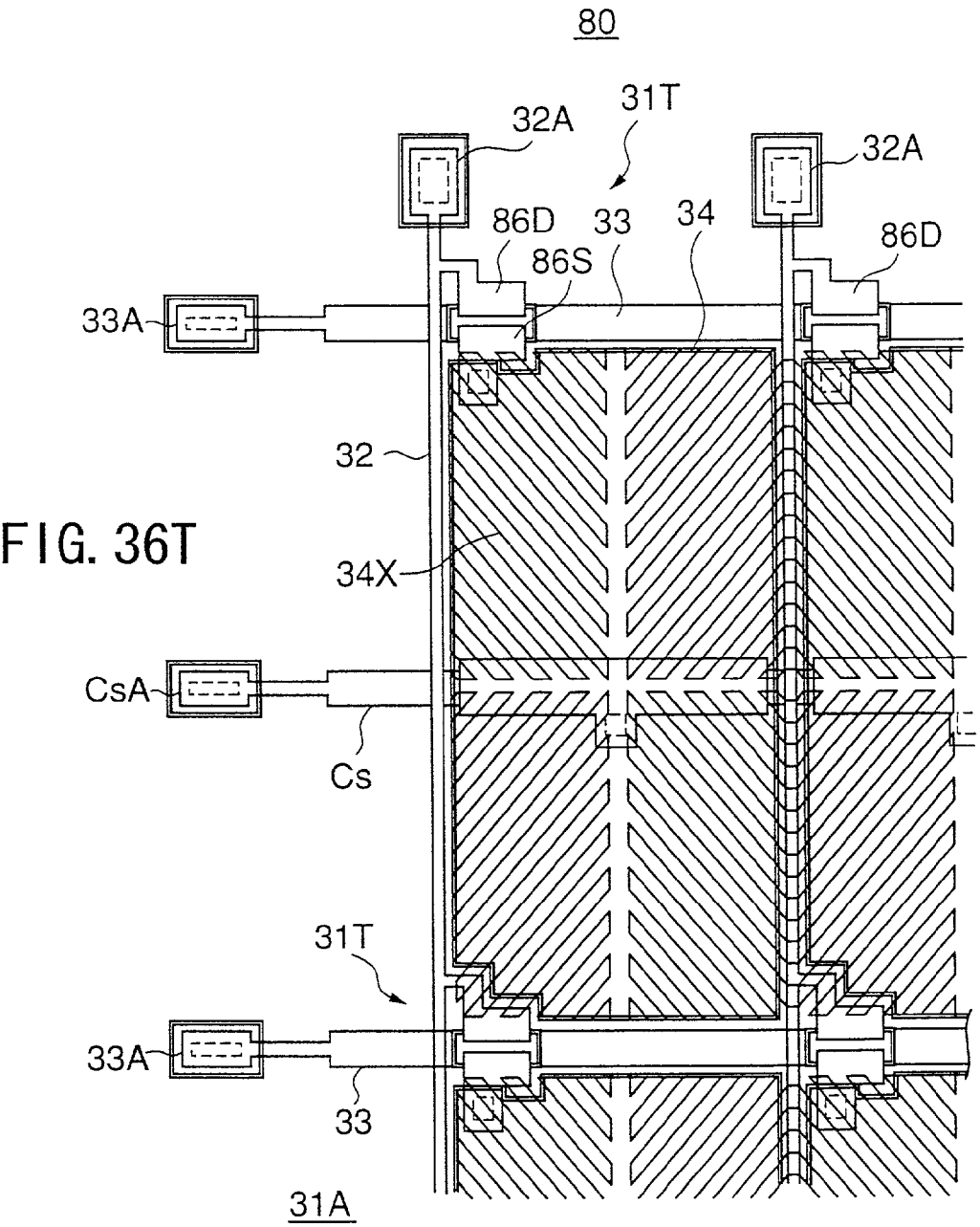

In a step in FIG. 36T in the sixth embodiment, a resist film is uniformly covered over an entire surface of the structure shown in FIG. 36S. And, by an exposing process and a developing process, a structural pattern 34X, which includes micro branches corresponding to the micro-cutout patterns 34A previously described in FIG. 8, is formed by a shape of a resist pattern. Then, a liquid crystal display device 80 corresponding to the liquid crystal display device 30 is obtained.

In order to effectively regulate the orientation direction of the liquid crystal molecules for the structural pattern 34X, a width of each micro branch is required to be less than 6 μm. For example, the resist film can be in a range of 600 nm through 800 nm by adjusting a coefficient of viscosity of a resist SC-1811 of Shipley Far East Corporation. Preferably, the resist film can be approximately 700 nm in thickness. It is possible to maintain a 100 nm to 700 nm thickness of the resist film as the resist pattern after the exposing process and the developing process, by a uniformly approximate 700 nm thickness of the resist film. In this case, in order to suppress a decrease of a film thickness at a top edge of each branch in the developing process, a gh line stepper is used in the exposing process and preferably an exposure dose, which generally is set to be more than double of an exposure threshold, is set to be approximate 1.5 times as much as the exposure threshold, a so called "underexposure".

After the exposing process and the developing process, an ashing process and a removing process are conducted to a surface layer of the resist pattern 34X so that the thickness of the resist pattern 34X is approximate 300 nm. For example, in the ashing process, a reactive plasma etching device is used while $O_2$ is supplied at 400SCCM flow by a pressure under 30.0 Pa and a 600W plasma power.

After the ashing process, a thermosetting process is conducted for the resist pattern 34X. That is, the thermosetting process begins at a temperature of less than 140° C., preferably approximately at 130° C. The thermosetting process gradually rises up to 140° C.–270° C. and preferably heats and hardens the resist pattern 34X at a high temperature and high humidity for more than 10 minutes. In this method, even if the micro-branches of the resist pattern 34X are 6 μm in width, it is possible to harden the resist pattern 34X without deteriorating the shapes of the micro-branches.

Figure 37:
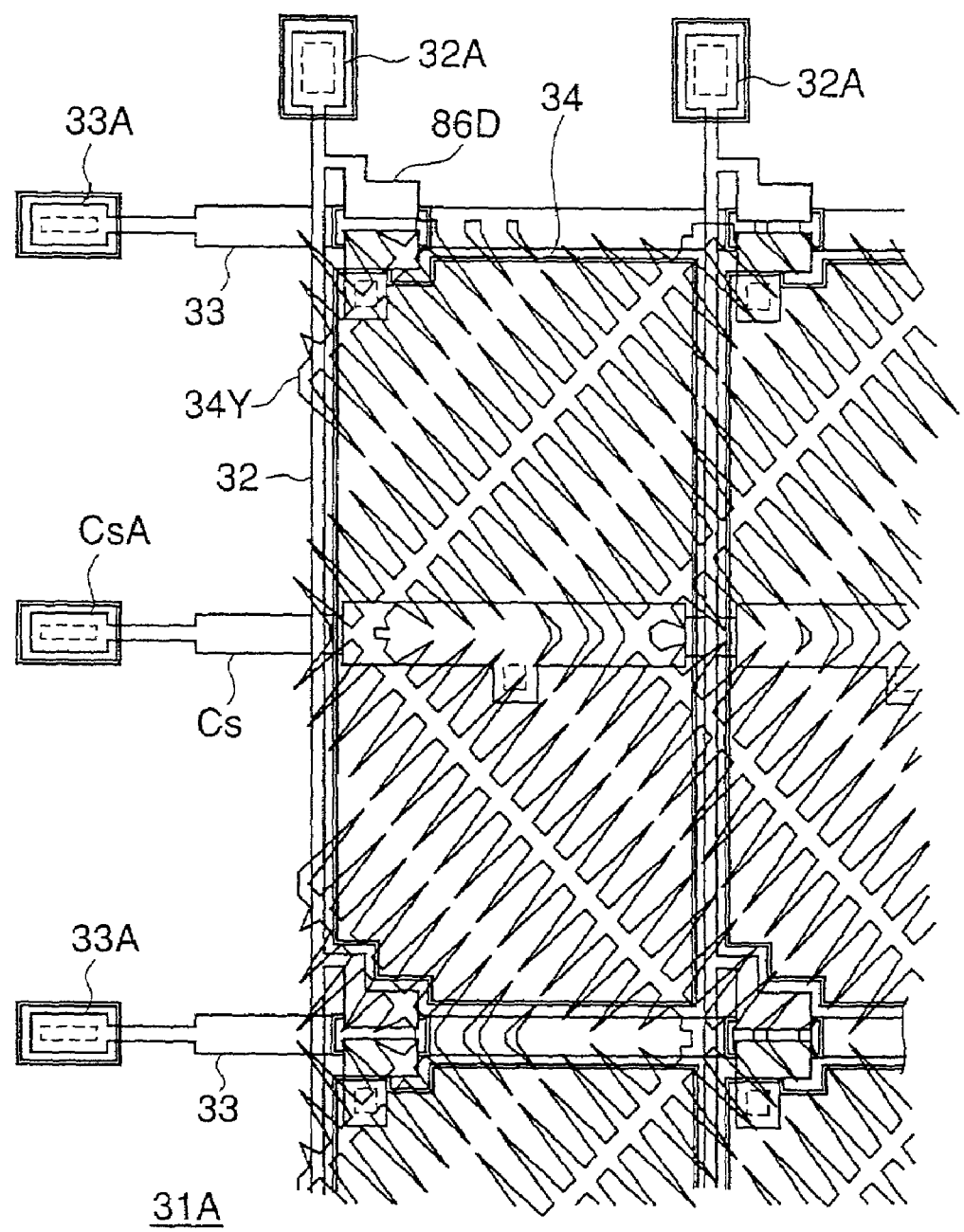
FIG. 37 is a diagram showing a variation of the liquid crystal display device according to a sixth embodiment of the present invention.

Moreover, in the same method, as shown in FIG. 37, it is possible to form a resist pattern 34Y having micro-branches having sharpened edges. Furthermore, according to the sixth embodiment, it is possible to form the directional pattern 24E or 24E' previously described in FIG. 21 or FIG. 23. A configuration in FIG. 37 approximately corresponds to the configuration of the liquid crystal display device 50.

In the sixth embodiment, as the resist film, various polyimide resins, novolak resins or acrylic resins can be used.

[Seven Embodiment]

A configuration of a liquid crystal display device 90 will now be described according to a seventh embodiment.

In the liquid crystal display device 90 according to the seventh embodiment, a thickness of each branch of the pattern 34X in FIG. 36 or the pattern 34Y in FIG. 37 is thinner toward the end edge.

Figure 38A:
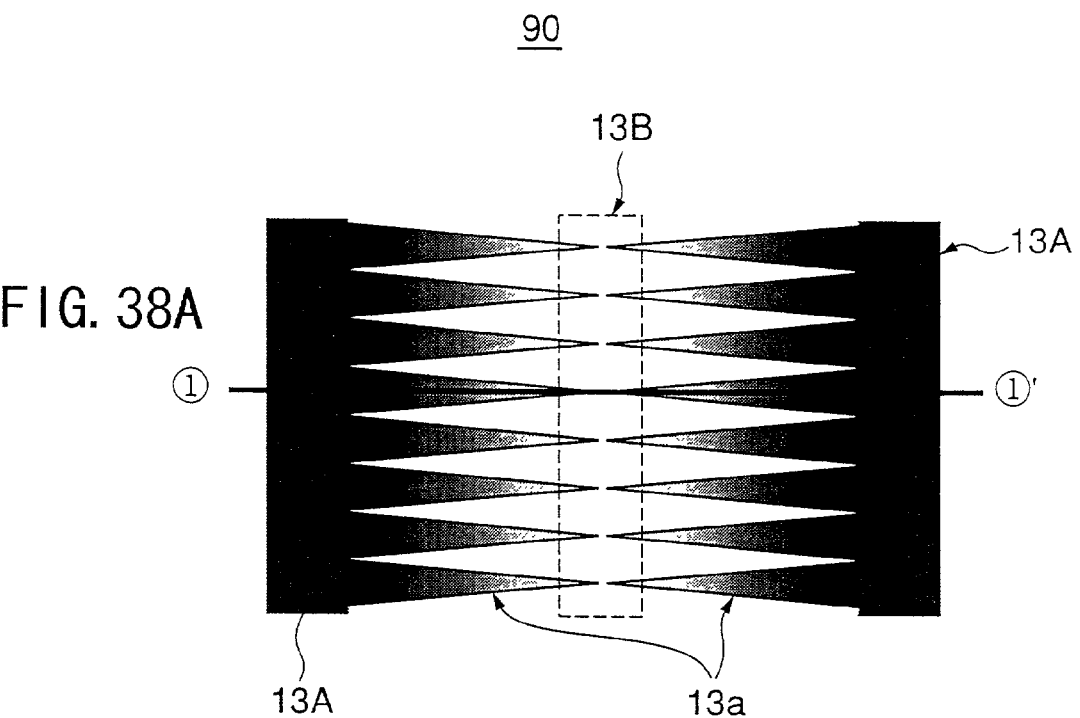
FIG. 38A and FIG. 38B are diagrams showing a principle of a liquid crystal display device according to a seventh embodiment of the present invention.
Figure 38B:
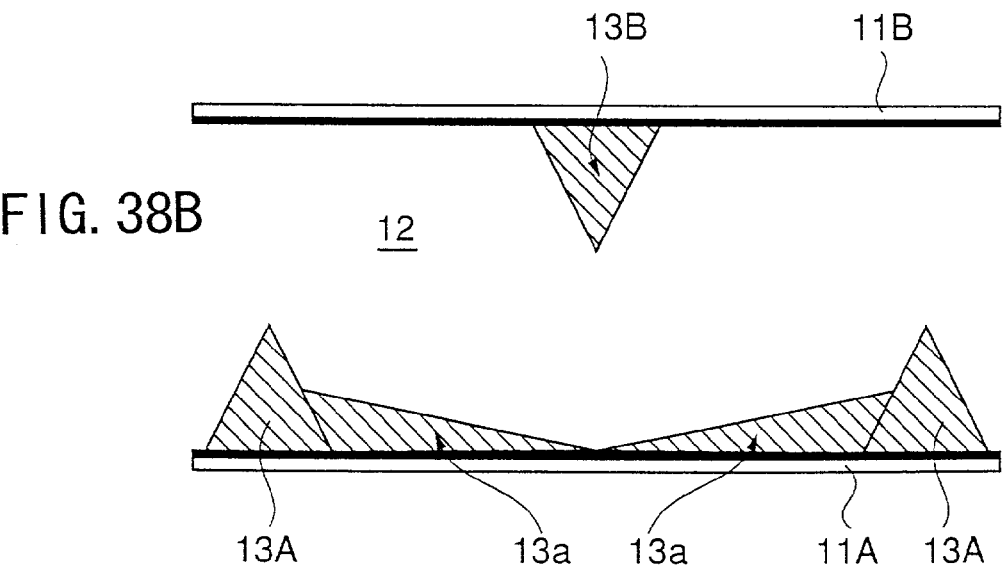

FIG. 38A and FIG. 38B are diagrams showing a principle of the seventh embodiment according to the present invention.

Referring to FIG. 38A and FIG. 38B, the liquid crystal display device 90 is configured based on the liquid crystal display device 10 in FIG. 1A and FIG. 1B, and the liquid crystal layer 12 is maintained between the glass substrate 11A where the projection pattern 13A is formed and the glass substrate 11B where the projection pattern 13B is formed. Micro directional patterns 13a, which have sharpened edges laterally from the projection pattern 13A, are extended similarly to the directional pattern 24E in FIG. 21 or the directional pattern 24E'.

In this case, as shown in a sectional view diagram in FIG. 38B, not only a width but also a height and a thickness of the micro directional pattern 13a are gradually decreased toward the edge. As a result, slopes facing each other are formed by a pair of the micro directional patterns 13a facing each other. The projection pattern 13B on glass substrate 11B is formed so as to face toward the micro directional pattern 13a and then a pre-tilt is applied to the liquid crystal molecules in the liquid crystal layer 12. As a result, when the driving electric field is applied to the liquid crystal layer 12, the liquid crystal molecules are rapidly tilted to orient toward in an approximate horizontal direction. In this case, the micro directional pattern 13a is periodically repeated to form typically at intervals of a few µm. Thus, as described in previous embodiments, the tilt direction of the liquid crystal molecules is regulated in the extended direction of the micro directional pattern 13a.

Figure 39:
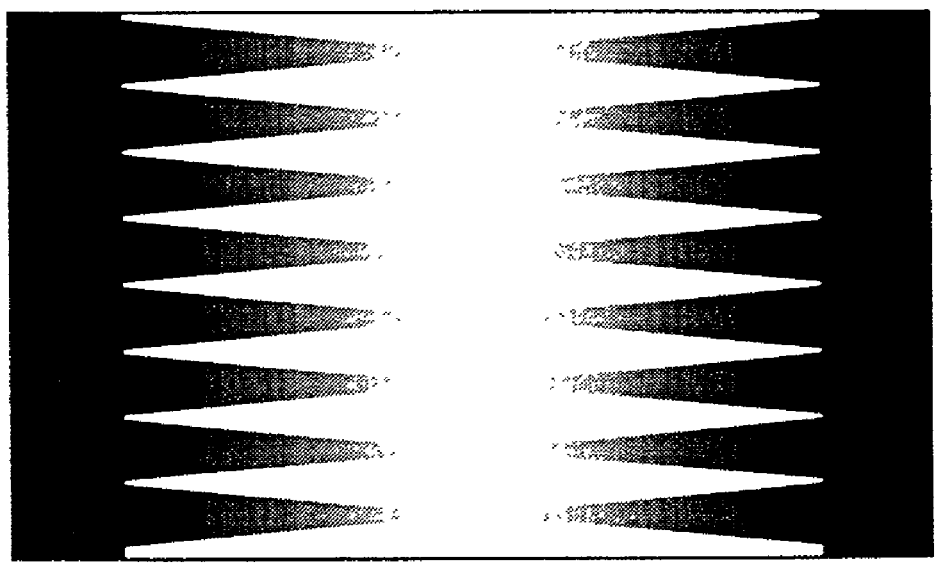
FIG. 39 is a diagram showing a photo mask used for fabricating the liquid crystal display device according to the seventh embodiment of the present invention.

For example, the micro directional pattern 13a forming a slope can be formed by exposing a positive resist by using a photo mask shown in FIG. 39.

As a typical example, a spin coating process, in which a positive resist S1808 manufactured by Shipley Far East corporation is 0.1 µm to 3 µm in thickness, typically approximate 1.5 µm, is conducted so as to cover the pixel electrode 13A on the glass substrate 13A.

Subsequently, the resist film masked by the photo mask in FIG. 39 is exposed to ultraviolet rays and then a developing process, a rinsing process and a baking process are conducted. Consequently, as shown in FIG. 38A and FIG. 38B, it is possible to form the projection pattern 13A so that the micro directional pattern 13a is laterally extended.

Figure 40:
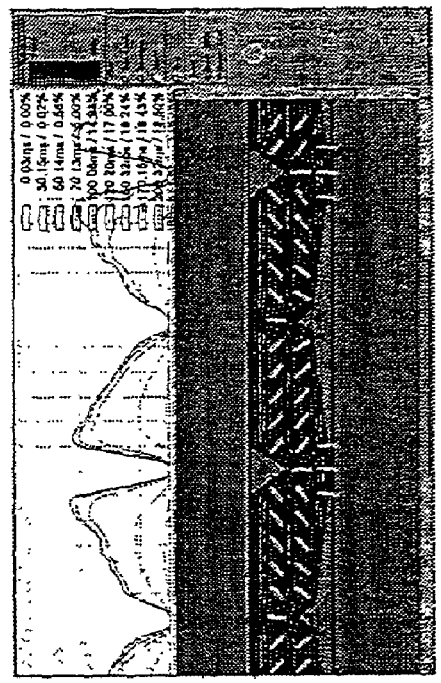
FIG. 40 is diagrams showing a result of simulating an operation of the liquid crystal display device according to the seventh embodiment of the present invention.
Figure 40:
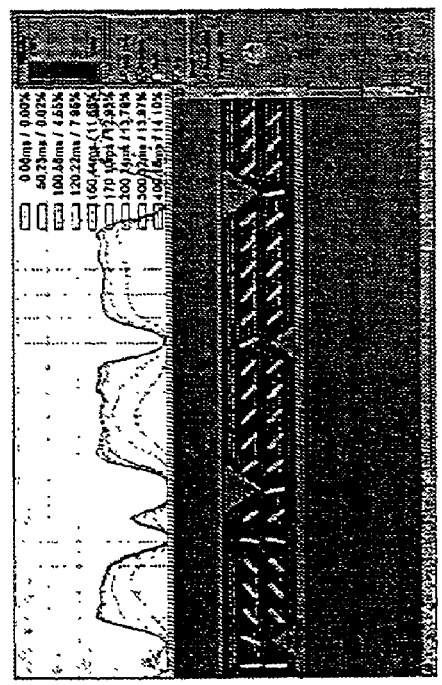

FIG. 40 is a diagram showing a result of simulating an operation of the liquid crystal display device 90 configured in this method. In FIG. 40, a right diagram shows a case of the present invention in that the micro directional pattern 13a is provided and a left diagram shows a case of the conventional configuration in that the micro directional pattern 13a is not provided. In FIG. 40, a required time to achieve to a given contrast, which is variously defined, is shown. According to the present invention, as a result of providing the micro directional pattern 13a, the required time is decreased in a vicinity of the projection pattern 13A.

Table 4 shows a comparison of the conventional liquid crystal display device 10 in FIG. 1A and FIG. 1B and the liquid crystal display device 90 in the seventh embodiment in FIG. 38A and FIG. 38B where an applied voltage is 2.5V or 3.0V.

TABLE 4

| Applied Voltage | Conventional Method | Present Invention |
| --- | --- | --- |
| 2.5 V | 520 ms | 238 ms |
| 3.0 V | 166 ms | 117 ms |

Table 4 explicitly shows that the micro directional pattern 13a contributes to reduce the response time.

Figure 41A:
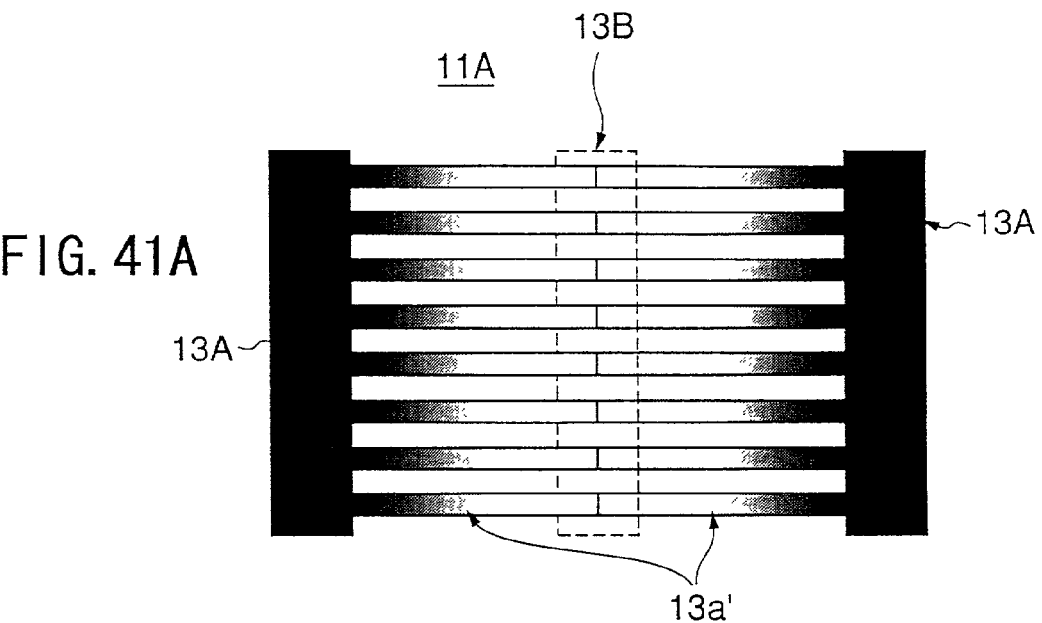
FIG. 41A is a diagram showing a pattern variation of the liquid crystal display according to the seventh embodiment of the present invention and FIG. 41B is a diagram showing another pattern variation of the liquid crystal display according to the seventh embodiment of the present invention.
Figure 41B:
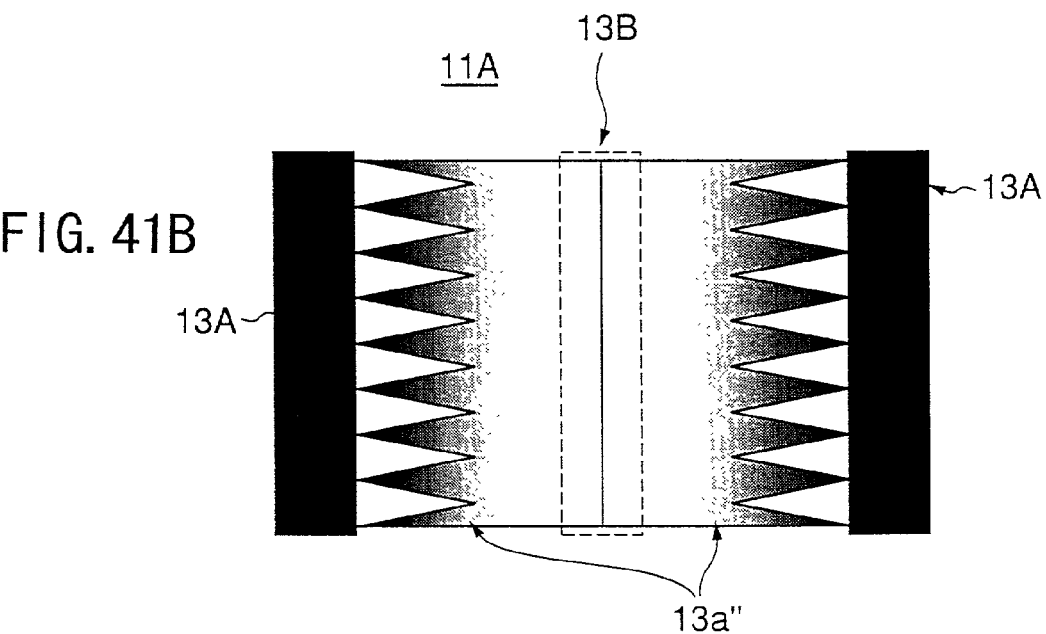

In the seventh embodiment, since the micro directional pattern 13a is inclined, it is not required for the micro directional pattern 13a to be sharpened. For example, a pattern 13a' having a uniform width shown in FIG. 41A or a pattern 13a'' in FIG. 13B which width is increased toward the edge can also obtain a similar effect.

[Eighth Embodiment]

Figure 42:
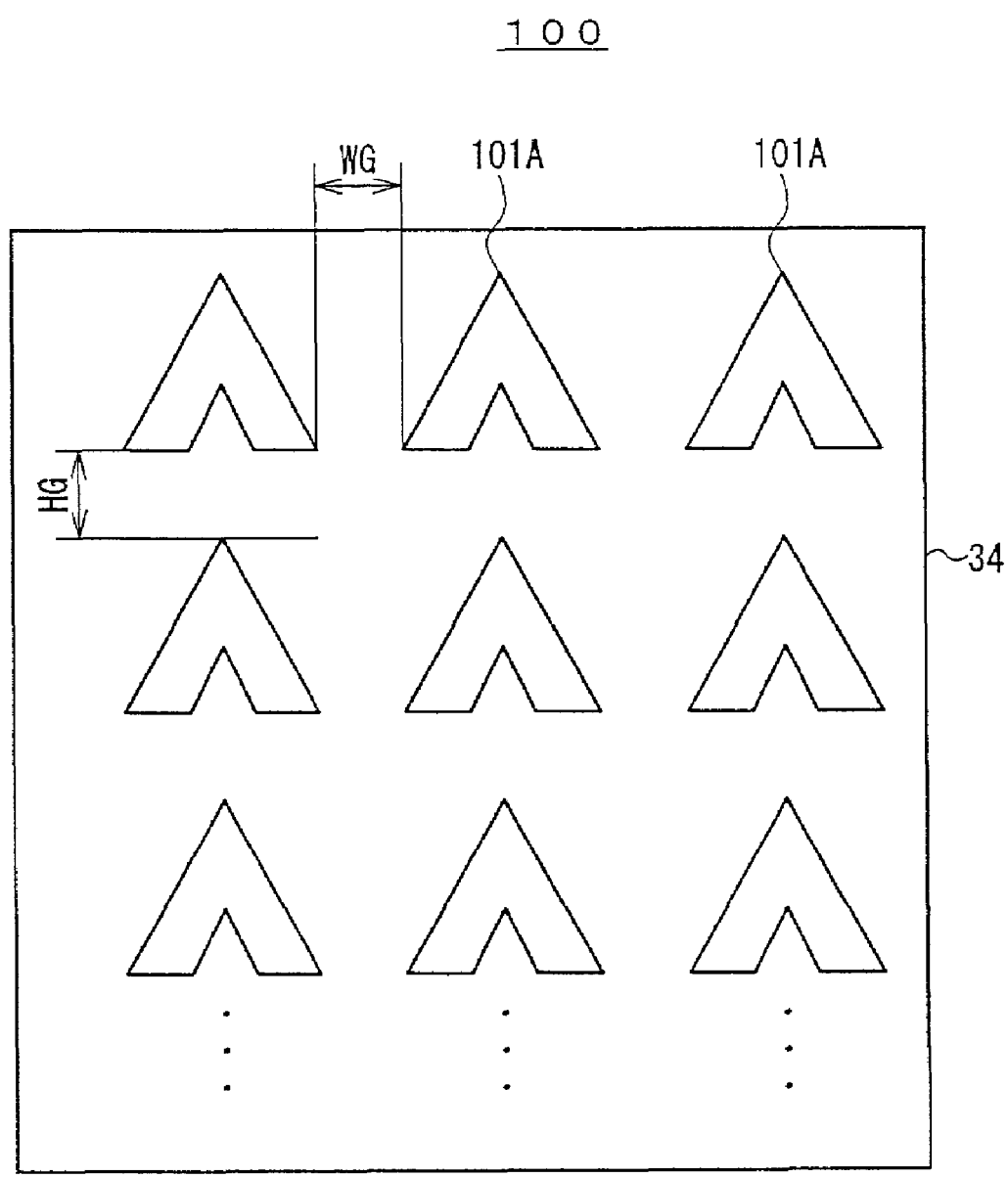
FIG. 42 is a diagram showing a liquid crystal display device according to an eighth embodiment of the present invention.

FIG. 42 is a diagram showing a liquid crystal display device 100 according to an eighth embodiment of the present invention.

The liquid crystal display device 100 in FIG. 42 is configured based on the configuration of the liquid crystal display device 30 previously described. Thus, in FIG. 42, elements that are the same as the ones in previous figures are indicated by the same reference numerals and the explanation thereof will be omitted.

Referring to FIG. 42, on the pixel electrode 34, a plurality of directional patterns 101A similar to the directional pattern 24A described in FIG. 16 is formed at column intervals WG and at row intervals HG in a matrix in a common direction.

Figure 43:
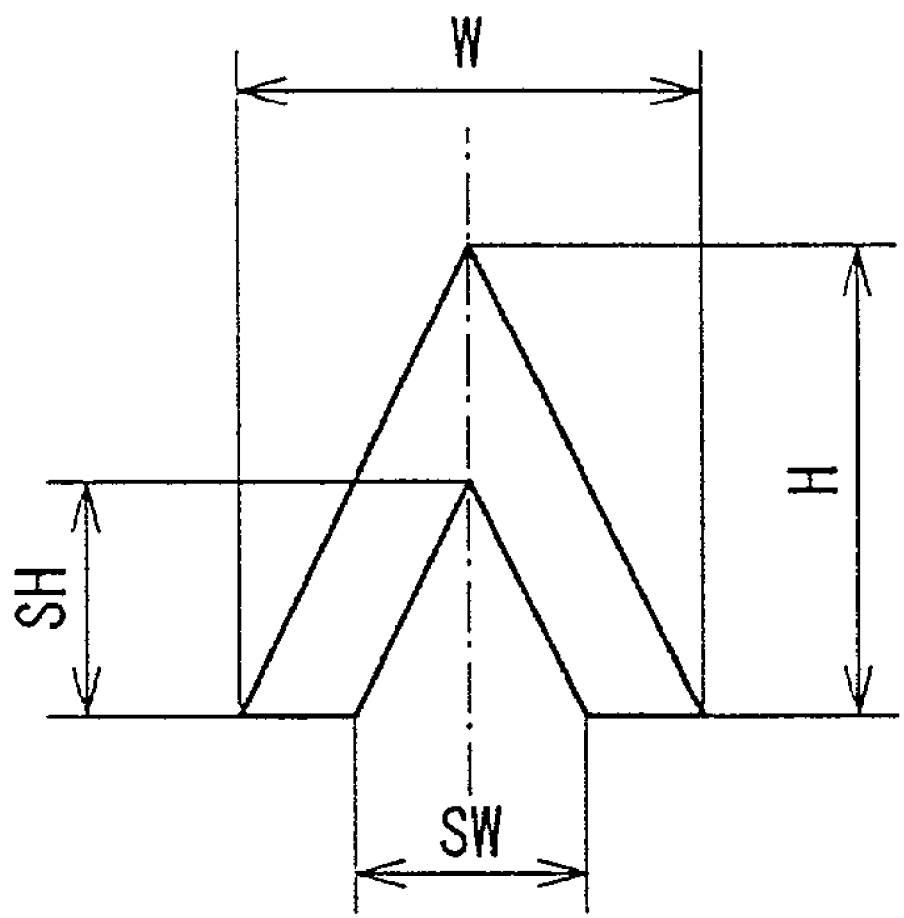
FIG. 43 is a diagram showing the directional pattern according to an eighth embodiment of the present invention.

FIG. 43 is a diagram showing the directional pattern 101A according to an eighth embodiment of the present invention.

Referring to FIG. 43, the directional pattern 101A is a wedge shape with a width W and a height H and a cutout portion with a width SW and a height SH is formed at a bottom of the directional pattern 101A. The directional pattern 101A can be a resist pattern formed in the pixel electrode 34 or a cutout pattern formed in the pixel electrode 34. In this case, the width W is 8 µm, the width SW is 4 µm, the height H is 30 µm and the height SH is 5 µm to 20 µm, and the directional pattern 101A is repeated to be arranged at intervals of 2 µm width WG and at intervals of 0 µm height HG on the pixel electrode 34.

By forming the directional pattern 101A, the liquid crystal molecules in the liquid crystal layer 31 are regulated to orient in a direction defined by the directional pattern 101A, as previously described. Consequently, when the driving voltage is applied to the liquid crystal layer 31, the liquid crystal molecules are quickly tilted. Thus, a transition to a nine-layer state is occurred at a high speed.

Figure 44:
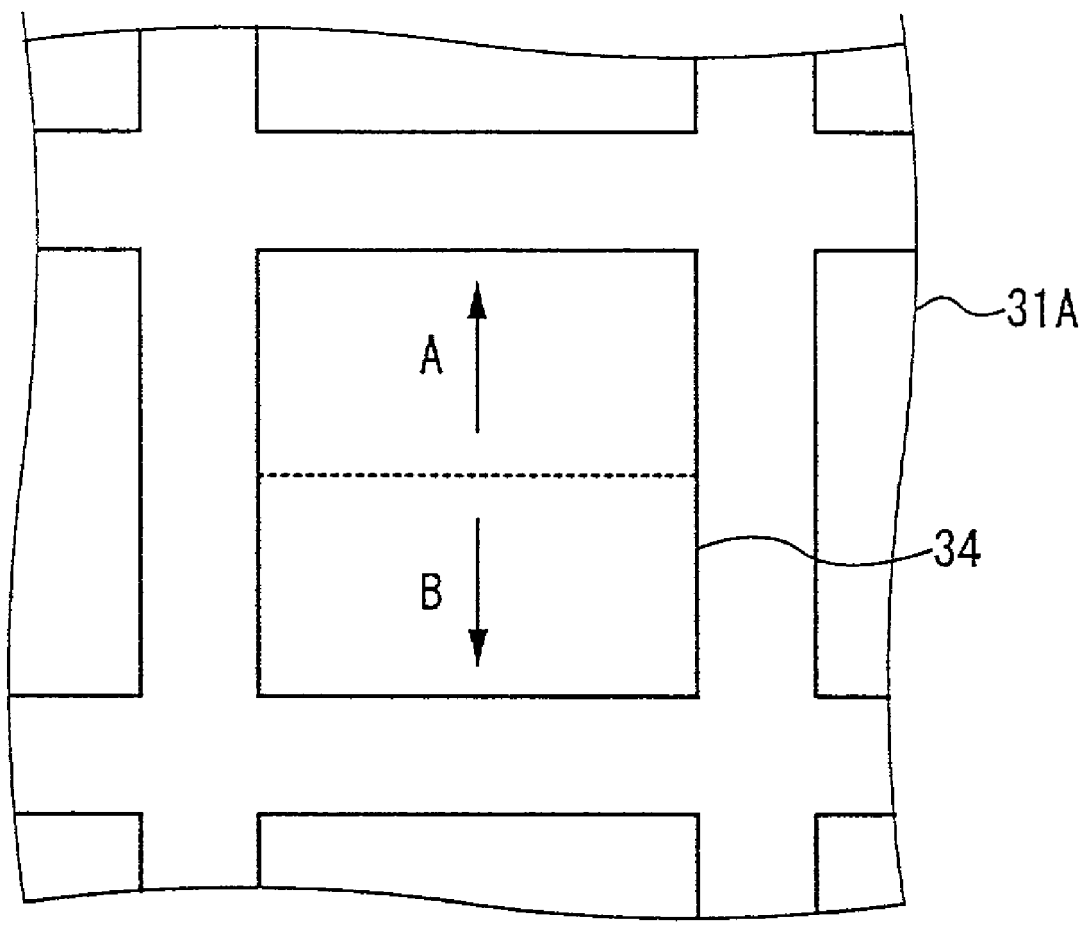
FIG. 44 is a diagram showing a first variation of the liquid crystal display device 100 in FIG. 42, according to the eighth embodiment of the present invention.

FIG. 44 is a diagram showing a first variation of the liquid crystal display device 100 in FIG. 42, according to the eighth embodiment of the present invention. In FIG. 44, the pixel electrode 34 are sectioned into a domain A and a domain B in the liquid crystal display device 100 in FIG. 42, and the orientation direction of the directional pattern 101A is different in each of the domain A and the domain B as shown by arrows. According to the first variation of the eighth embodiment, it is possible to improve a characteristic of a visible angle in the liquid crystal display device 100.

Figure 45:
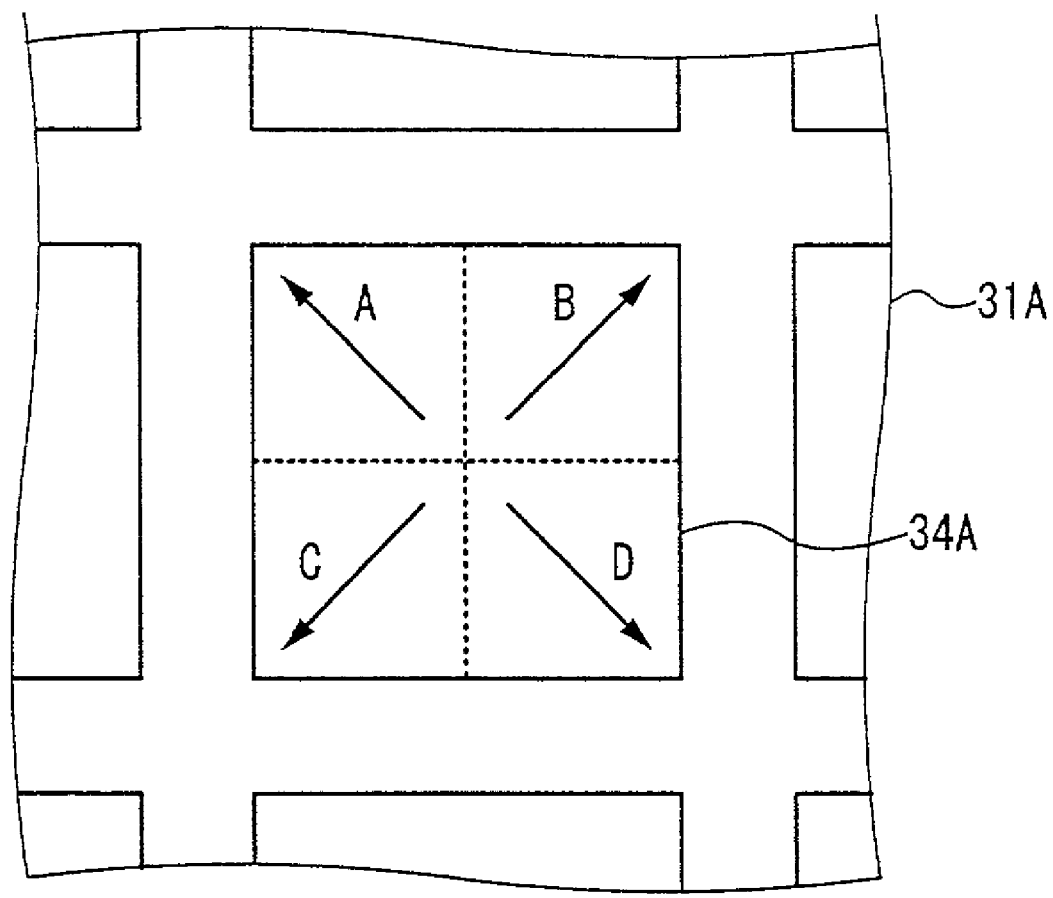
FIG. 45 is a diagram showing a second variation of the liquid crystal display device in FIG. 42, according to the eighth embodiment of the present invention.

FIG. 45 is a diagram showing a second variation of the liquid crystal display device 100 in FIG. 42, according to the eighth embodiment of the present invention. In FIG. 45, in the liquid crystal display device 100 in FIG. 42, the pixel electrode 34 is sectioned into domains A, B, C and D similarly to the configuration in FIG. 15 and the orientation direction of the directional pattern 101A is different in each of domains A, B, C and D as shown by arrows. According to the second variation of the eighth embodiment, it is possible to further improve the characteristic of the visible angle in the liquid crystal display device 100.

Figure 46:
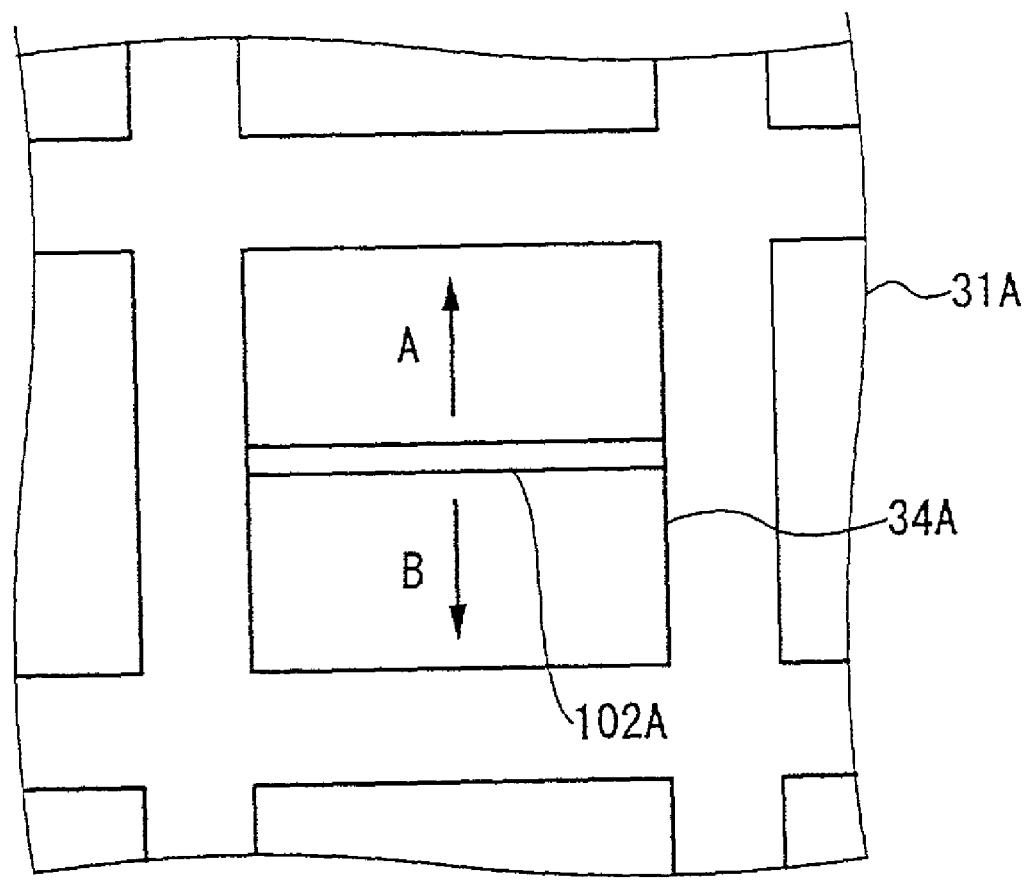
FIG. 46 is a diagram showing a third variation of the liquid crystal display device in FIG. 44, according to the eighth embodiment of the present invention.

FIG. 46 is a diagram showing a third variation of the liquid crystal display device 100 in FIG. 44, according to the eighth embodiment of the present invention. In FIG. 46, in the liquid crystal display device 100 in FIG. 42, a structural pattern 102 configured by a resist pattern or a cutout pattern is formed similarly to the projection pattern 13A in the liquid crystal display device 10 in FIG. 1A and FIG. 1B, at a border between the domain A and the domain B.

According to the third variation of the eighth embodiment, it is possible to further improve regulating the orientation of the liquid crystal molecules in directions, which are indicated by arrows, of the directional pattern 101A by the structural pattern 102.

Figure 47:
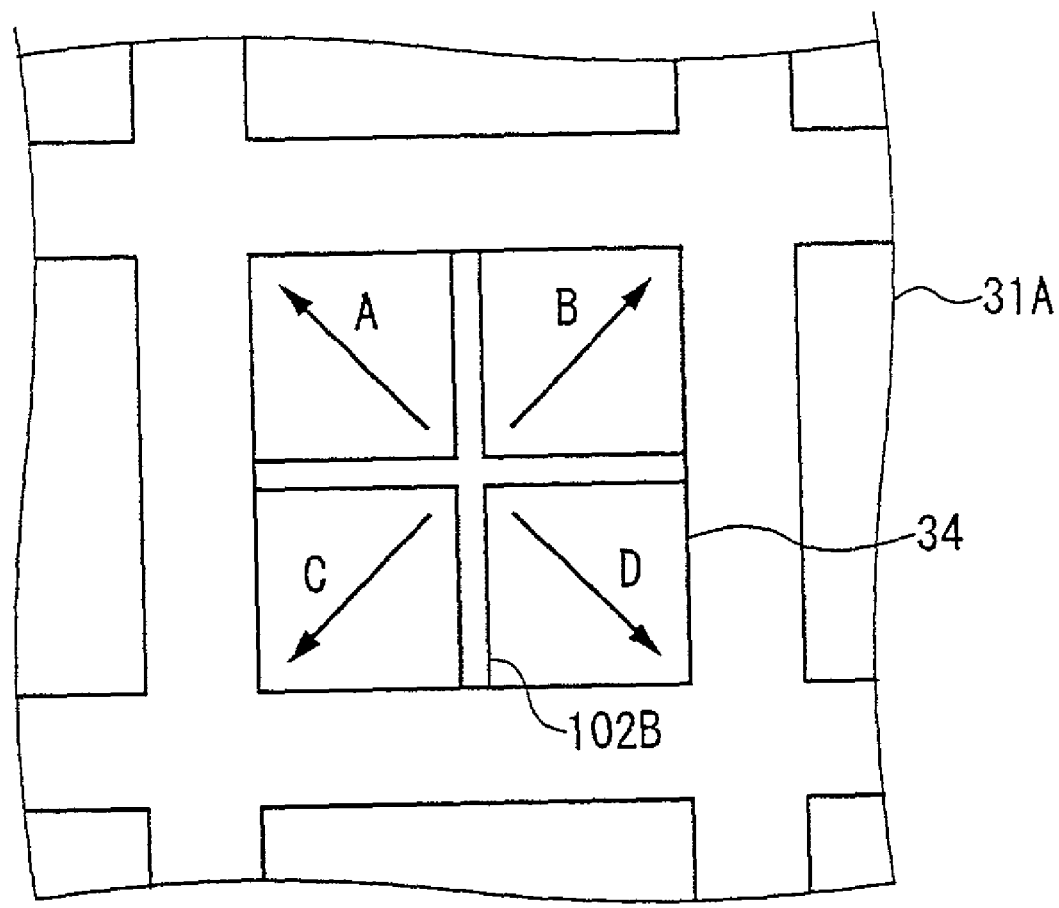
FIG. 47 is a diagram showing a fourth variation of the liquid crystal display device 100 in FIG. 45, according to the eighth embodiment of the present invention.

FIG. 47 is a diagram showing a fourth variation of the liquid crystal display device 100 in FIG. 45, according to the eighth embodiment of the present invention. In FIG. 47, a lattice shaped structural pattern 102B configured by a lattice shaped resist pattern or a lattice shaped cutout pattern is formed in the configuration of the liquid crystal display device 100.

According to the fourth variation of the eighth embodiment, since the lattice shaped pattern 102B is formed, it is possible to further improve regulating the orientation of the liquid crystal molecules in directions directed by the directional pattern 101A and indicated by arrows.

Figure 48:
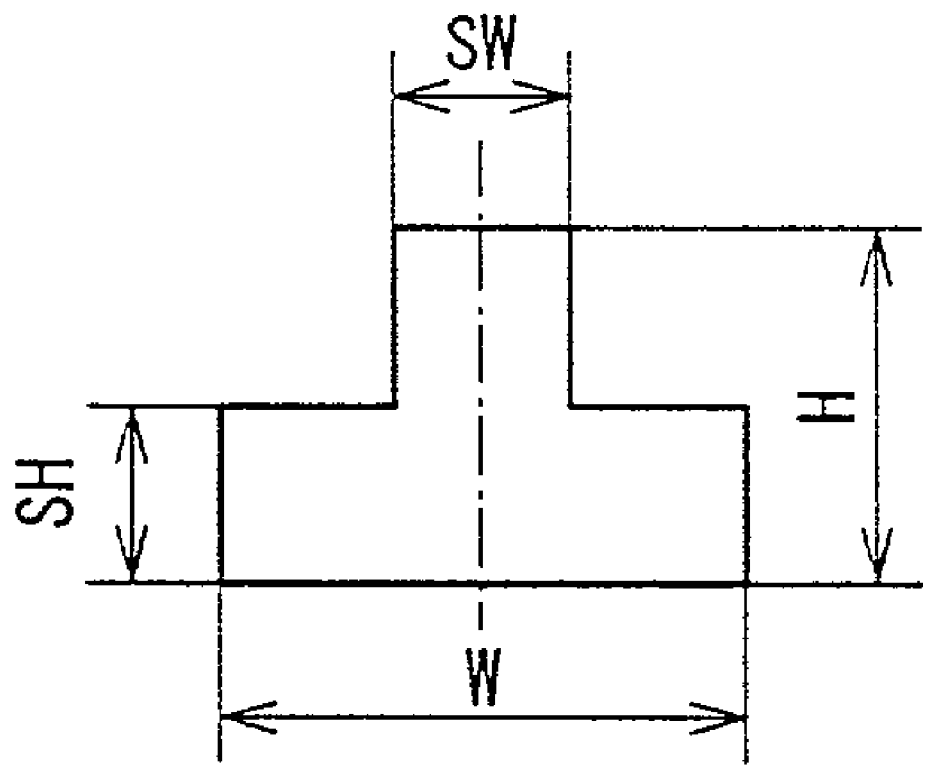
FIG. 48 is a diagram showing a fifth variation of the directional pattern according to the eighth embodiment of the present invention.

FIG. 48 is a diagram showing a fifth variation of the directional pattern 101A. In FIG. 48, another directional pattern 101B based on the directional pattern 101A is shown.

Referring to FIG. 48, the directional pattern 101B is an inverted T pattern having a width W and a height H, in which a bottom member has the width W and a height SH and a projecting member has a width SW and projects from the bottom member.

As a typical example, the width W is set from 5 μm to 8 μm, the height is set from 10 μm to 30 μm, the width SW of the projecting member is set from 2 μm to 3 μm, and the height SH of the bottom member is set from 3 μm to 5 μm. The directional pattern 101A is arranged at row intervals HG of 2 μm and at column intervals WG of 2 μm on the pixel electrode 34 in the configuration in FIG. 42.

Figure 49:
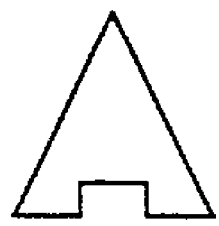
FIG. 49 shows diagrams of various directional patterns, instead of the directional pattern, according to the eighth embodiment of the present invention.
Figure 49:
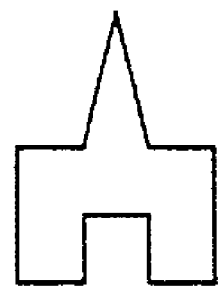
Figure 49:
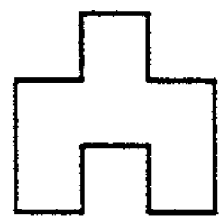
Figure 49:
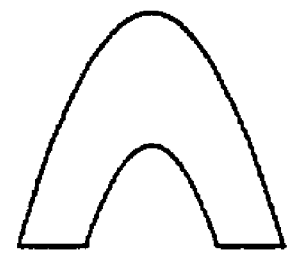
Figure 49:
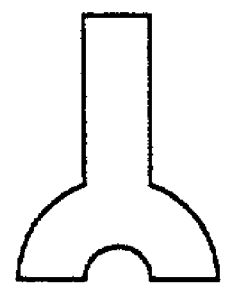
Figure 49:
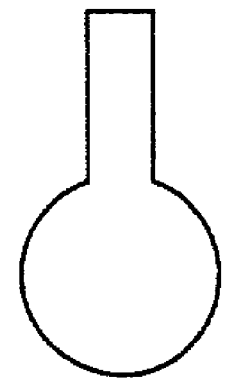

FIG. 49 shows diagrams of various directional patterns, instead of the directional pattern 101A or 101B.

These various directional patterns in FIG. 49 generally have line symmetric shapes that are not rotation symmetries. As previously described, the various directional patterns can be resist patterns formed on the pixel electrode 34 or cutout patterns formed in the pixel electrode 34.

Figure 50A:
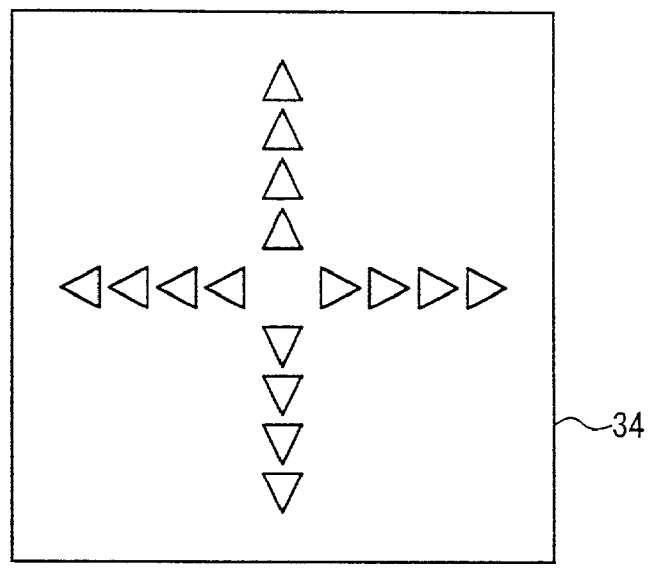
FIG. 50A and FIG. 50B are diagrams showing arrangement variations of the directional pattern according to the eighth embodiment of the present invention.
Figure 50B:
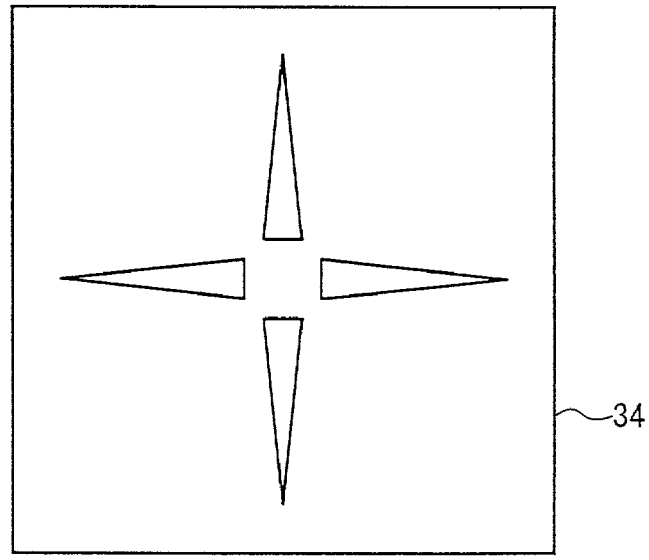

FIG. 50A and FIG. 50B are diagrams showing arrangement variations of the directional pattern according to the eighth embodiment of the present invention.

In FIG. 50A, right triangle shaped patterns are arranged to form a cross shape where a top edge of each directional pattern directs an orientation. A set of the directional patterns regulates the orientation of the liquid crystal molecules. In this case, the right triangle shaped patterns are not the directional patterns having rotation symmetries. However, it is possible to realize predetermined effects by forming the set of non-directional patterns such as the right triangle shaped patterns.

On the other hand, in a configuration shown in FIG. 50B, a plurality of directional patterns having isosceles triangles are arranged to have rotation symmetry at a center. It can be also realized to regulate the orientation of the liquid crystal molecules in the above configuration.

Figure 51:
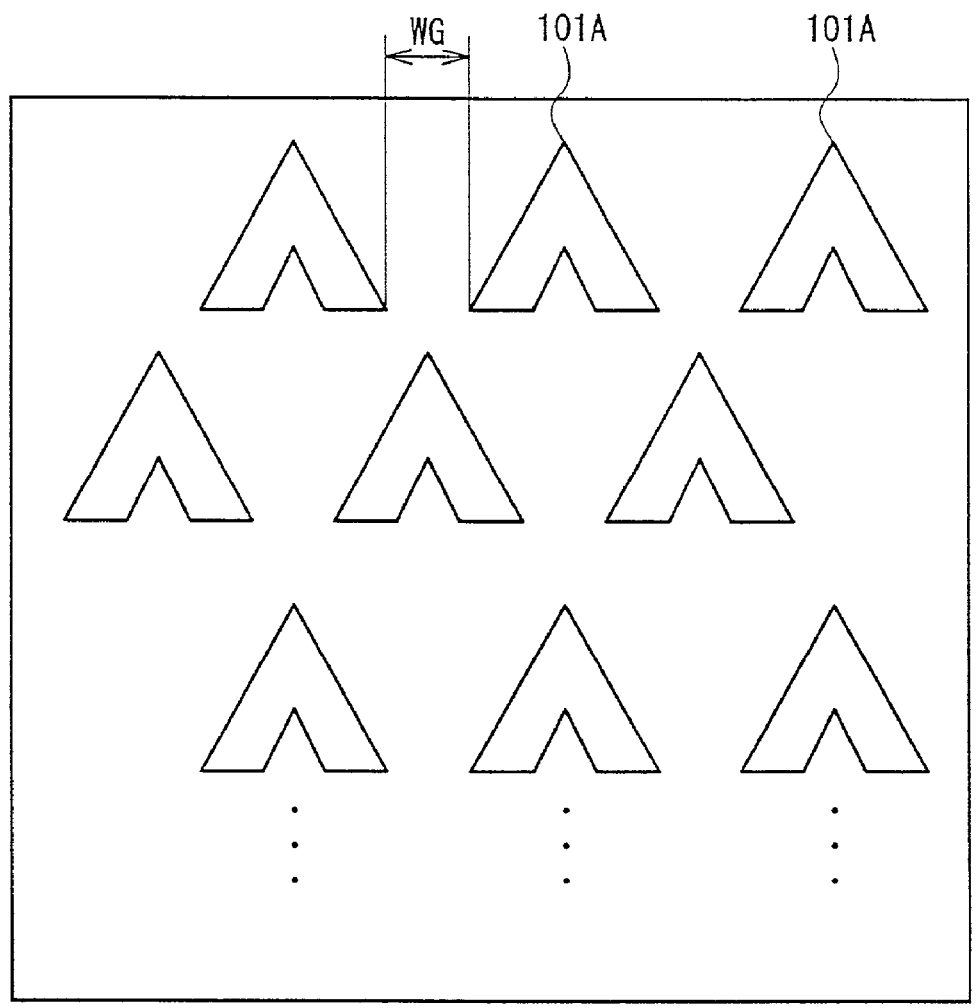
FIG. 51 is a diagram showing arrangement variations of the directional pattern according to the eighth embodiment of the present invention.

When the directional patterns 101A in FIG. 43 are formed on the pixel electrode 31 so as to arrange in a lattice shape, the directional pattern 101A can be alternately arranged as shown in FIG. 51.

Figure 52:
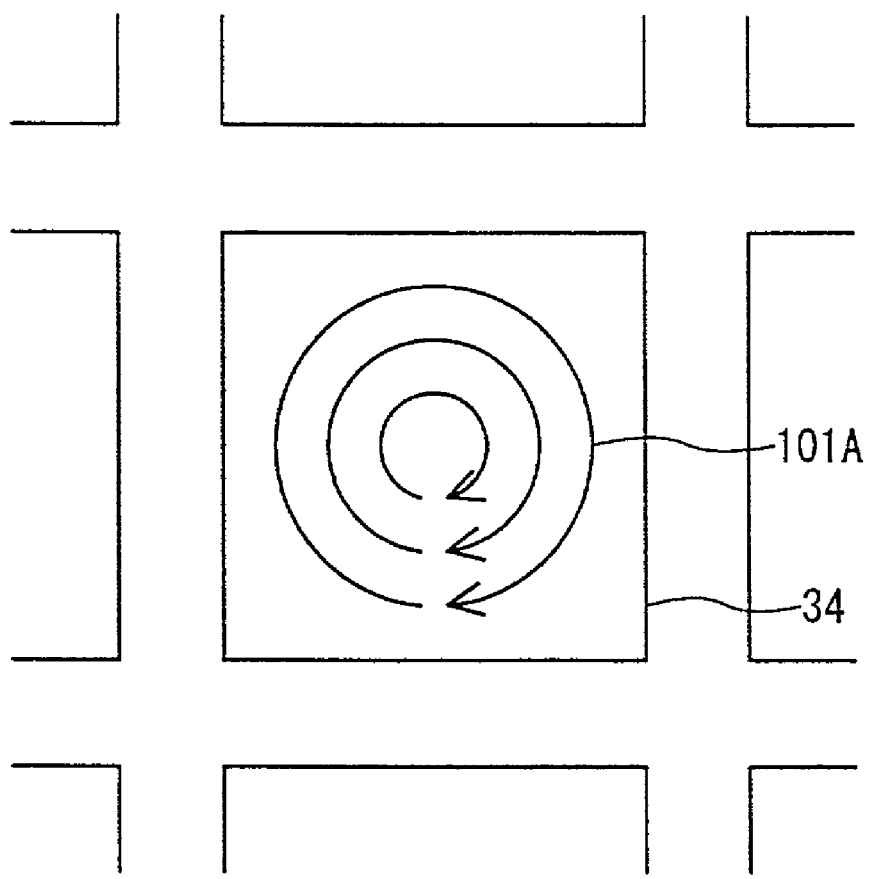
FIG. 52 is a diagram showing arrangement variations of the directional pattern according to the eighth embodiment of the present invention.

Also, if necessary, it is also possible to arrange the directional patterns 101A in a concentric circle or spiral as shown in FIG. 52.

[Ninth Embodiment]

Figure 53A:
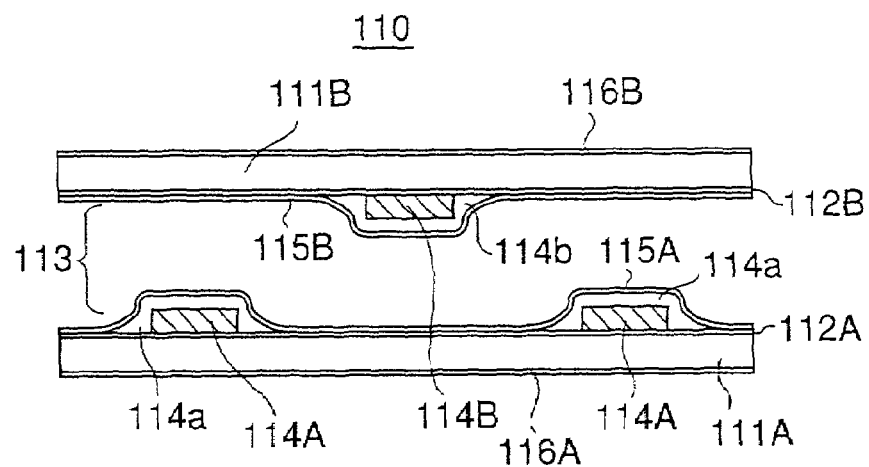
FIG. 53A is a sectional view diagram showing a liquid crystal display device according to a ninth embodiment of the present invention and FIG. 53B is a plan view diagram showing a liquid crystal display device according to the ninth embodiment of the present invention.
Figure 53B:
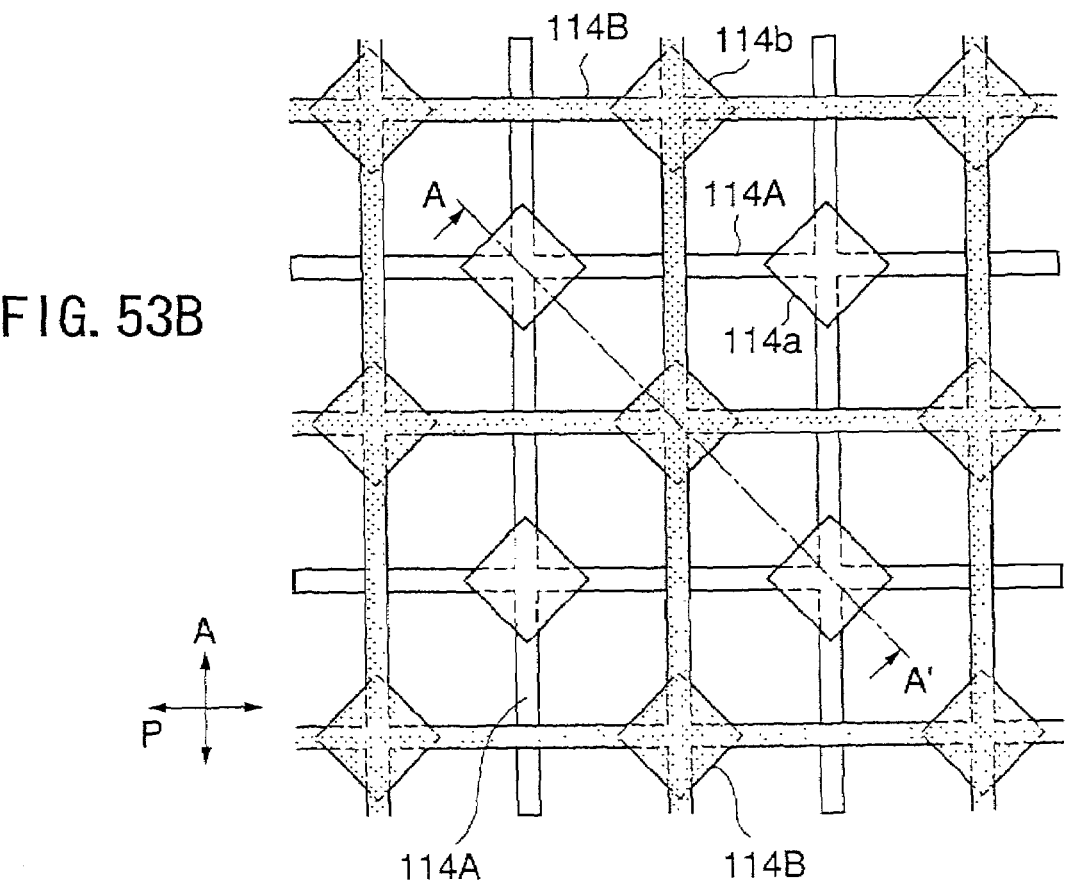

FIG. 53A is a sectional view diagram showing a liquid crystal display device 110 according to a ninth embodiment of the present invention and FIG. 53B is a plan view diagram showing a liquid crystal display device 110 according to the ninth embodiment of the present invention. In FIG. 53A, a sectional view of the liquid crystal display device 110 is shown at a line A to A' in FIG. 53B.

Referring to FIG. 53A, in the liquid crystal display device 110, the liquid crystal layer 113 is clamped between a glass substrate 112A carrying a pixel electrode 112A and a glass substrate 111B, and a projection pattern 114A is formed with lattice shapes on the pixel electrode 112A and a projection pattern 114B is formed with lattice shapes on the pixel electrode 112B.

On the projection pattern 114A (hereinafter, called lattice shaped pattern 114A), a localized pattern 114a forming a slope as shown in FIG. 53A and FIG. 53B is formed at a cross point of each lattice shape. Similarly, on the projection pattern 114B (hereinafter, called lattice shaped pattern 114B), a localized pattern 114b forming a slope is formed at a cross point of each lattice shape.

Moreover, a vertical molecule orientation film 115A is formed on the glass substrate 111A so as to cover the lattice shaped pattern 114A, and also a vertical molecule orientation film 115B is formed on the glass substrate 111B so as to cover the lattice shaped pattern 114B. The vertical molecule orientation films 115A and 115B are adjacent to the liquid crystal layer 113, and the vertical molecule orientation films 115A and 115B allow the liquid crystal molecules in the liquid crystal layer 113 to orient in a direction that is vertical to the liquid crystal layer 113. And also, a polarizer 115A outside of the glass substrate 111A and an analyzer 115B outside of the glass substrate 111B are formed in a crossed Nicol state, respectively. In FIG. 53B, directions of absorbent axes of the polarizer 115A and the analyzer 115B are shown, respectively.

In the liquid crystal display device 110, the pre-tilt angle, similar to FIG. 3A and FIG. 3B previously described, is given to the crystal molecules in the liquid crystal layer 113 by the lattice shaped patterns 114A and 114B and by slopes formed by the localized patterns 113a and 113b. As a result, when the driving electric field is applied to between the vertical molecule orientation films 115A and 115B, the liquid crystal molecules quickly fall down. Therefore, the operation speed of the liquid crystal display device 110 is improved.

Figure 54:
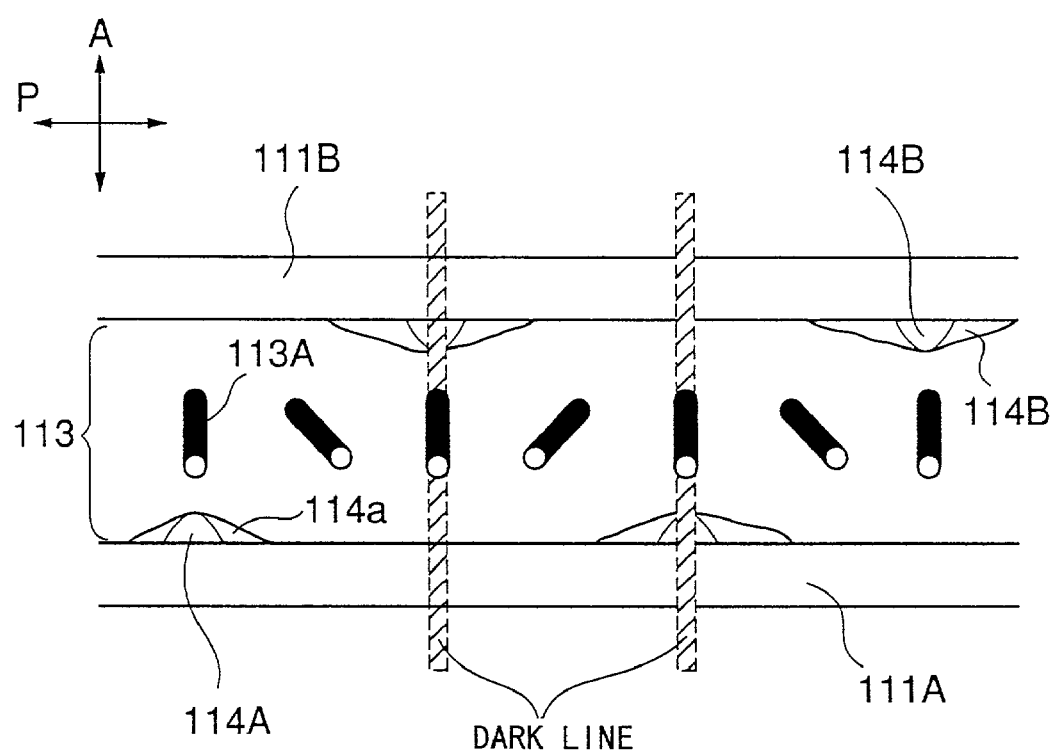
FIG. 54 is a diagram showing the orientation of the liquid crystal molecules in the liquid crystal layer in the driving state of the liquid crystal display device, according to the ninth embodiment of the present invention.

FIG. 54 is a diagram showing the orientation of the liquid crystal molecules 113A in the liquid crystal layer 113 in the driving state of the liquid crystal display device 110, according to the ninth embodiment of the present invention.

Referring to FIG. 54, directions of absorbent axes of the polarizer 116A and the analyzer 116B are set so as to correspond to an extended direction of the lattice shaped patterns 114A and 114B. On the right above the lattice shaped patterns 114A and 114B, a single dark line occurs, similarly to the case in FIG. 9. However, double dark lines do not occur at both sides of the lattice shaped pattern 114A or 114B. Therefore, it is possible to eliminate the problems, described in FIG. 2, related to the occurrences of the double dark lines and the deterioration of the transmittance caused by the occurrences of the double dark lines.

Next, a method for fabricating the liquid crystal display device 110 shown in FIG. 53A and FIG. 53B, will now be described with reference to FIG. 55A through FIG. 55D.

Referring to FIG. 53A, a resist film 114, which is typically a positive type resist S1808 manufactured by Shipley Far East Corporation, is formed on the glass substrate 111A so as to cover the pixel electrode 112A. When a pre-baking process is conducted at 90° C. for 20 minutes, an exposing process is conducted by using a mask M1 and then a developing process is conducted by, for example, liquid developer MF319 manufactured by Shipley Far East Corporation or the like. Then, the lattice shaped pattern 114A is formed as shown in FIG. 53B. In a step in FIG. 53B, a post-baking process is conducted to the lattice shaped pattern 114 at 120° C. for 40 minutes and the post-baking process is further conducted at 200° C. for 40 minutes.

Figure 55A:
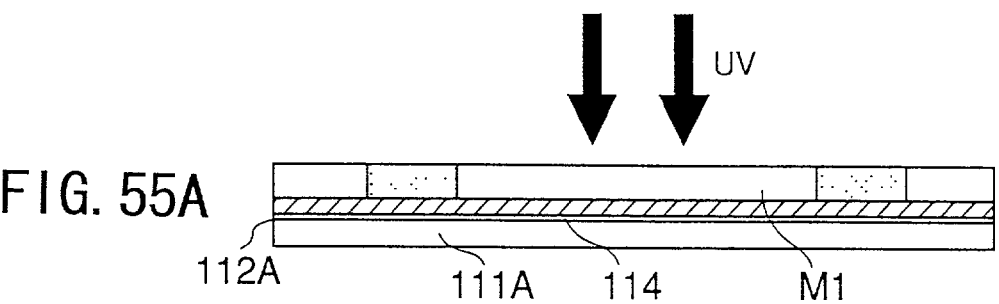
FIG. 55A through FIG. 55D are diagrams for explaining a method for fabricating the liquid crystal display device shown in FIG. 53A and FIG. 53B, according to the ninth embodiment of the present invention.
Figure 55B:
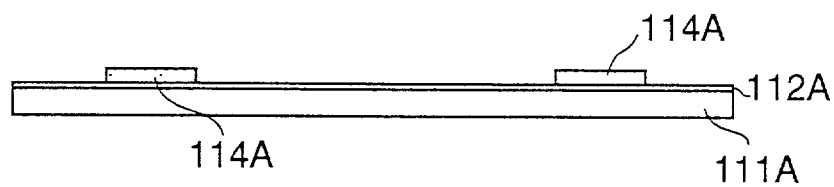
Figure 55C:
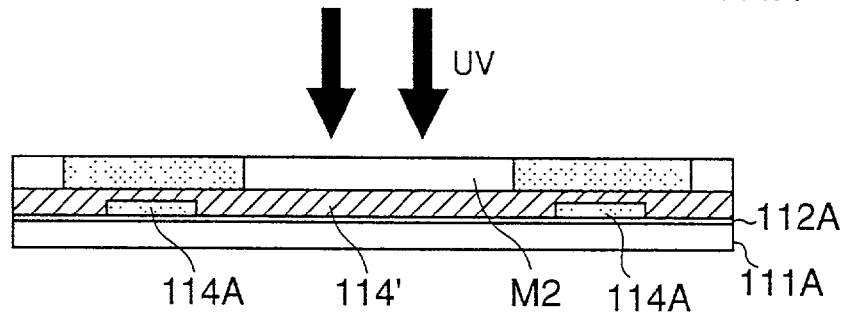
Figure 55D:
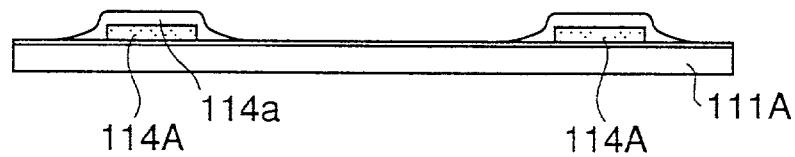

In a step in FIG. 55C, a resist film 114' configured by the localized pattern 114a is formed on the glass substrate 111A so as to cover the lattice shaped pattern 114A. Subsequently, the exposing process and the developing process are conducted by using a mask M2. As shown in FIG. 55D, the localized pattern 114a is formed at a cross point of each lattice of the lattice shaped pattern 114A. That is, the localized pattern 114a is formed so that typically, one side is 45 μm and a height is 0.3 μm. On the other hand, for example, a width of the lattice shaped pattern 114A itself is 5 μm.

In a step in FIG. 55D, for example, a vertical orientation film JALS684 manufactured by JSR Corporation is formed as the molecule orientation film 115A so as to cover the lattice shaped pattern 114A and the localized pattern 114a.

Similarly, the lattice shaped pattern 114B and the localized pattern 114b are formed on the glass substrate 111B.

Figure 56:
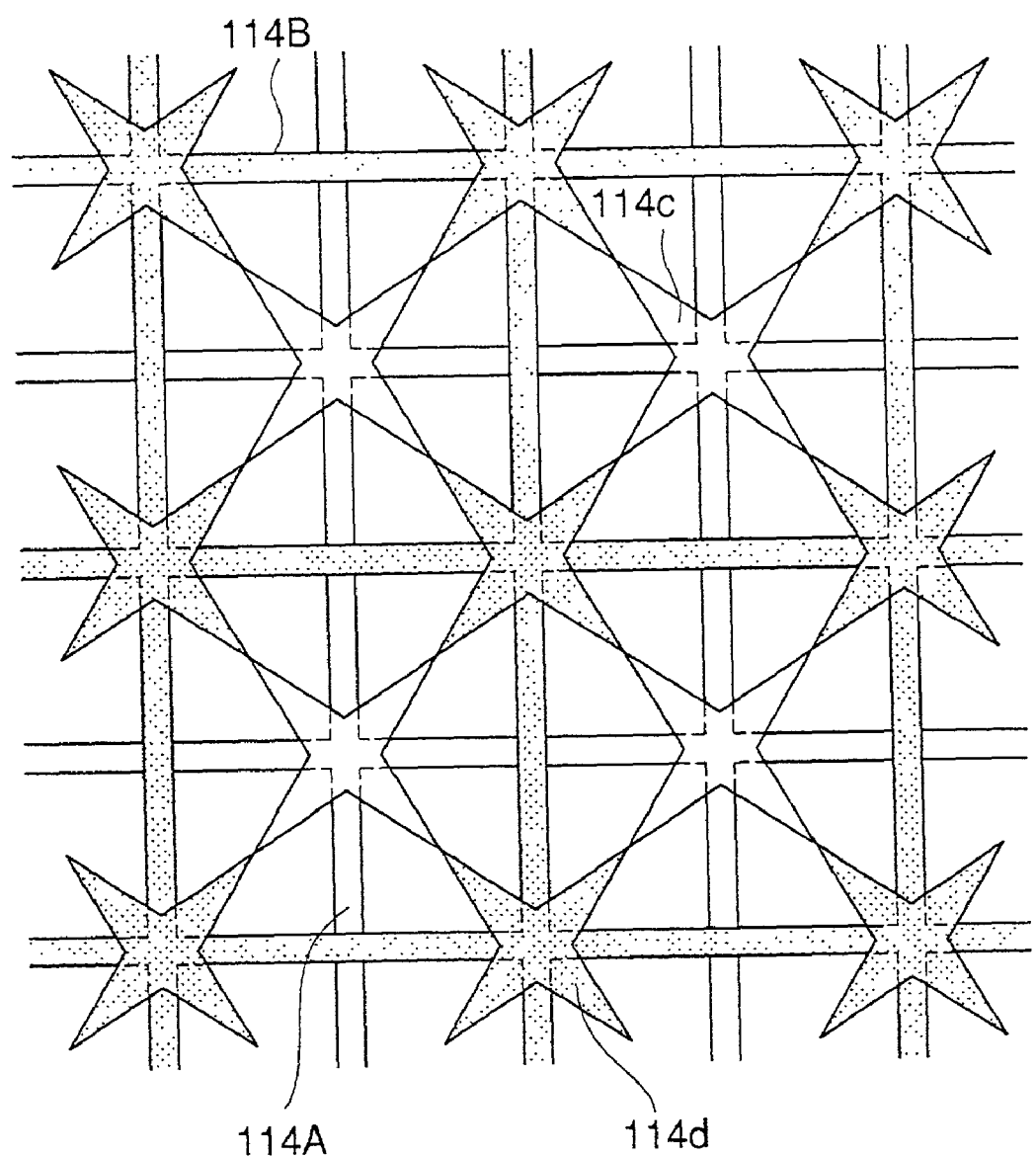
FIG. 56 is a diagram showing a first variation of the liquid crystal display device according to the ninth embodiment of the present invention.

When the glass substrates 111A and 111B are combined together and the liquid crystal display device 110 is formed, the lattice shaped patterns 114A and 114B are formed so as to be spaced 20 μm between the lattice shaped patterns 114A and 114B FIG. 56 is a diagram showing a first variation of the liquid crystal display device 110 according to the ninth embodiment of the present invention.

In FIG. 56, instead of the localized patterns 114a and 114b, a localized pattern 114c and 114d having projections extending at 45° to an extended direction of the lattice shaped pattern 114A and 114B.

According to the first variation in FIG. 56, it is possible to realize a desired pre-tilt direction of the liquid crystal molecules in an intermediate region between the lattice shaped patterns 114A and 114B, in which region pre-tilt effects of the lattice shaped patterns 114A and 114B are not directly given to the intermediate region.

Figure 57:
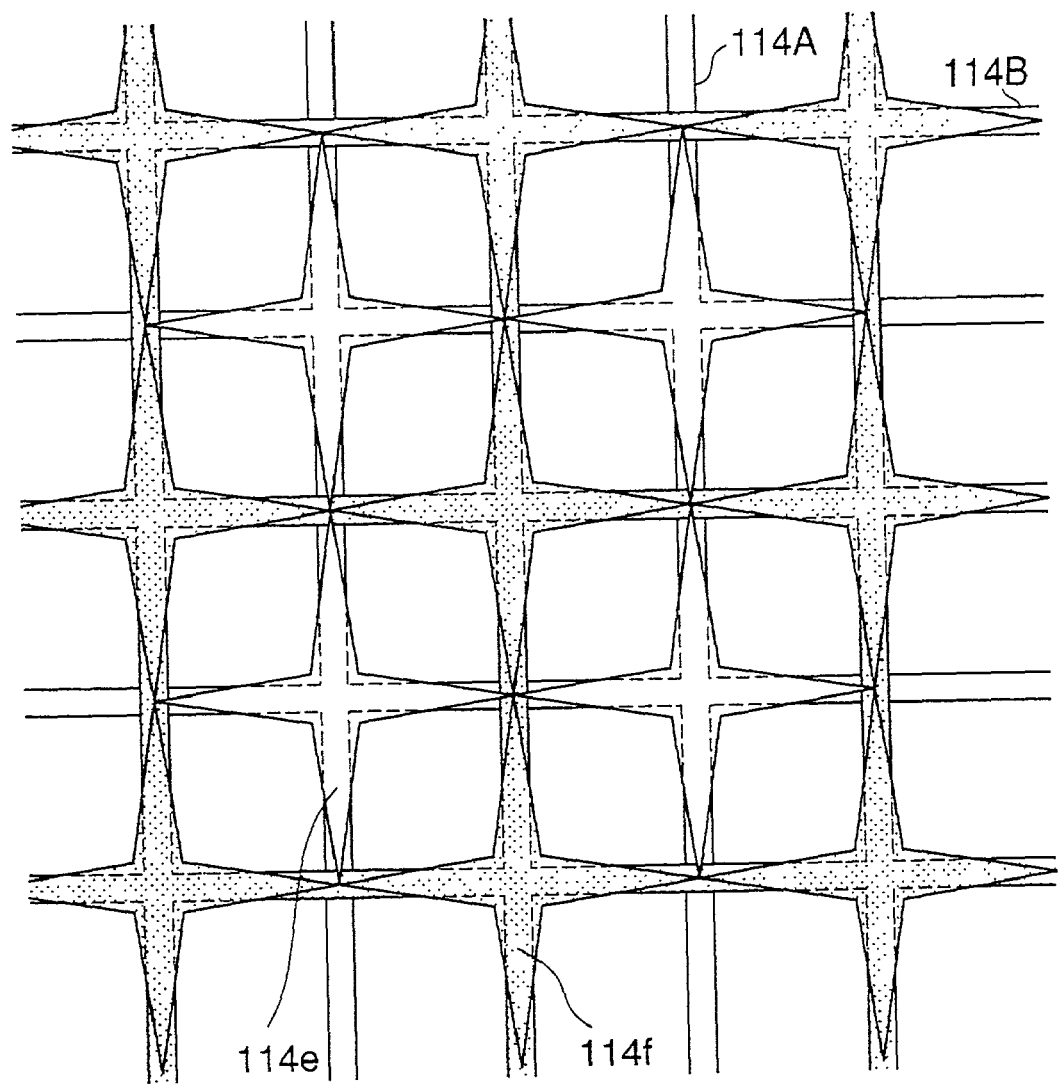
FIG. 57 is a diagram showing a second variation of the liquid crystal display device according to the ninth embodiment of the present invention.

On the contrary, FIG. 57 is a diagram showing a second variation of the liquid crystal display device 110 according to the ninth embodiment of the present invention.

In FIG. 57, instead of the localized patterns 114a and 114b, a localized pattern 114e and 114f having projections extending in an extended direction of the lattice shaped pattern 114A and 114B.

According to the second variation in FIG. 57, it is possible to further reinforce the pre-tilt effects of the lattice shaped patterns 114A and 114B by the localized patterns 114e and 114f.

Figure 58:
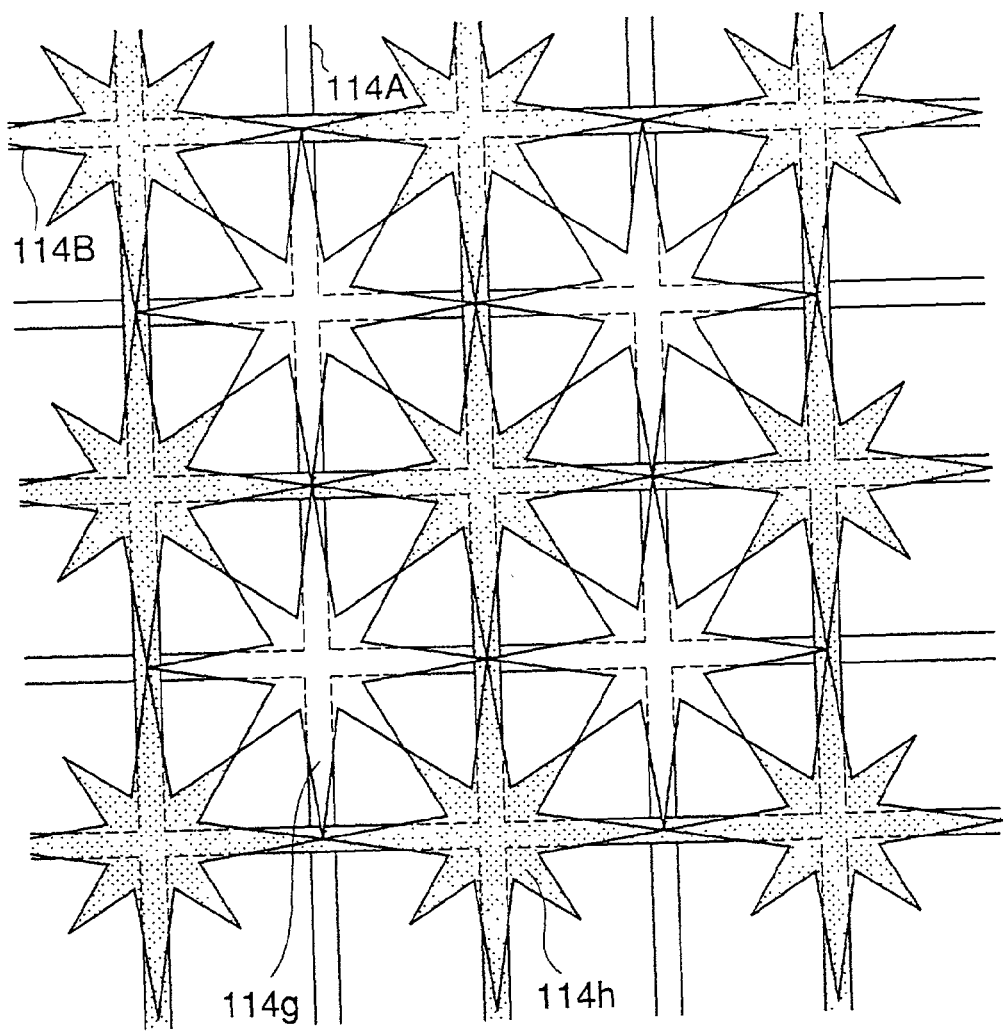
FIG. 58 is a diagram showing a third variation of the liquid crystal display device according to the ninth embodiment of the present invention.

FIG. 58 is a diagram showing a third variation of the liquid crystal display device 110 according to the ninth embodiment of the present invention.

In FIG. 58, the first variation and the second variation are joined in the third variation. That is, a localized pattern 114g is formed at each cross point of the lattice shaped pattern 114A and a localized pattern 114h is formed at each cross point of the lattice shaped pattern 114B.

Figure 59:
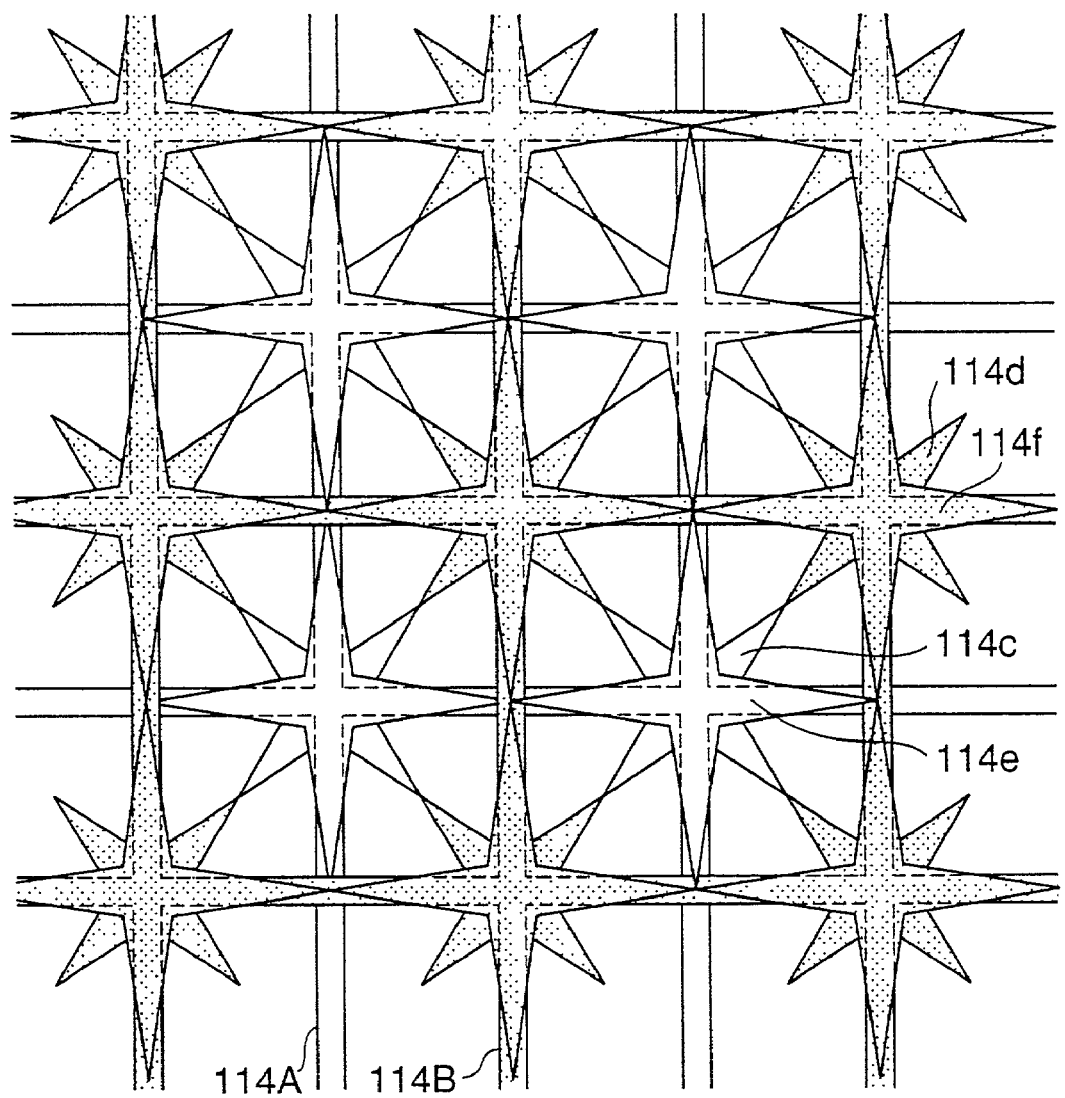
FIG. 59 is a diagram showing a fourth variation of the liquid crystal display device according to the ninth embodiment of the present invention.

And FIG. 59 is a diagram showing a fourth variation of the liquid crystal display device 110 according to the ninth embodiment of the present invention.

In FIG. 59, the first variation and the second variation are superposed in the third variation. That is, the localized pattern 114e is formed on the localized pattern 114c and the localized pattern 114f is formed on the localized pattern 114d.

According to the fourth variation in FIG. 59, especially, it is possible to realize steep slopes of the localized patterns 114e and 114f. Therefore, the pre-tilt effect of the liquid crystal molecules can be enhanced.

The variations shown in FIG. 53 through FIG. 59 can be applied to any embodiments previously described and can contribute to improve the operation speed of the liquid crystal display device.

According to the present invention, the structural pattern is to form an electric field periodically changing in the second direction. Thus, the structural pattern may be a convex pattern that is formed on the first electrode and is made up of an insulating material or a conducting material, or a concave pattern such as a cutout pattern or the like formed on the first electrode. Also, in the present invention, a plurality of pixel electrodes is preferably used as the first electrode. However, in this case, each of the plurality of pixel electrodes is sectioned into a plurality of domains. The structural pattern is formed in each of the plurality of domains so that the first direction in one domain crosses the first direction in other domains adjacent to sides of the one domain at 90° angle. The visibility angle, which is superior by applying the vertical orientation mode, can be more improved. On the first substrate, thin film transistors, which correspond to a plurality of pixel electrodes, respectively, and drives the pixel electrodes, are formed. Then, by applying a active matrix driving method, the liquid crystal display device according to the present invention can optimize its superior response characteristic.

On at least one of the first substrate and the second substrate, another structural pattern different from the structural pattern can be formed so as to cross the first direction and be repeat in a different direction from the second direction at intervals of substantially a greater period than the repeat period which the structural pattern is repeated in the second direction at. By forming another structural pattern, it is possible to uniquely determine a tilt direction of the liquid crystal molecules when the voltage is applied. And it is possible to improve an effect of regulating the tilt direction of the liquid crystal molecule by the micro patterns. As a result, the response speed of the liquid crystal display device is improved. Preferably, another structural pattern has a higher height than the structural pattern.

When the structural pattern is formed by a plurality of micro patterns that extend in the first direction and are repeated in the second direction at a first period, another structural pattern is formed by a first rough structural pattern formed on the first substrate and extending in a third direction crossing the first direction, and a second rough structural pattern formed on the second substrate and extending in a fourth direction vertically crossing the second direction. Preferably, the first rough structural pattern is repeated in the fourth direction at intervals of substantially a greater period than the first period and the second rough pattern is repeated in the third direction at intervals of substantially a greater period than the first period. In order to maximally the response speed improved by another structural pattern, it is preferably that each of the first rough structural pattern and the second rough structural pattern has a wider width than the micro pattern. It is preferable that the third direction vertically crosses the first direction, or the third direction crosses the first direction at 45° angle.

When the structural pattern is formed by a plurality of micro patterns that extend in the first direction with a first width and are repeated in the second direction at a first period, another structural pattern can be formed by a first lattice shaped pattern and a second lattice shaped pattern. The first lattice shaped pattern is formed on the first substrate so as to extend in a third direction obliquely crossing the first direction and the second direction and a fourth direction vertically crossing the third direction. The second lattice shaped pattern is formed on the second substrate at a position displaced from the first lattice shaped pattern so as to extend in the third direction and in the fourth direction. In this case, the first lattice shaped pattern and the second lattice shaped pattern are repeated at intervals of greater periods than the first period, respectively. In this configuration, it is preferable that each of the first lattice shaped pattern and the second lattice shaped pattern has a wider width than the micro pattern. In addition, it is preferable that the third direction crosses the first direction at 45° angle. In this case, the first lattice shaped pattern is sectioned into a first, a second, a third and a fourth domains on the first substrate and the micro pattern is formed so that the first direction in one of the first, the second, the third and the fourth domains and the first direction in each of other domains adjacent to the one domain form a 90° angle. Therefore, it is possible to optimize the characteristic of the visible angle.

Another structure pattern described above can be a convex pattern or a concave pattern.

Also, according to the present invention, it is preferable that each of patterns forming the structural pattern is directional and directs at least one direction in the first direction. For example, it is preferable that each of the plurality of patterns has approximately a triangle shape and is formed so that a vertex of the triangle directs the direction. Alternatively, it is preferable that each of the plurality of patterns has a rhombus shape having a first vertex and a second vertex opposing each other in that said first vertex directs said first direction as one direction and said second vertex directs said second direction as an opposed direction. By using the directional pattern as the structural pattern, when the liquid crystal molecules in the liquid crystal layer tilt in the driving state, a tilt direction is uniquely determined in the first direction. As a result, the response speed of the liquid crystal display device is improved. Also, in a case in which an optical hardened material of the optical hardened composite, similar effect can be achieved. It is preferable that each of the plurality of the directional patterns has a maximum width less than 10 μm.

The present invention is not limited to the specifically disclosed embodiments, variations and modifications, and other variations and modifications may be made without departing from the scope of the present invention.

The present application is based on Japanese Priority Application No. 2000-295266 filed on Sep. 27, 2000,the entire contents of which are hereby incorporated by reference.

What is claimed is:

1. A liquid crystal display device comprising:
a first substrate;
a second substrate facing said first substrate;
a liquid crystal layer sealed between said first substrate and said second substrate;
a first electrode formed on said first substrate;
a second electrode formed said second substrate;
a first molecule orientation film formed on said first substrate so as to cover said first electrode;
a second molecule orientation film formed on said second substrate so as to cover said second electrode;
a first polarizing plate arranged outside of said first substrate; and
a second polarizing plate arranged outside of said second substrate in a crossed Nicol state to said first polarizing plate,
wherein:
in a non-driving state in which a driving voltage is not applied between said first electrode and said second electrode, liquid crystal molecules are oriented in a vertical direction to said first substrate and said second substrate by said first molecule orientation film and said second molecule orientation film, respectively;
on said first electrode, fine pitch electrode patterns, which extend in a first direction parallel to a surface of said first substrate, are periodically repeated to be arranged at intervals of a first width in a second direction, which said second direction is parallel to the surface of said liquid crystal layer and is vertical to said first direction;
said electrode patterns, which are repeated to be arranged in said second direction, are mutually connected to each other by a first connector substantially parallel to a direction in which a capacitance electrode extends and a second connector which extends in a direction other than the direction of the capacitance electrode;
on said first electrode, a cutout pattern extending in said second direction is formed at substantially a greater second width than said first width; and
said liquid crystal molecules substantially tilt in said first direction in a driving state on and among said electrode patterns on said first electrode.

2. The liquid crystal display device as claimed in claim 1, wherein each of said electrode patterns is spaced from another electrode pattern adjacent and corresponding thereto in said first direction, by said cutout pattern.

3. The liquid crystal display device as claimed in claim 1, wherein further on said second substrate, rough patterns extending in said second direction are formed so as to cross said electrode patterns at a view from a vertical direction to said first substrate, and said electrode patterns adjacent to and corresponding to other electrode patterns in said second direction and at least a part of said second connector are arranged under said rough patterns at said view from said vertical direction to said first substrate.

4. The liquid crystal display device as claimed in claim 3, wherein said rough patterns are made up of convex patterns formed on said second substrate.

5. The liquid crystal display device as claimed in claim 3, wherein said rough patterns comprises repeated patterns in said first direction, in which said repeated patterns are repeated in said second direction at intervals of a period being same as or equal to a repeat period in said second direction of said electrode patterns.

6. The liquid crystal display device as claimed in claim 1, wherein at least a part of said electrode patterns further mutually connects along an edge of an opening part of a pixel electrode.

7. The liquid crystal display device as claimed in claim 1, wherein each of said electrode patterns has a tapered shape in said first direction.

8. The liquid crystal display device as claimed in claim 1, wherein each of said electrode patterns has a shape which width becomes narrower toward a top edge in a step-wise shape.

9. The liquid crystal display device as claimed in claim 1, wherein further on said first substrate, third electrode patterns are formed so as to extend along said cutout patterns at a same electric potential as said second electrode under said first electrode.

10. The liquid crystal display device as claimed in claim 9, wherein:
   on said first electrode, a first region and a second region are formed so that said first direction in said first region vertically crosses said first direction in said second region; and
   said third electrode extends along said first region and the second region on said first substrate.

11. The liquid crystal display device as claimed in claim 1, wherein said first electrode comprises a first region where said electrode patterns are repeated and a second region which is covered with a uniform conducting film.

12. The liquid crystal display device as claimed in claim 1, wherein:
   said first connector comprises banded patterns, which width is substantially constant, extending in said second direction; and
   said electrode patterns laterally extend from said banded patterns.

13. The liquid crystal display device as claimed in claim 12, wherein said electrode patterns are repeated to form in said second direction at intervals of a period which is more than 2 μm and less than 15 μm.

14. The liquid crystal display device as claimed in claim 12, wherein a region of said electrode patterns is in a range of 35% through 65% of a region of said banded patterns.

15. The liquid crystal display device as claimed in claim 12, wherein:
   each of said banded pattern has a width of approximate 22 μm in said first direction; and
   each of said electrode patterns has a width of $3.5\pm1$ μm at a basement connecting to said banded patterns, a length of approximate $15\pm5$ μm in said first direction, and forms a cutout pattern of approximate 8 μm.

16. The liquid crystal display device as claimed in claim 1, wherein:
   said liquid crystal layer is made up of a nematic liquid crystal and an optical hardened material of the optical hardened composite.

17. The liquid crystal display device as claimed in claim 1, wherein on said first substrate, a thin film transistor is formed so as to correspond to each of pixel electrodes and drives each of said pixel electrodes.

* * * * *